United States Patent [19]

Tabata et al.

[11] Patent Number: 5,726,419

[45] Date of Patent: Mar. 10, 1998

[54] PULSE WELDING APPARATUS

[75] Inventors: Yoichiro Tabata; Shigeo Ueguri; Yoshihiro Ueda, all of Hyogo; Masanori Mizuno, Aichi; Yoshiaki Kato, Aichi; Osamu Nagano, Aichi, all of Japan

[73] Assignee: Mitsubishi Denki Kabushiki Kaisha, Tokyo, Japan

[21] Appl. No.: 571,187

[22] Filed: Dec. 12, 1995

Related U.S. Application Data

[62] Division of Ser. No. 279,069, Jul. 22, 1994, Pat. No. 5,495,091, which is a continuation of Ser. No. 601,217, filed as PCT/JP90/00247, Feb. 27, 1990, published as WO90/09856, Sep. 7, 1990, abandoned.

[30] Foreign Application Priority Data

| Feb. 27, 1989 | [JP] | Japan | 1-45935 |
| Mar. 9, 1989 | [JP] | Japan | 1-56960 |
| Apr. 21, 1989 | [JP] | Japan | 1-102765 |
| Apr. 21, 1989 | [JP] | Japan | 1-102766 |
| Apr. 21, 1989 | [JP] | Japan | 1-102767 |
| Apr. 21, 1989 | [JP] | Japan | 1-102768 |
| Apr. 21, 1989 | [JP] | Japan | 1-102769 |
| Jun. 20, 1989 | [JP] | Japan | 1-157414 |

[51] Int. Cl.[6] ................................ B23K 9/09
[52] U.S. Cl. ............................... 219/130.51
[58] Field of Search ............... 219/130.51, 137 PS, 219/130.5

[56] References Cited

U.S. PATENT DOCUMENTS

| 3,781,511 | 12/1973 | Rygiol | 219/130.51 |
| 4,246,465 | 1/1981 | Ericsson | 219/130.51 |
| 4,273,988 | 6/1981 | Iceland et al. | 219/130.51 |
| 4,438,317 | 3/1984 | Ueguri et al. | |
| 4,546,234 | 10/1985 | Ogasawara et al. | |
| 4,897,523 | 1/1990 | Parks et al. | |
| 4,994,646 | 2/1991 | Tabata et al. | 219/130.51 |

FOREIGN PATENT DOCUMENTS

| 0324960 | 12/1988 | European Pat. Off. | |
| 0342691 | 11/1989 | European Pat. Off. | |
| 0369367 | 5/1990 | European Pat. Off. | |
| 58-176074 | 10/1983 | Japan | 219/130.51 |
| 59-150673 | 8/1984 | Japan | 219/130.51 |
| 521089 | 9/1976 | U.S.S.R. | 219/130.51 |

(List continued on next page.)

OTHER PUBLICATIONS

Ueguri et al., "Study of Metal Transfer in Pulsed GMA Welding", Welding Journal, Aug. 1985, p. 242 et seq.

*Primary Examiner*—Clifford C. Shaw
*Attorney, Agent, or Firm*—Sughrue, Mion, Zinn, Macpeak & Seas, PLLC

[57] ABSTRACT

In pulse welding apparatus of arc welding or short-circuit transfer type arc welding in which a pulse discharge created on the tip of a wire electrode is utilized to perform welding, when a molten droplet produced on the tip of wire electrode is late to separate from the wire due to variations of welding conditions and external disturbances, the wire-supplying speed at which the wire is supplied to the weld zone changes causing undercut. To prevent this, pulse current supplied to the base metal is divided into a plurality of pulse groups and the average current reaches the maximum peak value at a predetermined time after beginning of outputting the pulses, and the group of pulse currents is of a hill-shape in its envelope in accordance with the separation phenomenon of molten droplet, and the group of pulse currents is arranged to have different pulse period, pulse width, and pulse interval. In sort-circuiting arc welding, the short-circuit and arc are instantly controlled in accordance with the detected arc length or wire-supplying speed. This ensures the separation of the molten droplet and its transfer onto the base metal in regular manner. As a result, the growth and separation of molten droplet is not affected by magnetic blow of arc but is controllable.

19 Claims, 59 Drawing Sheets

FOREIGN PATENT DOCUMENTS

| | | |
|---|---|---|
| 1164005 | 9/1969 | United Kingdom . |
| 1215892 | 12/1970 | United Kingdom . |
| 2075773 | 11/1981 | United Kingdom . |
| 2101427 | 1/1983 | United Kingdom . |
| 2171267 | 8/1986 | United Kingdom ................ 219/130.1 |
| 2250357 | 6/1992 | United Kingdom . |

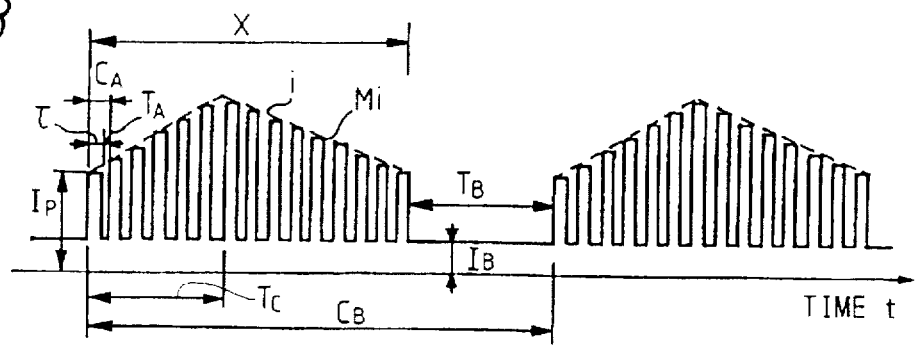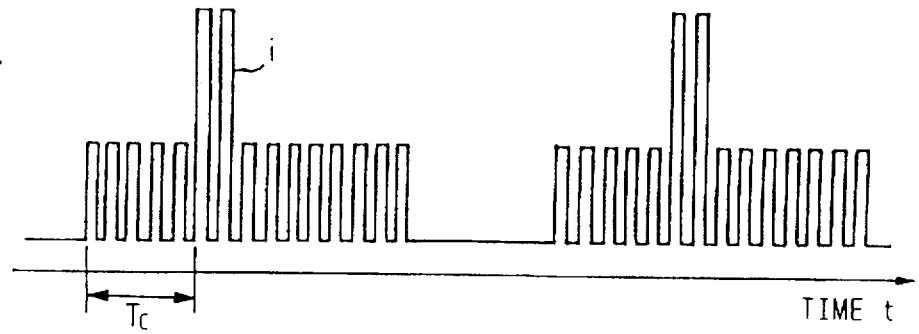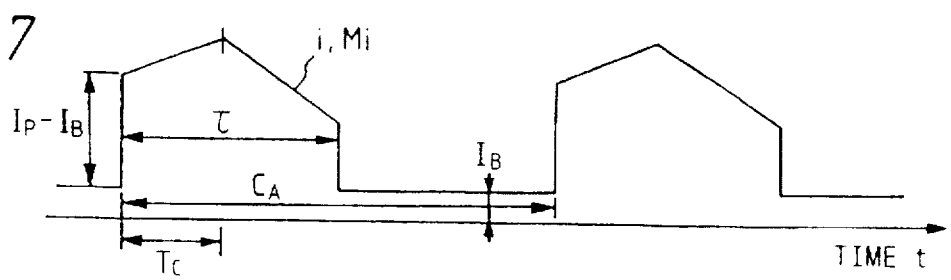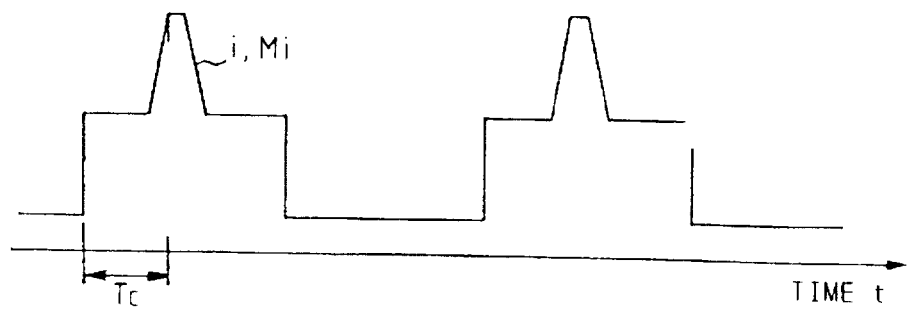

FIG. 52A
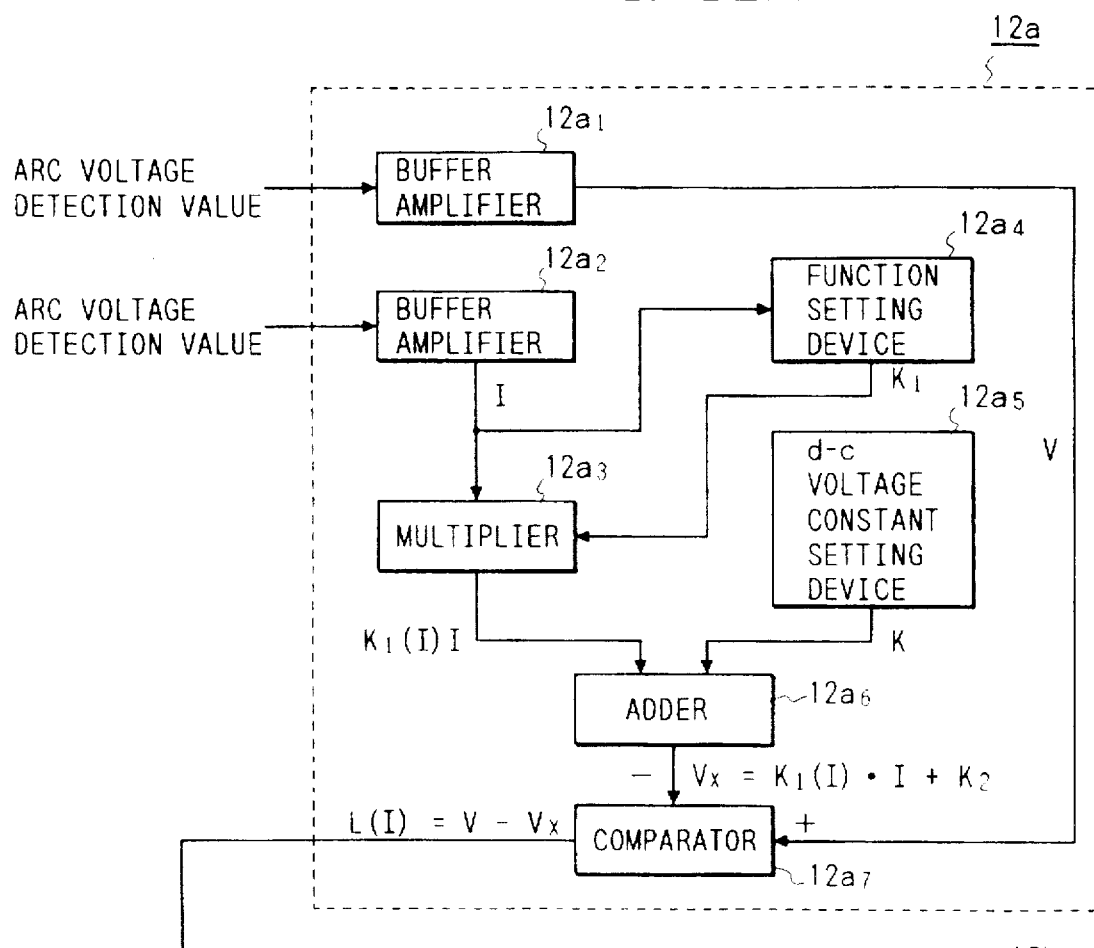
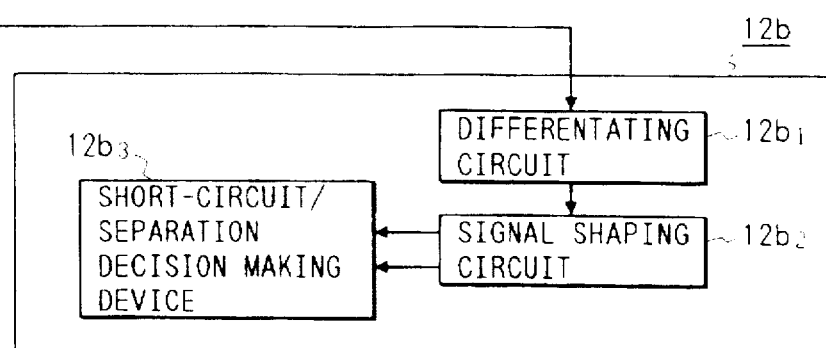

PULSE WELDING APPARATUS

This is a division application of application Ser. No. 08/279,069 filed Jul. 22, 1994 which is a continuation application of application Ser. No. 07/601,717 filed Nov. 19, 1990 which is a 371 of PCT/JP90/00247 filed Feb. 9, 1990 now PCT/Publication No. WO 90/09858 dated Sep. 7, 1990.

TECHNICAL FIELD

The present invention relates to a pulse welding apparatus in which pulse discharge is utilized, and more particularly to a pulse welding apparatus in which phenomena specific to discharge electrodes such as melting and separation of the discharge electrodes are arranged to occur in a regular manner and to be controllable to thereby effect good welding.

BACKGROUND ART

Examples of an arc welding apparatus are a pulse arc welding and short-circuit transferring arc welding apparatus. Some pulse arc welding apparatus makes use of a train of pulse current groups each of which includes a plurality of pulses. In the former pulse arc welding apparatus, a pulse arc current is produced between a consumable welding wire electrode (referred to merely as a wire electrode hereinafter) and a base metal, and heat generated by a pulse arc discharge produced by the pulse arc current causes both the base metal and the wire electrode to be melted as well as causes the melted wire electrode to be transferred onto the base metal by virtue of electromagnetic pinch force developed through pulse arc discharge, thereby welding the base metal. In the latter pulse arc welding apparatus, a plurality of pulse currents form a pulse current waveform. Each of pulses is further divided into a plurality of pulses to form a discharge current waveforms that are periodically repeated. This division of pulse current waveform causes the upward magnetic force resulted from pulse arc discharge of the wire electrodes to be intermittent, thereby reducing the force tending to lift a molten droplet produced on the tip of the wire electrode.

The short circuiting arc welding apparatus is the one in which the base metal and wire electrode are melted by the heat generated through arc discharge which in turn is generated when short-circuiting is repeated alternately with arc to produce arc currents that flows between the base metal and wire electrode, and then the base metal and electrode are short-circuited such that molten droplet produced on the tip of the wire electrode is transferred onto the base metal for welding.

The former pulse arc welding apparatus will now be described specifically. FIG. 53a shows a prior art pulse arc welding apparatus disclosed by Published Unexamined Japanese Patent Application No. 57-19177. In FIG. 53a, reference numeral 92 depicts a d-c power source, 93 is a switching element in the form of a power transistor that controls current in chopper action in which the current supplied from the d-c power source 92 is switched on and off to form a pulse-like current waveform. The apparatus further includes a welding torch 51 that serves as an arc load, a wire electrode 52 which is a heat melted metal in the form of a wire supplied from a wire reel, an arc discharge 53, and base metals 46 and 54. The reference 93 is a base current supplying device for supplying a continuous base current such that the arc exists continuously between the pulses. The reference numeral 94 denotes a control circuit for controlling the switching element (95) to maintain the pulse frequency and pulse width of the pulse current at a predetermined value, and the numeral 6 is a current detector for detecting a current i.

The operation of the pulse arc welding apparatus will now be described.

In general, a pulse arc welding apparatus is advantageous in that the tip end of the wire electrode 52 is melted by the pulse arc current and the melted tip of wire electrode is transferred onto the base metal by the electromagnetic pinch force even if the average current thereof is smaller than that of the d-c arc welding apparatus. Thus, the average current is lower in the pulse arc welding apparatus than in the d-c arc welding apparatus, which enables welding of thinner base metals. In addition, "spatter" that occurs during welding may be eliminated due to the fact that the tip of electrode can be separated in air from the wire with the aid of electromagnetic pinch force.

FIG. 54a shows an example of a pulse arc current waveform, produced when the wire electrode is a soft steel of 1.2 mm diameter and the shielding gas is a mixture of argon plus 20% $CO_2$.

The short circuiting arc welding apparatus will now be described specifically. FIG. 53b shows a construction of a conventional short circuiting welding apparatus disclosed by Japanese Patent Publication No. 62-54585.

In FIG. 53b, the numeral 7 is a voltage detector for detecting a voltage V across the wire electrode 52 and the base metal 54 to be welded, the numeral 94a is a first decision-making device which compares the detection voltage V detected by the voltage detector 7 with a voltage Vo (a voltage during short-circuiting or a voltage just before a short-circuiting occurs) indicative of short circuiting condition to thereby decide the short circuiting where a switch command circuit 94c is supplied with a command signal when $V \leq Vo$ so as to shift the switching element 95 to ON position. The numeral 94b is a second decision-making device which compares the detection voltage V detected by the voltage detector 7 with a voltage Va indicative of arc reproduction to thereby decide the arc reproduction where a switch command circuit 94c is supplied with a command signal to shift the switching element 95 to OFF position. FIG. 54b illustrates the current waveform of this welding machine.

The operation of the welding machine will now be described. The tip of the wire 52 is short-circuited to the base metal 54 with both the d-c power source circuit 92 and the base current supplying device 93 turned on (not shown). Since the detection voltage V detected by the voltage detector 7 is lower than the voltage Vo representative of the short-circuited condition ($V \leq Vo$), the first decision making device 94a becomes operative to output an ON signal to the switch command circuit 94c which in turn outputs a trigger signal to close the switching element 95 so as to cause the d-c power source circuit 92 to supply a current. This current flows till the wire electrode 52 is burned to cut off and an arc is produced while the detection voltage V detected by the voltage detector 7 increases from a short-circuit voltage to an arc voltage. Then, the first decision making device 94a is stopped to operate. Where the detection voltage V increases higher than the voltage Va indicative of the arc reproduction ($V \geq Va$), the second decision making device comes into operation to shut off the trigger signal to the switch command circuit 94c so as to open the switching element 95. Thus, the current is decreased by a reactor 1b, thereby the current is supplied only by the base current supplying device.

In this manner, the wire electrode and the base metal are heated to melt during the first arc period B, the welding wire 52 is supplied by a supply-motor to the torch 51, the melted tip of the wire 52 is short-circuited to the base metal which causes the switching element 95 to close. This allows the d-c power source circuit 92 to supply current and the transfer of the wire electrode 52 onto the base metal 54 is completed.

Repeating the above-described process will result in a waveform shown in FIG. 54b which permits a stable welding operation.

For good welding result in the aforementioned pulse arc welding, it is necessary to prevent spatter of the welded materials produced during welding and undercut which is a defect in shape of weld bead and to maintain generally uniform size of molten droplet which is separated from the wire electrode. The wire electrode must not touch (short-circuit) the base metal so that the spatter is eliminated. The arc length should be short so that the undercut is prevented. To meet these two requirements, it is a critical importance that the separated molten droplet is transferred in the form of fine particles onto the base metal to be welded. (Spray-transfer) The uniform size of separated molten electrode can be obtained by repeating the same shape of pulse to produce a pulse arc current waveform.

In a shielding gas of a mixture of argon and 20% $CO_2$, the size of arc is sufficiently large as compared to the molten droplet of wire electrode, thus the periodic repetition of simple pulses shown in FIG. 54a will cause the molten droplet to regularly separate from the electrode, which promises good quality of welding. On the other hand, in a shielding gas of 100% $CO_2$, the size of arc is rather small as compared to the molten droplet of wire electrode, thus the simple pulses shown in FIG. 54a will cause the phenomena shown in FIGS. 55a and 55b resulting in poor welding quality. Setting a lower base current $I_B$ as shown in FIG. 55b and a wider pulse width τ will cause the magnetic force F due to the pulse current to act upwardly so that the shape of molten droplet 52a of the tip of the wire electrode 52 is lifted from Po to Pb1. Then, the molten droplet 52a can be separated by the pulse current as depicted by Pb1. The separated molten droplet 52a goes into a high speed rotation not dropping onto the base metal but scattering as a spatter or again being deposited on the wire electrode 52 as depicted by Pb2'.

A pulse welding apparatus shown in FIG. 56 is one of the apparatus in which pulse arc welding is carried out in a shielding gas of 100% $CO_2$.

The pulse arc current waveform used in this apparatus is formed of a plurality of pulse currents as shown in FIG. 57. Thus, the discharge current waveform is of a plurality of pulse currents which is repeated periodically. That is, each pulse is divided into a plurality of pulses. The division of the pulse current waveform causes the upward magnetic force due to pulse arc discharge on the wire electrode to be intermittent, thus reducing the force tending to lift the molten droplet produced on the tip of the wire electrode. As a result, the molten droplet may easily be separated from the electrode before it becomes a large size not only in an argon-dominated shielding gas but also in a shielding gas of $CO_2$ gas.

The transfer phenomenon of the molten droplet will be described.

As shown in FIG. 57, periodically running a group of pulse arc current of a predetermined pulse width τ and a period $C_A$ causes the molten droplet produced on the wire electrode to go through "growth of molten droplet" alternately with "the separation of the molten droplet" in a regular manner as shown in FIG. 57 in synchronism with the pulses. In other words, the sufficient amount of a molten droplet on the wire electrode produced at the beginning of a group of pulses are constricted, the constriction of the molten droplet is further developed to separate the molten droplet from the electrode, then after the molten droplet has separated from the electrode, another molten droplet will grow on the tip of the wire electrode due to pulses, while being lifted upwardly. During the subsequent base period, the lifted molten droplet on the tip of wire will hang and hold the shape of the molten droplet till a group of pulses are supplied.

A pulse arc welding apparatus of the aforementioned arc welding apparatus in which the arc current is a pulse current group formed of a plurality of pulses, will now be described with reference to FIGS. 56 and 57. FIG. 56 is a general block diagram of a prior art pulse arc welding apparatus.

An arc welding power supply for supplying current comprises the following elements. Reference numeral 1 is an invertor drive circuit which converts a three phase a-c voltage into a predetermined frequency to output it to a transformer 3. Reference numeral 2 is an invertor drive circuit for driving the invertor circuit 1. Reference numerals 4A and 4B are diodes for rectifying the transformed invertor-output to produce an arc current consisting of pulse currents. Reference numeral 51 is a welding torch, numeral 52 is a wire electrode supplied between supply rollers from the wire reel toward the base metal to be welded 54, the numeral 7 is a voltage detector for detecting an arc voltage, and the numeral 6 is a current detector for detecting the arc current. Reference numeral 9 is a wire-supplying rate setting device for setting the wire-supplying rate, numeral 10 is a wire-supplying device for supplying the wire electrode 52 to the base metal 54 to be welded, numeral 11 an average voltage setting device for setting an average arc voltage. Reference numeral 8 is a pulse current waveform control circuit for setting a group of pulse currents to output them as an arc current. The control circuit 8 includes a pulse waveform shaper 81, a pulse-group period $C_B$ setting device 82, a pulse group duration X setting device 83, a pulse group waveform setting device 84, a pulse width τ setting device 85, a pulse period $C_A$ setting device 86, an adder 89 for adding the produced pulse current group to the base current supplied by a base current outputting device 88, a comparator 89 for comparing the detected arc current with the pulse current group output, and a pulse current outputting device 81a.

FIG. 57 illustrates how the molten droplet undergoes its states when welding is performed by the use of the aforementioned pulse arc current group waveform. In the figure, $I_P$ is a pulse peak current, τ is a pulse width, $T_A$ is a time interval between pulses within a group X of pulse currents, $I_B$ is a base current, $T_B$ is a repetitive period between the groups X of pulse currents, and $C_B$ is a repetitive period of the group X of pulse currents.

The operation of the prior art apparatus will now be described.

First of all, the pulse waveform shaper 81 receives a pulse-group waveform signal from the pulse group waveform setting device 84, a pulse width τ signal from the pulse width τ setting device 85, and a pulse period $C_A$ signal from the pulse period $C_A$ setting device 86, respectively. The pulse-group period $C_B$ setting device 82 sends out a pulse-group period $C_B$ signal to the pulse waveform shaper 81 and the pulse-group duration X setting device 83 a pulse-group duration X signal. The pulse waveform shaper 81 shapes the pulse-group signal having a specific pulse group waveform and a pulse period $C_A$ into an intermittent-group-of-pulses waveform as shown in FIG. 57 on the basis of the aforementioned pulse-group period $C_B$ signal and pulse-group duration X signal, which is then further shaped by the base current outputting device 88 into a waveform in which the base current $I_B$ signal is superposed (FIG. 57). The thus shaped pulse current-group signal and the current signal detected by the current detector 6 are inputted into the comparator 89 so as to transmit the invertor drive signal in accordance with the magnitude relation between the pulse current group signal and the detection current signal from the invertor drive circuit 2 to the invertor circuit 1, thereby driving the invertor. By driving the invertor, a group of pulse arc currents as shown in FIG. 57 are supplied to the weld zone.

The arc load 5 is being continuously supplied with the wire electrode 52 by a motor (not shown) as well as the group of pulse arc currents. Thus, the group of pulse currents creates a pulse arc discharge 53 between the wire 53 and the base metal 54 to be welded. This pulse arc discharge 53 causes both the tip of the wire electrode 52 and the base metal 54 to melt. The melted tip end of wire electrode 52 falls successively onto the molten pool of the base metal 54, thus performing welding. Therefore, the wire electrode 52 is consumed continuously. The above-described motor runs to continuously supply the welding torch 51 with the wire electrode 52 to replenish the electrode being consumed.

The high frequency characteristics of the above-described pulse arc current waveform $I_P$ will now be described with reference to FIG. 57. The narrow pulse width τ of each pulse and the intermittent pulse current within the pulse current-group X cause variations of electromagnetic force in accordance with the application of pulse currents. Then, most of the force acting on the molten droplet 52a produced on the tip of wire electrode 52 is due to the electromagnetic force created by the pulse peak current $I_P$ while the pulse current is flowing. When the pulse current is not flowing, forces such as reaction against the electromagnetic force during energization by pulse current, the surface tension of molten droplet, or weight are much larger than the electromagnetic force due to the base current. These forces act as a pinch force on the molten droplet 52a. Thus, this means that the molten droplet 52a produced on the tip of the wire electrode 52 vibrates at the frequency of the pulse current-group X. The vibration of the molten droplet 52a causes an early "constriction B" at the boundary of the wire electrode and the molten droplet which conventionally was difficult to be constricted at pulse peak current $I_P$. This facilitates the separation of the molten droplet from the electrode.

In welding, forming the molten droplet into fine particles with the aid of the pulse current-group X and having the fine particles transferred onto the base metal in a regular manner, results in a uniform bead. Thus, it is necessary to repeat at a predetermined period $C_B$ the pulse current-group X which is formed of a plurality of pulse currents having a predetermined pulse interval $T_A$ and a pulse width τ.

When arc welding is performed with the arc-creating wire electrode moving in a predetermined direction above the base metal, the distribution of magnetic field formed in welding-area varies in accordance with the path through which the current flows, i.e., from welding torch to arc, from arc to weldment. In other words, the distribution of magnetic field which depends on the shape of welded joint and the location of ground point, will vary from case to case. A magnetic force produced by an arc current in the distributed magnetic field will act on the arc to cause a magnetic blow phenomenon such that the arc is tilted against the base metal. As depicted by (A-1) to (C-1), (A-3) to (C-3) in FIG. 58, the magnetic field blow phenomenon causes the arc length to be longer and causes the regular separation of molten droplet to be difficult for the reason that the molten droplet is lifted by the deflected arc. In order to solve this kind of problem, and to make the instantaneous arc length equal to an aimed arc length according to a target arc length signal. Thus, the arc current through the wire electrode is decreased to reduce melting capacity as well as the magnetic force which is proportional to the square of the arc current I is reduced to alleviate the lift of the molten droplet due to magnetic field blow.

As for short circuiting arc welding, as depicted by (S1a) to (S3a) shown in FIG. 59, when the molten droplet grown on the tip of the wire electrode is pushed up by the arc deflection due to magnetic blow, the timing at which the molten droplet is short-circuited varies, disturbing the repetition period of short-circuiting and arc.

In order that the arc current is controlled to retard the lift of molten droplet due to magnetic blow, the instantaneous arc lengths need to be controlled so as to be the same as the target arc length signal. This is achieved by reducing the arc current through the wire electrode to decrease the melting capacity thereof and to weaken the magnetic force proportional to the square of arc current I, thereby retarding the lift of the molten droplet due to magnetic blow.

However, when the pulse arc welding is to be performed in the shielding gas of 100% $CO_2$ gas, a small pulse peak current $I_P$ will cause the molten droplet produced at the tip of wire electrode to be lifted by the pulses, the molten droplet not being able to leave the electrode till it is too large. As a result, the molten droplet on the tip of wire electrode becomes large to be short-circuited to the weld zone. This causes a large amount of spatter to scatter around the welding site during welding process or causes the undercut, a defective bead. Additionally, higher pulse peak currents $I_P$ leads to bulky size of the power supply of the apparatus and more weight, resulting in an abrupt increase in costs.

In order to solve this problem, Japanese Patent Application No. 62-309388 and No. 63-265083 have been filed, in which one pulse current waveform is divided into a group of pulse currents which have more than one pulse width and are disposed at more than pulse intervals; this group of pulses is repeated with a period therebetween and a continuous base current is superposed thereto to form a discharge current waveform; thus, the lift exerted on the molten droplet produced on the tip of wire electrode is reduced to convert the molten droplet, which is to be transferred onto the weld zone, into fine particles, thereby allowing the regular transfer of the molten droplets.

However, for this pulse welding apparatus, if the molten droplet is late to leave the electrode due to variations of welding conditions and external disturbances, the molten droplet on the tip of wire electrode cannot grow sufficiently during the next period causing difficulty for the molten droplet to leave the electrode or becomes irregular, the quality of welding being impaired. Thus, the factors of variations of the welding conditions need to be controlled and measures for preventing external disturbances are necessary.

It is also necessary to vary the speed, at which the wire is supplied, in accordance with the base metal (metal to be welded). In which case, the pulse current group waveform is also required to be varied when the wire-supplying speed is varied. Since only the period of the pulse currents group is varied in accordance with the wire-supplying speed, even when the wire-supplying speed at which the wire electrode is supplied is varied below a certain value, or the wire-supplying speed or the pulse group period is varied, the interval between the respective pulses within a pulse group remains the same. Therefore, if the pulse group period becomes longer when the wire-supplying speed decreases, the rate of growth of molten droplet due to the pulse current group during the pulse group period becomes higher than the wire-supplying speed, causing the arc-length between the wire electrode and the base metal to be longer than an allowable value. This causes the base metal itself to be melted, resulting in too wide a melted width of the base metal. The wide melted width contributes to undercut; welding quality is impaired.

Likewise, the average voltages of pulse current group waveform higher than a predetermined value cause the peak value of the pulse group current waveform during the pulse group period to be higher. This results in higher current values per unit time and higher rate of growth of the molten droplet produced by the pulse current group, and the arc length between the wire electrode and the work tends to be longer than the predetermined value. As a result, the molten droplet width of the base metal, i.e., a portion of the base metal melted by the arc becomes too wide, being a source of undercut and impaired welding quality.

Additionally, the amount of melted electrode after the molten droplet leaves the wire electrode is greatly different from that before the molten droplet leaves the wire. Thus, the magnetic force produced by the pulses is not large enough to lift the molten droplet up before the molten droplet leaves the electrode, but is large enough to lift a small amount of molten droplet left on the tip of wire after the molten droplet has left the wire. While such a difference exists in the molten droplet-lifting effect, the aforementioned pulse welding apparatus has a fixed pulse interval, fixed pulse width, and fixed pulse period within the pulse group throughout the respective processes during welding, i.e., from growth of molten droplet to separation of the molten droplet. Thus, the molten droplet left on the wire tends to easily be lifted after the previous molten droplet has left the electrode as well as the arc length between the wire electrode and the base metal tends to be longer than the allowable value. This causes the base metal itself to be melted, resulting in too wide a melted width of the base metal. The wide melted width contributes to the undercut, causing poor welding quality.

In other words, such a lift of the molten droplet causes the quality of welding bead to be affected by changes in welding conditions or by external disturbances, as well as causes period required for the globule to leave the electrode to vary. This leads to the difficulty in obtaining uniform welding result.

With the pulse interval, pulse width, and pulse period, all being fixed, the melted portion of the wire electrode after the globule has left the electrode tends to be lifted by the pulses, thus the arc length tending to vary. Therefore, the period at which the globule leaves the electrode varies causing a difficulty in maintaining regular separation of globule to obtain uniform welding bead.

In order to hold the instantaneous arc length to a value corresponding to the target arc length, if the lift of globule due to the magnetic blow is to be retarded by decreasing the arc current through the wire electrode to decrease melting capacity of the electrode as well as the electromagnetic force proportional to the square of arc current I, the decreased arc current in turn retards the growth of globule on the tip of wire electrode, resulting in the delay of separation of molten droplet from the tip of wire electrode and disturbing the regular separation of molten droplet to impair the quality of welding bead.

According to the short circuiting arc welding apparatus shown in FIG. 53b, in order to hold the instantaneous arc length to the target arc length, if the lift of molten droplet due to the magnetic blow is to be retarded by decreasing the arc current through the wire electrode to decrease melting capacity of the electrode as well as the electromagnetic force proportional to the square of arc current I, the decreased arc current retards the growth of molten droplet on the tip of wire electrode, the transfer of molten droplet from the electrode to the base metal to be welded is not carried out by short-circuiting during the next short-circuiting period, causing the spatter to occur and eventually being difficult to obtain good welding bead.

If the molten droplet is late to leave the electrode due to variations of welding conditions and external disturbances, the molten droplet on the tip of wire electrode cannot grow sufficiently during the next period causing difficulty for the molten droplet to leave the electrode or becomes irregular to impair the quality of welding. Thus, the control of the factors of variations in welding conditions is necessary and adequate measure is required to prevent external disturbances. This leads to a complicated welding control.

Objects of the present invention are as follows:

An object of the present invention is to retard the variation of the time required for the molten droplet to leave the electrode to perform high quality welding.

An object of the present invention is to provide a pulse welding apparatus in which even if the wire-supplying speed varies, the arc length can be controlled below an allowable value where no undercut is developed, thereby enabling good welding.

An object of the present invention is to provide a pulse welding apparatus in which even if welding is to be carried out at low wire-supplying speeds and with high average voltages, the arc length can be maintained below an allowable value where no undercut is resulted, thereby enabling good welding.

An object of the present invention is to provide a pulse welding apparatus in which even if the welding is to be performed with long pulse group periods, the arc length can be controlled below an allowable value where no undercut is resulted, thereby enabling good welding.

An object of the present invention is to provide a pulse welding apparatus in which even if the molten droplet leaves the electrode at different separation timing, the arc length can be controlled below an allowable value where no undercut is resulted, as well as uniform welding beads are resulted in.

An object of the present invention is to provide a pulse welding apparatus in which the separation period of molten droplet is prevented from varying due to long arc length after the molten droplet has left the electrode to thereby carry out regular welding so as to obtain uniform welding beads.

An object of the invention is to provide an arc welding apparatus in which the separation of molten droplet is prevented from being irregular due to magnetic blow phenomena and the melting capacity of molten droplet at each period is ensured to make separation period regular for good arc welding.

An object of the invention is to provide an arc welding apparatus in which short-circuiting of molten droplet is prevented from being irregular due to magnetic blow phenomenon as well as the melting capacity of molten droplet during arc period is ensured to implement a regular short-circuiting period for good short-circuiting welding.

An object of the invention is to provide an arc welding apparatus in which even if the molten droplets vary in separation timing, good welding can still be carried out in accordance with the varying separation timing of the molten droplet.

DISCLOSURE OF THE INVENTION

A significant feature of a first aspect of the present invention resides in the waveform of a discharge current comprising:

a group of pulse currents including a plurality of pulse currents, the pulse currents having more than one pulse width and more than one pulse peak value and being spaced by more than one pulse interval, the average current during pulse group becoming a maximum peak value during a pulse group duration at a predetermined time after the beginning of outputting the pulses and the group of pulse currents being repeated periodically to form a train of the group of pulse currents; and a base current to which the train of the group of pulse currents is superposed, so that even if the welding conditions vary or the external disturbances occur, the time at which the molten droplet leaves the electrode is set in accordance with the variation and disturbances to thereby retard the effect thereof for good welding result.

A second aspect of the present invention comprises:

a plurality of pulse currents which have more than one pulse width and pulse peak value, the pulse periods of the plurality of pulse currents being different such that the pulses are dispersed by different pulse intervals in accordance with the wire-supplying speed.

A third aspect of the present invention comprises:

a plurality of pulse currents which have more than one pulse width and pulse peak value, the pulse widths of the plurality of pulse currents being different and the pulses are dispersed by different pulse intervals in accordance with the wire-supplying speed.

A fourth aspect of the present invention comprises:

a group of pulse currents consisting of a plurality of pulse currents which have more than one pulse width and pulse peak value and are spaced by more than one pulse interval, the pulse widths of the plurality of pulse currents being different and the pulses are dispersed with different pulse period and pulse widths in accordance with the wire-supplying speed; and a discharge-current waveform formed by superimposing a continuous base current to the periodically repeated pulse currents group above-described, so that the rate of growth of molten droplet can be controlled in accordance with the arc length to obtain good welding result.

A fifth aspect of the present invention comprises:

a group of pulse currents including a plurality of pulse currents which have more than one pulse width and pulse peak value and which are spaced by more than one pulse interval, the average current becoming a maximum peak value during a period of pulse group at a predetermined time after the beginning of outputting the pulses and the slope of the average current value that determines the peak value being variably controlled in accordance with the wire-supplying speed or average voltage value.

A sixth aspect of the present invention comprises:

pulse currents whose values are a peak value after elapse of a predetermined time, the slope of average current that determines the peak value in accordance with the wire-supplying speed or an average voltage being variably controlled; and a discharge-current waveform formed by superimposing a continuous base current to the periodically repeated plurality of pulse currents. Therefore, the scope of the pulse currents or pulse group current waveform of a pulse welding apparatus where the average current becomes a peak value after elapse of a predetermined time is variably controlled in accordance with the setting of wire-supplying speed and average voltage. Thus, the arc length can be controlled below a predetermined value to prevent undercut, so that good welding result is obtained.

A seventh aspect of the present invention comprises:

a group of pulse currents including a plurality of pulse currents which have more than one pulse width and pulse peak value and which are spaced by more than one pulse interval in accordance with the pulse group period; and a discharge-current waveform in which a train of the above-described group of pulse currents periodically repeated is superposed to a base current, so that the rate of growth of molten droplet can be controlled in accordance with the pulse group period to thereby maintain the arc length below a predetermined value for good welding result.

An eighth aspect of the present invention is provided with, in addition to the above-described seventh aspect of the invention, means that maintains the amount of energy or the amount of charge of pulse current group during pulse group period to a substantially constant value. Thus, even if the pulse period within the pulse current group is varied, the amount of energy over an entire pulse group or the amount of charge of the pulse current group is maintained substantially constant, which in turn maintains the melting capacity of molten droplet by the pulse group to a substantially constant value. This allows welding operation with more regular period of separation of molten droplet.

A ninth aspect of the present invention comprises:

a group of pulse currents including a plurality of pulse currents which have more than one pulse width and pulse peak value and which are dispersed by varying at least one of pulse interval, pulse width, and pulse period in synchronism with the separation of molten droplet on the tip of wire electrode; and a discharge-current waveform formed by superposing a continuous base current to the above-described pulse current group periodically repeated. Thus, the arc length is prevented by extending a pulse interval (time during which only the base current flows) to elongate a pulse pause period so as to return the lifted molten droplet to its previous position, from becoming long due to the fact that the melted wire left on the wire is lifted after the molten droplet has left the electrode, thus the extended pulse interval causes the lifted molten droplet to return to its previous position. Alternatively, by setting narrower pulse widths or longer pulse periods, the arc length is prevented from becoming long due to the fact that the melted wire left on the wire is lifted after the molten droplet has left the electrode, so that the lifting force of pulses is reduced to control the rate of growth of molten droplet. This maintains the length of the developed arc to a value below a predetermined value allowing good welding result as well as repetitive regular separation of molten droplet for uniform bead.

A tenth aspect of the present invention comprises:

a group of pulse currents including a plurality of pulse currents which have more than one pulse width and pulse peak value and which are dispersed by varying at least one of pulse interval, pulse width, and pulse period at a predetermined time after beginning of supplying pulses of the pulse group; and a discharge-current waveform formed by superposing a continuous base current to the above-described pulse current group which is periodically repeated. Thus, the detection of separation is not required and the miscontrol due to misdetection by the separation detector is eliminated. By extending pulse interval, the arc length is prevented from becoming long due to the fact that the melted wire left on the wire is lifted after the molten droplet has left the electrode, thus the extended pulse interval allows the lifted molten droplet to return to its previous position. Alternatively, by setting narrower pulse widths or longer pulse periods, the arc length is prevented from becoming long due to the fact that the melted wire left on the wire is lifted after the molten droplet has left the electrode, the lifting force of pulses is reduced to control the rate of growth of molten droplet. This maintains the length of the developed arc to a value below a predetermined value, allowing good welding result as well as repetitive regular separation of molten droplet for uniform bead.

An eleventh aspect of the present invention is to provide an arc welding apparatus in which an arc current formed by pulse currents is supplied between a base metal and a welding wire electrode supplied toward the base metal, and the molten droplet grown on the tip of the welding wire electrode is transferred onto the welding point of the base metal, the apparatus comprising:

a separation detector for detecting the separation of molten droplet from the tip of base metal to output a separation signal; and a pulse current waveform control circuit for forming pulse currents as an arc current and control the pulse currents to have levels increasing from a first pulse toward a peak-valued pulse and levels decreasing from the peak-valued pulse toward a last pulse.

Thus, the electromagnetic pinch force of pulse arc discharge is increased gradually to reduce delay in separation of the molten droplet. The lift of molten droplet by pulse currents is retarded when the molten droplet again grows on the tip of wire after confirmation of the separation of molten droplet so that the effect of the delay of separation of molten droplet on the separation during the next pulse group, reducing the variation of separation timing to obtain good welding result and stable welding.

A twelfth aspect of the present invention is provided with, in addition to the above-described eleventh invention comprises:

means for specifying the amount of charge of arc current that is supplied to the separation detector for detecting the separation of molten droplet, and for starting measurement of the amount of charge of the pulse current upon the separation detection signal;

arc current supplying control unit for controlling the supply of arc current by resetting a means, which shuts off the pulse current, to measure the amount of the above-described charge when the measured amount of charge and above-described specified value of charge become substantially constant. Thus, the separation of molten droplet is prevented from becoming irregular due to magnetic blow phenomenon to thereby ensure the required amount of melting capacity of molten droplet and the regular separation period for good arc welding.

A thirteenth aspect of the present invention is provided with, in addition to the above-described twelfth invention, a short-circuit/arc deciding device for outputting a short-circuiting signal when the molten droplet is short-circuited to the base metal to be welded and for outputting a separation signal when the separation of short-circuited molten droplet is recognized;

means for controlling the above-mentioned pulse current value in accordance with the arc length corresponding to the variation in the shape of or in the growth of molten droplets, the means further controlling the pulse width, the pulse period or the pulse interval according to the growth of molten droplets or the variation in the shape of molten droplets and the means specifying the amount of charge of pulse current that is supplied during arc period after the molten droplet has left the electrode, and the means measuring the amount of charge on the basis of the decision of separation timing of the above-mentioned short-circuit arc decision device or the separation time detected by the separation detector; and arc current supplying control unit for controlling the supply of arc current by reducing the arc current when the measured amount of charge and the above-described specified value of charge become substantially constant and then resetting the above-described measuring means which measures the amount of charge. Thus, in addition to the effect derived from the twelfth invention, the irregular short-circuiting can be prevented as well as the melting capacity during arc period of molten droplet is ensured. The regular period of short-circuiting is ensured for good short-circuiting type welding. Further, the pulse arc welding and the short-circuiting arc welding can be carried out in combination, finding its applications in a wide variety of welding operations.

BRIEF DESCRIPTION OF THE DRAWINGS

FIG. 3 is a pulse group current waveform diagram according to an embodiment of the first invention;

FIG. 4 is a pulse group current waveform diagram showing another embodiment of the first invention;

FIGS. 6-8 illustrate another embodiment of a second invention, FIG. 6 is a block diagram similar to that in FIG. 1, FIGS. 7 and 8 are current waveform diagrams of a single pulse;

FIGS. 53a and 53b are block diagrams showing conventional short-circuiting arc welding apparatus;

BEST MODE FOR CARRYING OUT THE INVENTION

Figure 1:
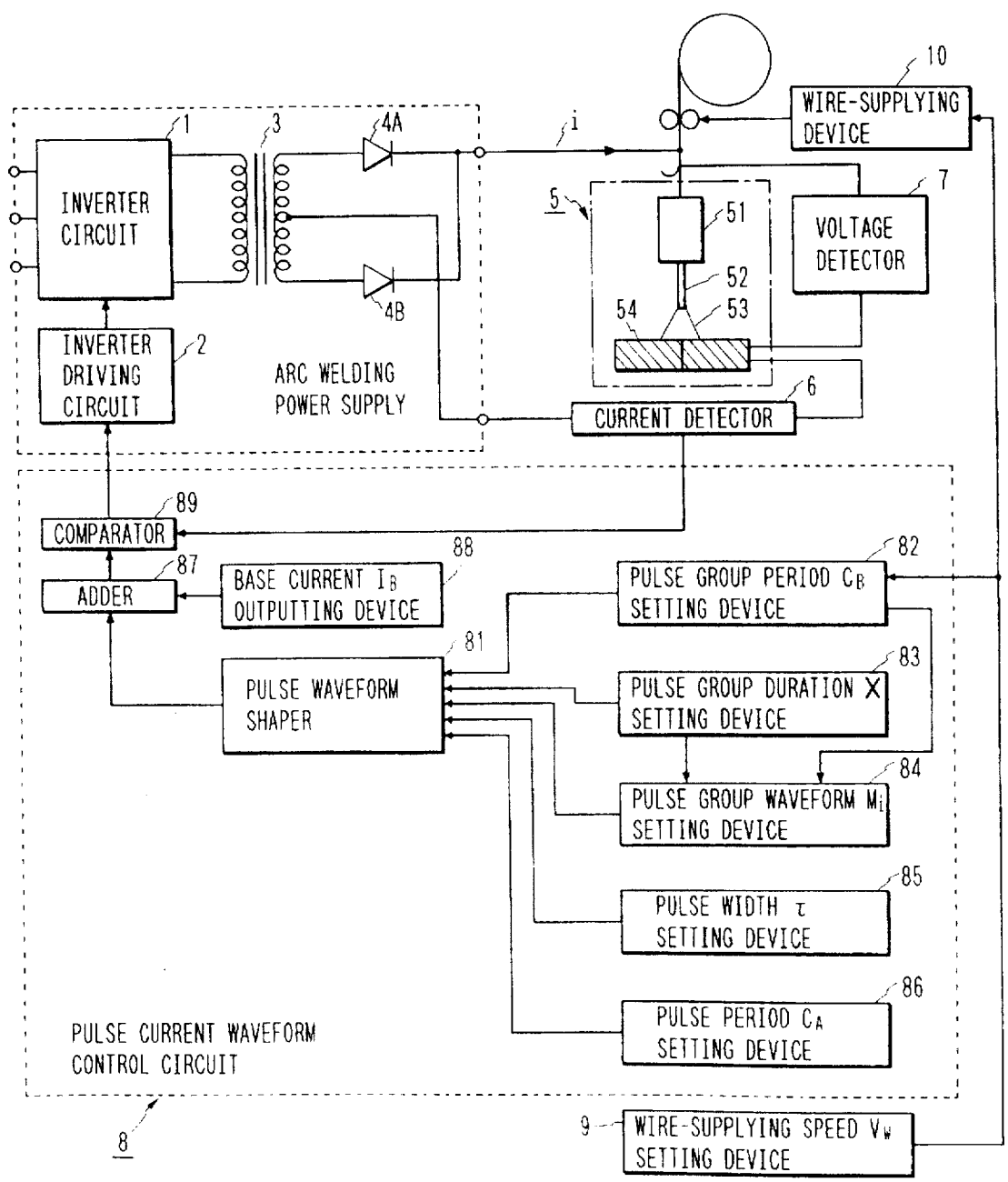
FIG. 1 is a block diagram showing an embodiment of a pulse welding apparatus according to a first embodiment.

An embodiment of a pulse welding apparatus according to a first invention will now be described with reference to the drawings. FIG. 1 is a block diagram of the entire embodied apparatus. In the figure, the reference numeral 1 is an invertor circuit section driven and controlled by an invertor drive circuit. The reference numeral 3 is a high frequency transformer, and 4A and 4B denote high frequency diodes. Reference numeral 51 is an arc load section formed of a torch 51, a wire electrode 52 in the form of a wire that is supplied from a wire reel, an arc discharge 53 and a base metal 54 to be welded. The welding torch 51 is supplied with a desired pulse group current waveform i which is under invertor control by the aforementioned invertor circuit section 1 via the high frequency transformer 3 and the high frequency diodes 4A and 4B so as to perform a welding operation.

The reference numeral 6 is a current detector for detecting the aforementioned pulse current, 7 is a voltage detector for detecting a voltage across the electrodes, 8 a pulse current waveform control circuit which controls is the waveform of pulse current outputs by controlling the invertor circuit 1 in accordance with the current detected by the current detector 6 that detects the pulse group current i. The pulse current waveform control circuit 8 is provided with a pulse waveform shaper 81, a pulse group period $C_B$ setting device 82 for setting the pulse group period $C_B$ in accordance with the wire-supplying speed $V_W$, a pulse group period X setting device 83, a pulse group waveform Mi setting device 84, a pulse width τ setting device 85, and a pulse period $C_A$ setting device 86. The pulse current waveform control circuit 8 is adapted to output a pulse group current which is shaped by a pulse waveform shaper 81 that receives setting signals from the respective setting devices.

An adder 87 superimposes a base current $I_B$ outputted from a base current $I_B$ output device 88 to the pulse group current so as to output the superposed currents to a comparator 89 by which the pulse group current waveform from the current detector 6 is compared with the set pulse group current waveform outputted from the adder 87 to output an ON-OFF command to the invertor drive circuit 2. The reference numerals 9 and 10 denote a wire-supplying speed $V_W$ setting device for setting the wire-supplying speed $V_W$ and a wire-supplying apparatus for controlling the wire-supplying speed in accordance with the speed set by the wire-supplying speed $V_W$ setting device.

Figure 2:
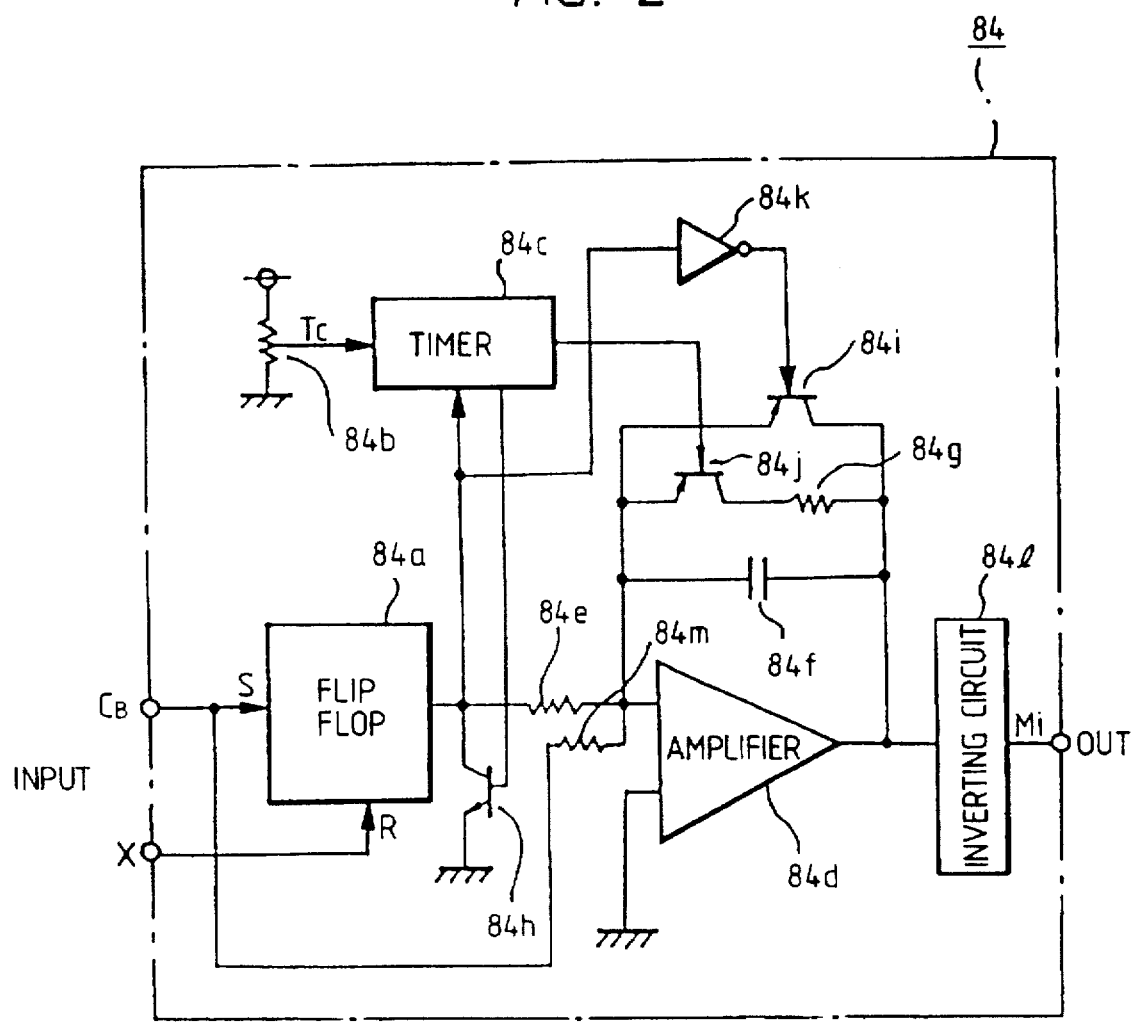
FIG. 2 is a circuit diagram showing an embodiment of a pulse envelope Mi setting device according to the first invention.

On the basis of the pulse group period $C_B$ signal from the pulse group period $C_B$ setting device 82 and the pulse group duration X signal from the pulse group duration X setting device 83, the aforementioned pulse group waveform Mi setting device 84 sets an envelope Mi signal of a hill-shaped pulse group current i outputted from the arc load section 5. The pulse group waveform Mi setting device 84 acts as a smooth current waveform generator for generating a signal representing the smoothed current waveform of the group of pulses. FIG. 2 shows a specific circuit example of the pulse group Mi setting device 84.

As shown in FIG. 2, the pulse group Mi setting device 84 includes a flip flop 84a which receives the aforementioned pulse group period $C_B$ signal and the pulse group duration X signal to output an H signal during the pulse group duration, a timer that operates on the basis of the set value by a variable resistor 84b which is used to set the time from beginning of outputting pulse group till pulse peak value is reached, i.e., previously mentioned separation time $T_C$ of molten droplet, an OP amplifier 84d for amplifying the output from the flip flop 84b, resistors 84e and 84m and a capacitor 84f that form a charging circuit when the output of the OP amplifier increases, a resistor 84g that forms together with the capacitor 84f a discharging circuit when the output of the OP amplifier decreases, an inverting buffer 84k, and an inverting circuit 84l.

The resistance R2 and R1 of the resistors 84e and 84m and the capacitance C of the capacitor 84f, are selected such that the time constant for charging satisfies a relation R1C<R2C.

The production of the hill-shaped pulse envelope Mi by the aforementioned pulse group waveform Mi setting device 84 will now be described. The pulse group period $C_B$ signal from the pulse group period $C_B$ setting device 82 is inputted into a set terminal S of the flip flop 84a while the pulse group duration X signal from the pulse group duration X setting device 83 is inputted into a reset terminal R of the flip flop 84a. Then, the flip flop 84a outputs an H signal during the pulse duration. The output of the flip flop 84a is inputted into an OP amplifier 84d, timer 84c, and inverting buffer 84k. When the output of the flip flop 84a is inputted into the OP amplifier 84d, the pulse group period $C_B$ signal is converted instantly into an integrated output by a charging circuit so that the minimum pulse peak current $I_P$-$I_B$ is run so as to produce the constriction of the molten droplet when the pulse current is applied. Thus, the charging circuit formed of the resistor 84e and the capacitor 84f integrates the pulse group period $C_B$ till a time $T_C$ is reached so as to superimpose integrated value to $C_B$. When the time $T_C$ is reached, the transistors 84j and 84h are turned on by the timer 84c such that the output signal of the OP amplifier 84d decreases through the resistor 84g. Further, when the flip flop 84a turns to an H level, the inverting buffer 84k outputs the H signal causing the transistor 84i to turn on, which in turn causes the output signal of the OP amplifier 84a to immediately become zero. The output of the OP amplifier 84a is inverted by the inverting circuit 84l into the envelope Mi signal of hill-shaped before outputting it to the pulse waveform shaper 81.

The operation of the embodiment will now be described with reference to the waveforms in FIG. 3. In the figure, $T_A$ is the pulse interval within the pulse group duration X, $T_B$ is a repetition period within the pulse group duration X. The pulse group period $C_B$ setting device 82 sends to the pulse waveform shaper circuit 81 the pulse group period $C_B$ signal, the pulse group duration X setting device 83 the pulse group duration X signal, the pulse group waveform Mi setting device 84 the pulse group waveform (envelope) Mi signal, the pulse width T setting device 85 the pulse width T signal, and the pulse period $C_A$ setting device 86 the pulse period $C_A$ signal, respectively.

The pulse waveform shaper circuit 81 determines on the pulse envelope Mi the pulse values of respective pulse signals having a pulse width τ and a pulse period $C_A$, and shapes into the intermittent pulse group waveform as shown in FIG. 3 on the basis of the aforementioned pulse group period $C_B$ signal and pulse group duration X signal. The thus shaped intermittent pulse group waveform is superposed the d-c current $I_B$ from the base current $I_B$ output device 88. The pulse current signal is inputted together with the current signal detected by the current detector 6 to the invertor drive circuit 2 which outputs the invertor drive signal in accordance with the pulse arc current waveform i shown in FIG. 3 to the invertor circuit section 1 to operate the invertor.

Driving the invertor causes a shaped alternating current waveform to be outputted to the high frequency transformer 3. The output of the transformer 3 is rectified into a d-c waveform by the high frequency diodes 4A and 4B to produce the arc current waveform i which is supplied to the weld zone or arc load 5.

The arc load 5 is continuously supplied with the wire electrode 52 by a motor (not shown) together with the pulse arc current waveform i. Therefore, the pulse arc current waveform i produces the pulse arc discharge 53 across the wire electrode and base metal 54 so as to weld the base metal 54 and the tip of wire electrode 52 together be means of the pulse arc discharge 53. The melted portion of the wire electrode 52 is allowed to successively drop onto the melted portion of the base 54, thus carrying out welding operation. As a result, the wire electrode 52 is of course consumed continuously and thus the above-mentioned motor continuously supplies the wire electrode 52 to the welding torch 51.

According to the above-described embodiment, by periodically running pulse group arc current having a predetermined pulse width τ and a period $C_A$, the molten droplet produced on the wire in synchronism with the pulse group undergoes the constriction and melting of wire due to the arc heat and the pinch force produced by arc discharge current in accordance with the pulse frequency of pulse group. That is, the growth of molten droplet is promoted to easily separate from the electrode. After the molten droplet has separated from the electrode, a new molten droplet grows on the tip of wire electrode being lifted by the pulse group. Then, during the subsequent base duration, the lifted molten droplet on the tip of wire hang down to serve to shape the molten droplet before the next pulse group begins, thus regularly repeating the growth of molten droplet alternately with the separation of the molten droplet from the electrode. In order to allow the molten droplet of wire electrode to leave the electrode in a regular manner, the separation timing $T_C$ starting from the application of pulse group is set by considering the variation of welding conditions and the effects of external disturbances so that the pulse peak value of pulse group becomes the maximum near $T_C$. Thus, the pulse group waveform Mi setting device operates as a timing unit for setting, based on welding conditions, the predetermined time $T_C$ occurring at any time after the beginning of outputting the group of pulse currents during the pulse group duration. Also in order to retard the lift of a new molten droplet produced after the previous molten droplet has separated from the electrode, the peak values of pulse group is reduced after $T_C$. Thus, the pinch force of pulse arc discharge becomes the maximum at the high pulse peak values, ensuring the molten droplet to leave the electrode. The pulse current waveform is formed of a plurality pulse currents and the pulse current group is periodically repeated to form a discharge current waveform. This means one pulse is divided into a plurality of pulses. Driving the pulse current causes the upward electromagnetic force due to pulse arc discharge to be intermittent, alleviating the force tending to lift the molten droplet produced on the tip of wire electrode. As a result, not only in the argon-dominated shielding gas but also in the $CO_2$ shielding gas, the molten droplet produced on the tip of wire electrode is separated easily from the electrode before it grows up to a large molten droplet.

The separation timing $T_C$ in the above-described embodiment can of course be selected to be the best in accordance with welding conditions such as the diameter of electrode and shielding gas.

While the above embodiment has been described with respect to the hill-shaped pulse group waveform in FIG. 3 where the peak value of the pulse group is gradually increased and decreases after the time $T_C$, the pulse group waveform may be arranged such that only pulses near the time $T_C$ are increased to their peak values as shown in FIG. 4.

Figure 5A:
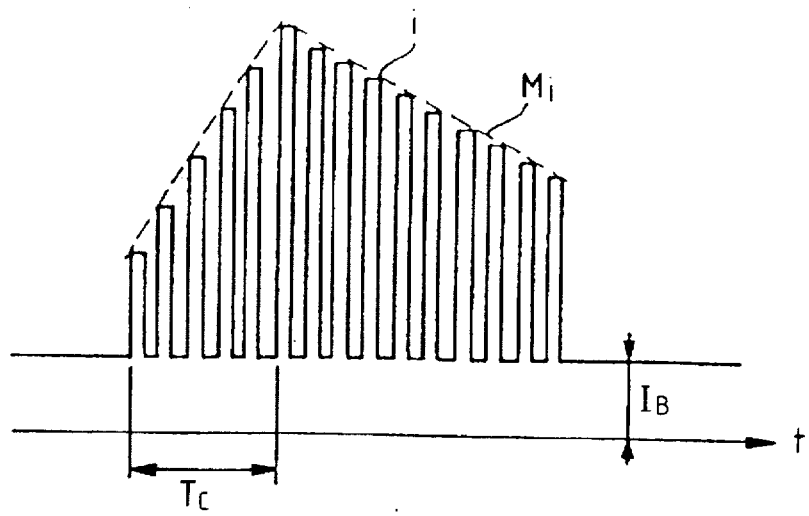
FIGS. 5a-5d are waveform diagrams illustrating a pulse modulation method of another embodiment of the first invention.
Figure 5B:
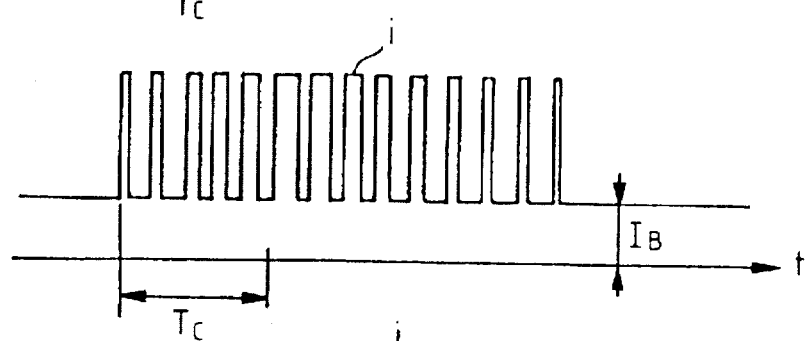
Figure 5C:
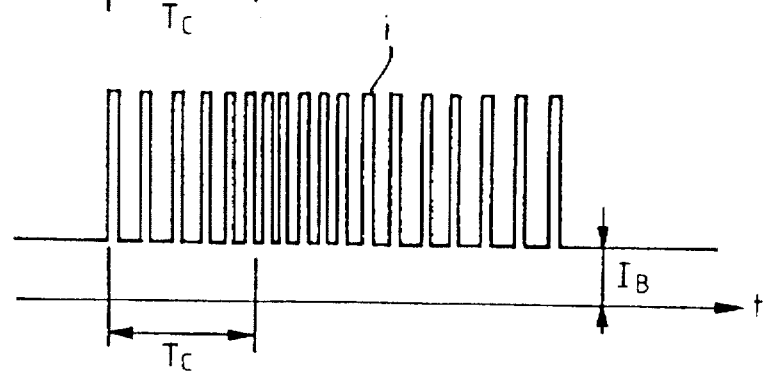
Figure 5D:
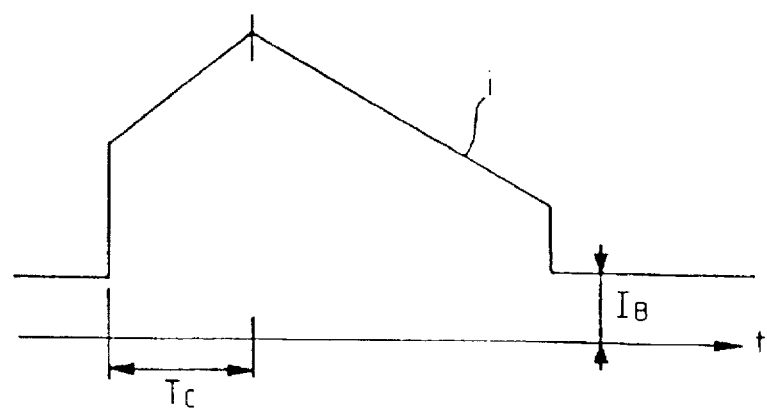

While the pulse group waveform is produced through pulse amplitude modulation shown in FIG. 5a, the pulse group waveform may be provided by the use of the pulse width modulation in FIG. 5b or the pulse frequency modulation in FIG. 5c. In any case, the average current after the set time as shown in FIG. 5d needs only to be the maximum peak value.

While the embodiment has been described with respect to a pulse arc welding apparatus using the pulse group waveform, the apparatus may be a pulse welding apparatus in which the periodic repetition of a single pulse current waveform as in the inventions shown in FIGS. 7 and 8.

Figure 6:
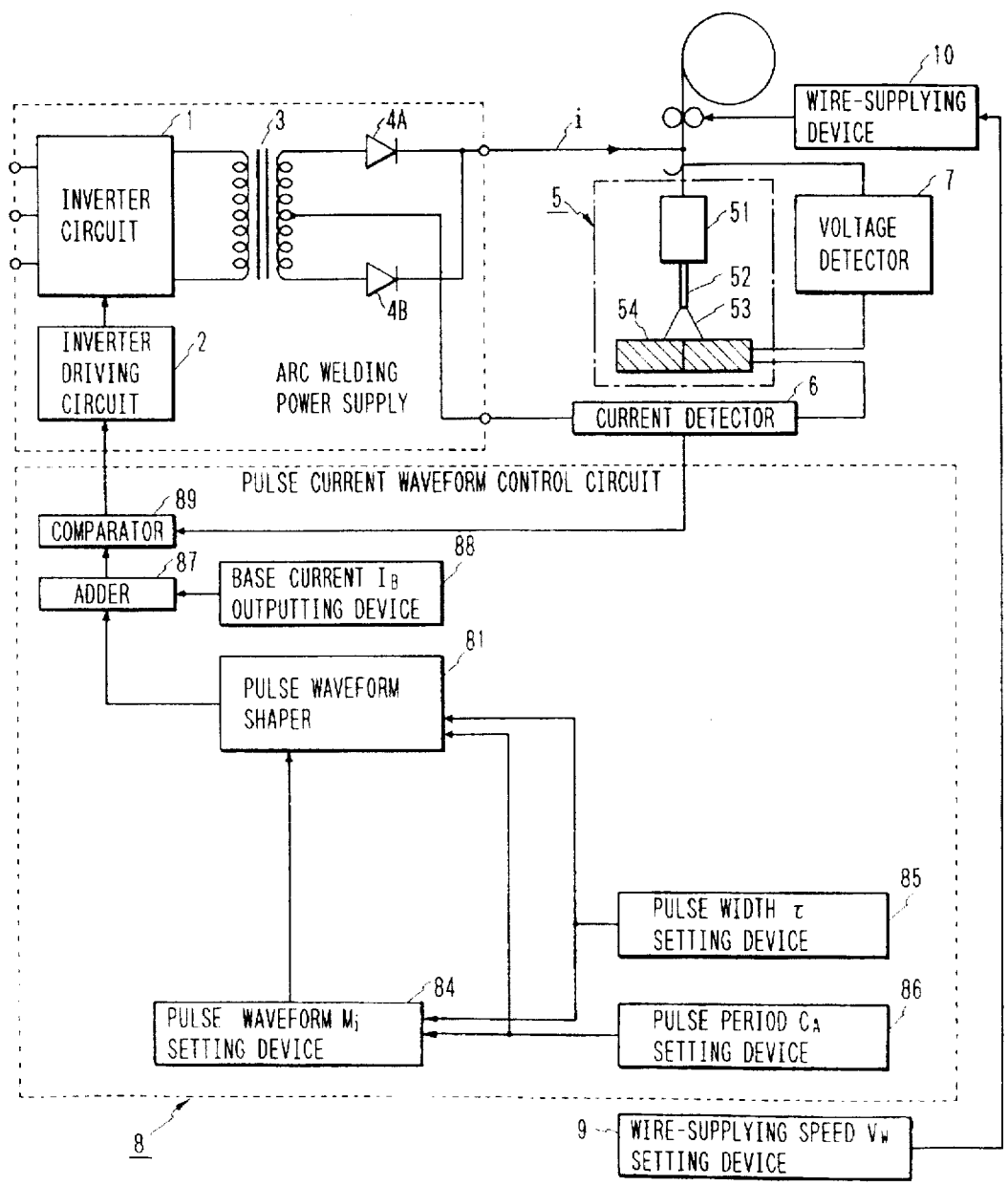

In other words, FIG. 6 shows an embodiment of a pulse welding apparatus according to a second aspect of the present invention in which pulse arc welding is carried out by the use of single pulse current shown in the above-mentioned FIG. 7. In the figure, the same reference numerals as those in FIG. 1 represent the same elements and the respective setting inputs to the pulse waveform Mi setting device 81 are supplied from the single pulse production pulse waveform setting device $84_2$, pulse width $\tau$ setting device $85_2$, and pulse period $C_A$ setting device $86_2$. The pulse waveform Mi setting device $84_2$ can take the form of the same circuit configuration as in FIG. 2. In which case, pulse period $C_A$ and pulse width $\tau$ may be supplied to the circuit in stead of the pulse group period $C_B$ and pulse group duration X.

In this embodiment, too, as in FIG. 1, the electromagnetic pinch force due to pulse arc discharge becomes the maximum due to the fact that the current value reaches its peak value after elapse of the set time $T_C$. Thus, the molten droplet is ensured to separate from the electrode at the time $T_C$ at which the pulse peak value is high. The single pulse in FIG. 8 may be used in stead of that in FIG. 7.

In the above embodiments, the welding may also be carried out in the shielding gas of mixture of argon and $CO_2$ gas so as to obtain the same effects as in the above-described embodiments.

Figure 9:
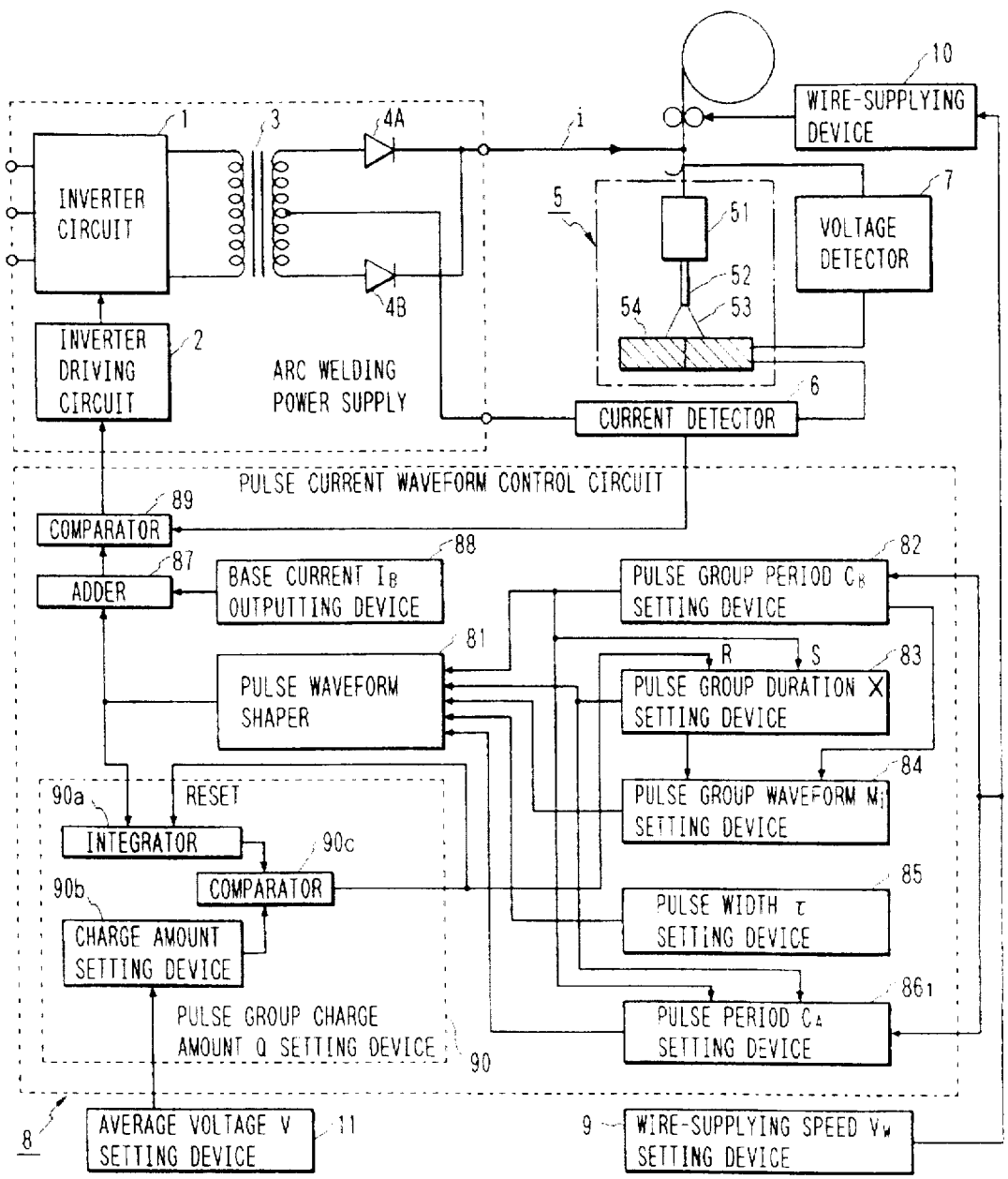
FIG. 9 is a block diagram showing an embodiment of a pulse welding apparatus according to a third invention.

FIG. 9 shows an embodiment of a third aspect of the invention. The pulse current waveform control circuit 8 of the embodiment includes a pulse group charge-amount Q setting device 90 therein. The pulse waveform shaper 81, which receives the respective setting signals from the respective setting devices, is adapted to output a shaped pulse current group, which is then superposed the base current $I_B$ outputted from the base current $I_B$ outputting device 88 by the adder 87 to subsequently be directed to the comparator 89. The comparator then compares the pulse current group waveform from the aforementioned current detector 6 with the pulse current waveform from the adder 87 to output the on-off command signal to the invertor drive circuit 2. The reference numerals 9 and 10 denote a wire-supplying speed $V_W$ setting device for setting the wire-supplying speed $V_W$ and the wire supplying apparatus for controlling the wire-supplying speed in accordance with the wire-supplying speed set by the wire-supplying speed $V_W$ setting device, respectively. The numeral 11 denotes an average voltage V setting device for setting an average voltage corresponding to the arc length.

The above-described pulse charge amount Q setting device 90 is provided with an integrator 90a for integrating the pulse current group outputted from the pulse waveform shaper 81, a charge amount setting device 90b for setting the charge amount corresponding to the average voltage V outputted from the average voltage V setting device 11, and a comparator 90c which compares the value integrated by the integrator 90a with the charge amount set by the charge amount setting device 90b and outputs a reset signal to both the integrator 90a and the pulse group duration X setting device 83 when the integrated value reaches the set charge amount. Thus, even if the pulse period $C_A$ is varied, the number of pulses within the pulse group duration X is held constant to maintain the growth of molten droplet and the regularity of separation of the molten droplet. The pulse duration X setting device 83 formed of a flip flop, which is reset by the output of the pulse group charge amount Q setting device 90, is set in synchronism with the output of the pulse group period $C_B$ setting device 82.

Figure 10:
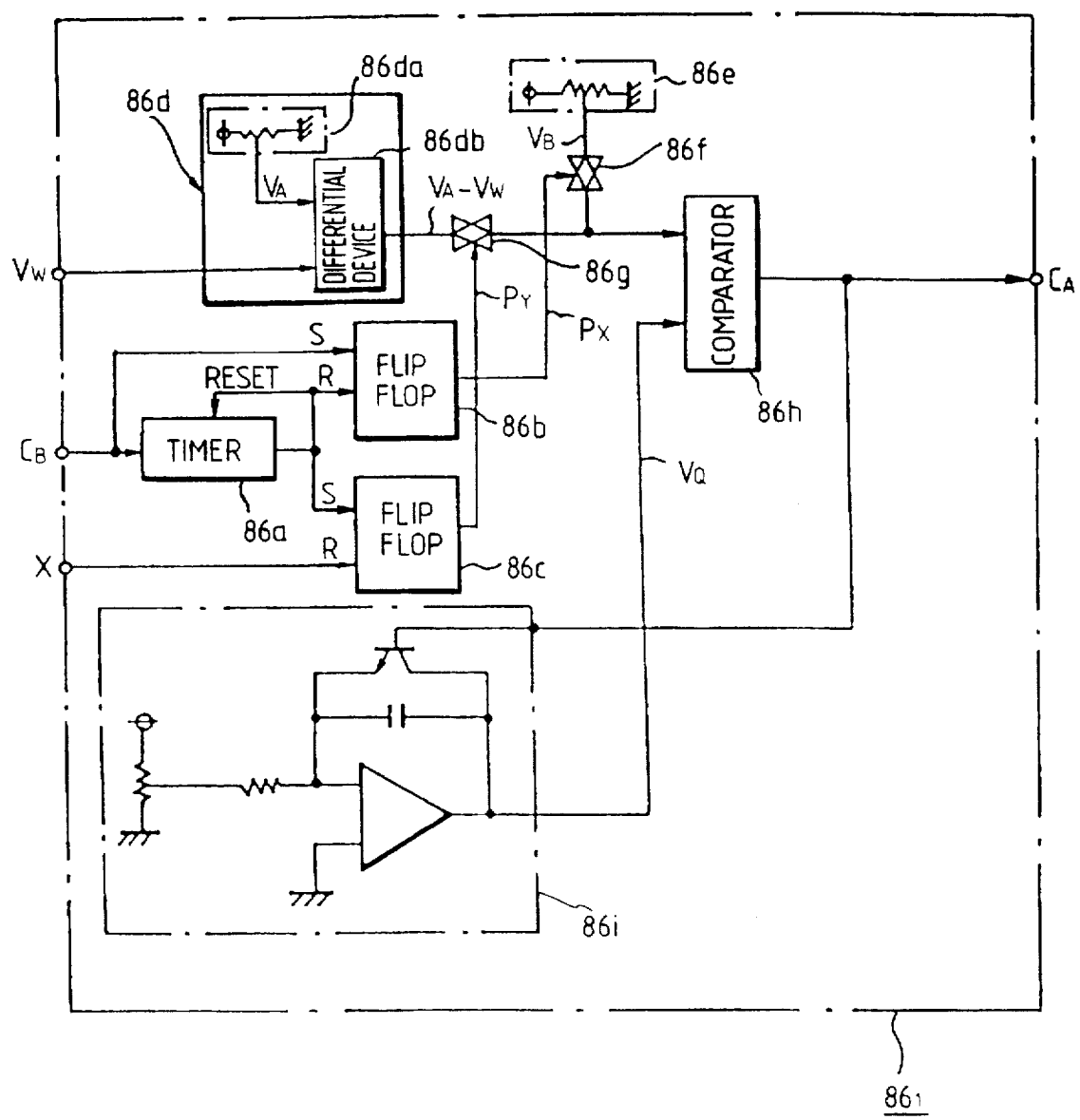
FIG. 10 is a circuit diagram of a pulse period $C_A$ setting device shown in FIG. 9.

The pulse period $C_A$ setting device 86 is used to vary the pulse period $C_A$ within the pulse group duration X in accordance with the set speed $V_W$ from the wire-supplying speed $V_W$ setting device 9. FIG. 10 shows the specific circuit example of the pulse period $C_A$ setting device 86.

As shown in FIG. 10, the pulse period $C_A$ setting device 86 includes a timer 86a which operates in response to the pulse group period $C_B$ signal to output the H level which is reset to the L level immediately after elapse of the set time $T_C$, a first flip flop 86b which is set by the pulse group period $C_B$ signal and is reset by the H level output of the timer 86a, a second flip flop 86c which is set by the H level output of the timer 86a and is reset by the pulse group duration X signal, a first and second pulse period setting devices 86e and 86d which output set values $V_B$ and $V_A-V_W$ for setting a first and second pulse periods $C_{A1}$ and $C_{A2}$, respectively, an analog switches 86f and 86g which are controlled by the outputs of the flip flops 86b and 86c, and a comparator 86h which compares the set values $V_B$ and $V_A-V_W$ of the first and second pulse period setting device 86e and 86d with the output $V_Q$ of the integrator 86i to output the H level output when the integrated output $V_Q$ reaches $V_B$ or $V_A-V_W$ so as to reset the aforementioned integrator 86i while also outputting the H level output as a pulse period signal $C_A$ ($C_{A1}$ and $C_{A2}$). The second pulse period setting device 86d is provided with the setting device 86da and a differential device 86db for obtaining a differential output $V_A-V_W$ between the set value $V_A$ and the wire-supplying speed $V_W$. The second pulse period setting device 86d is adapted to output the larger output value with decreasing wire-supplying speed $V_W$. Thus, when wire-supplying speed $V_W$ decreases below the set value $V_A$, the differential output $V_A-V_W$, which is proportional to the wire-supplying speed, is set to a larger value and the pulse period $C_A$ is set longer so as to set a longer pulse-absent period (base current period) so that the growth of molten droplet per unit time is controlled in accordance with the wire-supplying speed $V_W$.

The timer 86a is set the time $T_C$, which is the time required for the tip of wire electrode to be melted by the pulse current caused by the first pulse period signal $C_{A1}$ and then for the constricted molten droplet to grow enough to be lifted up to subsequently separated from the electrode. The second pulse period signal $C_{A2}$ serves to expedite the growth of molten droplet so that the molten droplet is regularly transferred onto the electrode by the next pulse current group.

Figure 11:
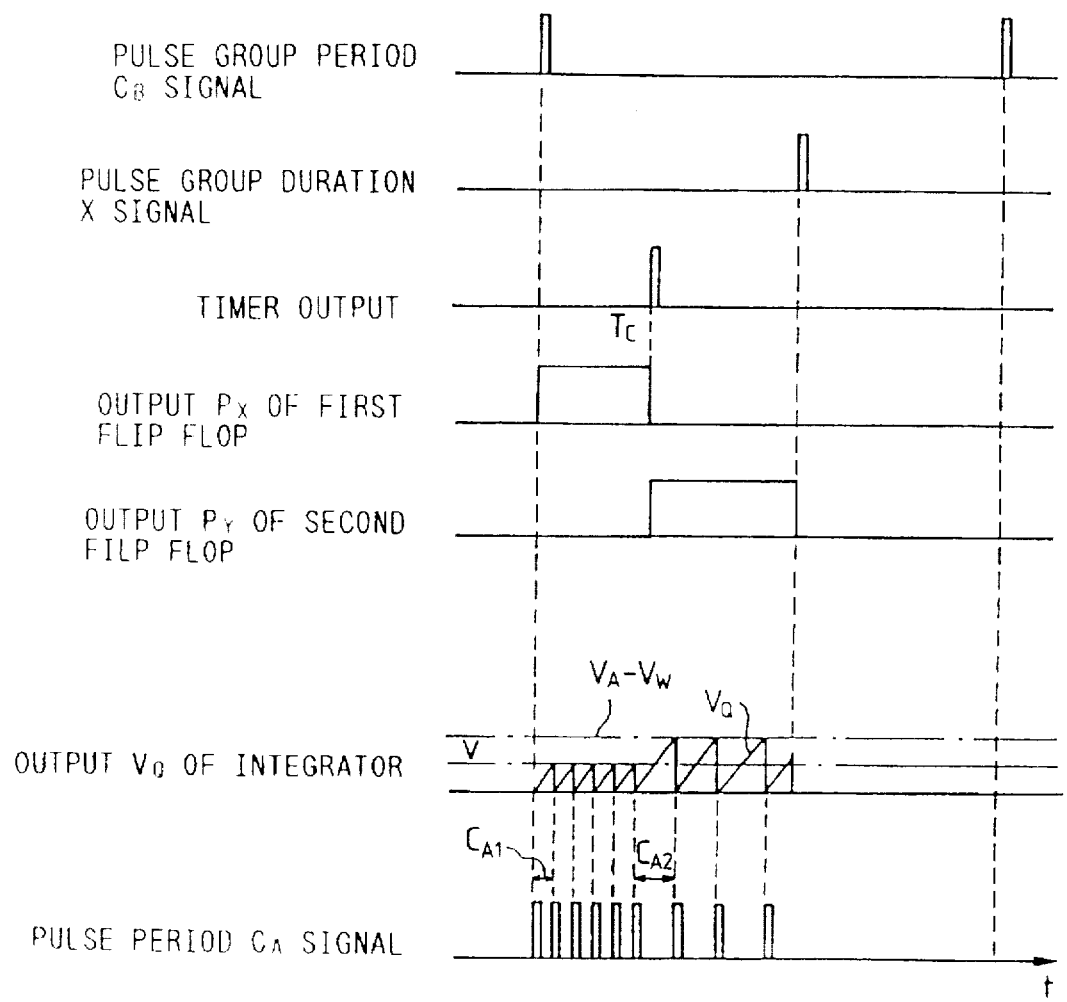
FIG. 11 is an operation time chart of the circuit in FIG. 9.

The production of the first and second pulse period $C_{A1}$ and $C_{A2}$ by the aforementioned pulse period $C_A$ setting device 86 will now be described with reference to FIG. 11. When the pulse group period $C_B$ signal from the pulse group period $C_B$ setting device 82 is inputted into the set terminal of the first flip flop 86b as well as to the timer 86a, the first flip flop 86b is set to output $P_X$ of the H level which in turn causes the analog switch 86f to close. The closure of analog switch 86f allows the output $V_B$ of the first pulse period setting device 86e to be inputted to the comparator 86h. The comparator 86h compares the output $V_B$ of the first pulse period setting device 86e with the output $V_Q$ of the integrator 86i to provide an output when $V_Q$ is equal to $V_B$. The output of the comparator 86h at that time is the pulse period $C_{A1}$ determined by the first pulse period setting device 86e. The integrator 86i is reset by the output of the comparator 86h to resume integration to output the first pulse period $C_{A1}$ signal determined by the aforementioned comparison.

When the timer 86a times to the set time $T_C$, the first flip flop 86b is reset by the timer output to provide an output $P_X$ of the L level, which causes the analog switch 86f is open shutting off the comparison input from the first pulse period setting device 86e to the comparator 86h. At the same time, the second flip flop 86c is set by the timer output to provide the output $P_X$ of the H level, which causes the analog switch 86g to close to direct the output $V_A-V_W$ of the second pulse period setting device 86d to the aforementioned comparator 86h. The comparator compares the output $V_A-V_W$ of the second pulse period setting device 86d with the output $V_Q$ of the integrator 86i to provide an output when $V_Q$ is equal to $V_A-V_W$, which output is the pulse period $C_{A2}$ determined by the second pulse period setting device 86d. The integrator 86i is reset by the output of the aforementioned comparator 86h to resume the integration so as to provide the second pulse period $C_{A2}$ signal.

For growth and separation of the molten droplet on the tip of wire electrode in pulse arc welding, the pulse $C_A$ signal outputted from the pulse period setting device 86 is a relatively short first pulse period $C_{A1}$ for a period of time $T_C$ of the timer 86a during which the growth of constriction at the boundary of the tip of wire electrode and the molten droplet is expedited to ensure the molten droplet to separate from the electrode to the base metal to be welded, and is a relatively long second pulse period $C_{A2}$ that holds the pulse-absent period long after separation of molten droplet so as to retard the growth of molten droplet per unit time. In this manner, the lift up phenomenon of a molten droplet newly produced on the electrode is retarded and the prompt growth of molten droplet is ensured to facilitate the separation of molten droplet during the next pulse group. The pulse period $C_A$ signal has different pulse periods to control separately.

The operation of the embodied apparatus will now be described with reference to the waveforms in FIG. 12. The pulse waveform shaper 81 receives the pulse group period $C_B$ signal, pulse group duration X signal, pulse group (envelope) Mi signal, pulse width τ signal, and pulse period $C_A$ signal from the pulse group period $C_B$ setting device 82, pulse group duration X setting device 83, pulse group waveform Mi setting device 84, pulse width τ setting device 85, and pulse period $C_A$ setting device 86, respectively.

The pulse waveform shaper circuit 81 determines on the pulse envelope Mi the pulse peak values of the respective pulse signals having a pulse width τ and a pulse period $C_A$ and then shapes the thus obtained pulses into an intermittent pulse group waveform in accordance with the pulse group period $C_B$ signal and pulse group duration X signal. The intermittent pulse group waveform is further shaped into a waveform which the base current $I_B$ signal from the base current $I_B$ output device 88 is superposed. The thus superposed pulse current signal and the current detected by the current detector 6 are inputted to the invertor drive circuit 2 which outputs the invertor driving signal in accordance with the pulse arc current waveform i shown in FIG. 12 to the invertor circuit section 1 to operate the invertor.

The invertor thus driven outputs a shaped alternating waveform to the high frequency transformer 3. The high frequency diodes 4A and 4B rectify the output signal from the high frequency transformer into a d-c current to thereby supply the pulse arc current waveform i shown in FIG. 12 to the weldment or arc load 5.

The arc load 5 is supplied with the pulse arc current waveform i together with the wire electrode 52 by a motor (no shown). Thus, the pulse arc current waveform i produces the pulse arc discharge 53 across the wire electrode 52 and the base metal to melt the base metal 54 and the tip of wire electrode 52. The melted portion of the wire electrode is dropped onto the melted portion of the base metal 54 to be welded so as to perform welding. As a result, the wire electrode 52 is consumed continuously. The above mentioned motor operates to supply the welding torch 51 with the wire electrode 52.

Figure 12:
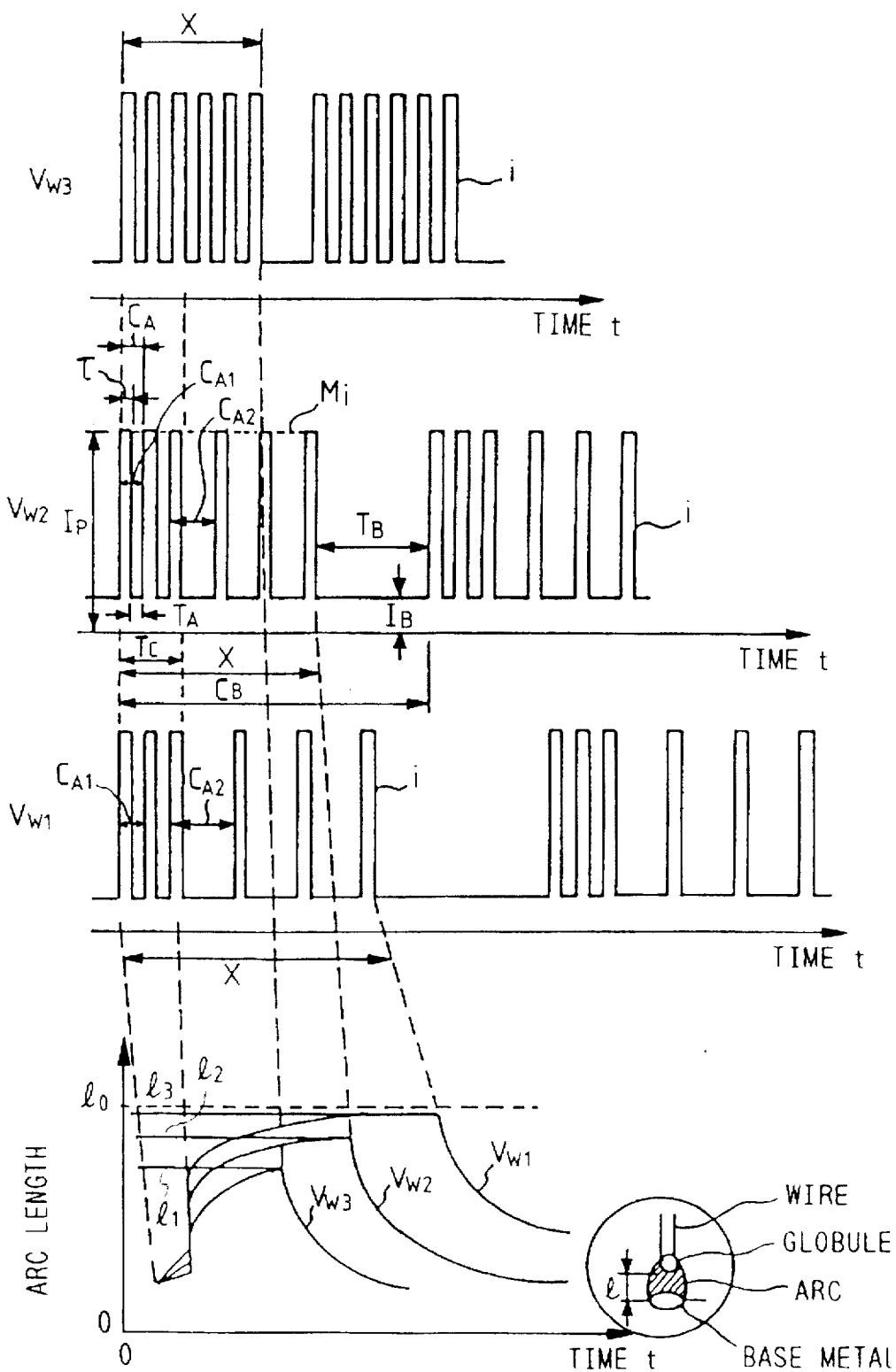
FIG. 12 is a waveform diagram illustrating the operation and its effects of FIG. 9.

In the above-described embodiment, as shown in FIG. 12, the pulse period $C_A$ within the pulse group duration X outputted from the pulse waveform shaper 81 is controlled together with the pulse group period $C_B$ by the pulse period $C_A$ setting device 86 to vary in accordance with the wire-supplying speed $V_W$, e.g., the lower the wire-supplying speed $V_W$ is ($V_{W3}>V_{W2}>V_{W1}$), the longer the second pulse period $C_{A2}$ is. In this case, the first pulse period $C_{A1}$ signal is controlled to be outputted at a constant timing. Thus, the pulse period is controlled separately by the pulse period $C_A$ setting device 86 so that in molten droplet growth-and-separation phenomenon on the tip of wire electrode during pulse arc welding, the growth of constriction at the boundary of solid portion of wire electrode and the melted molten droplet is expedited by the use of current outputted at the fixed, relatively short pulse period signal $C_{A1}$ at any wire-supplying speed till the set time $T_C$ of the incorporated timer 86a, thereby ensuring the molten droplet to separate from the electrode onto the base metal a predetermined time length after the beginning of pulse current group.

After the molten droplet has separated from the electrode at the set time $T_C$ of the timer 86a, a new molten droplet will grow on the tip of wire electrode while being lifted up, then during the base period the lifted molten droplet on the wire tip will hang down, then the molten droplet is shaped before the beginning of the next pulse group. In this manner, the molten droplet undergoes the regular repetitive growth and separation. In order to prevent variations of the arc length l by providing a pulse-absent period inversely proportional to the wire-supplying speed $V_W$, the pulse current outputted in accordance with the relatively long second pulse period $C_{A2}$ proportional to the wire-supplying speed $V_W$ is used to retard the lift-up phenomenon of molten droplet produced on the tip of wire electrode and to facilitate the growth of molten droplet, thereby enabling the molten droplet to separate and the regular transfer of the molten droplet onto the base metal during the next pulse group. In this case, the second pulse period $C_{A2}$ is controlled to vary in accordance with the wire-supplying speed $V_W$ to ensure the arc length to be controlled in the range of 11 to 13 which is below an allowable arc length lo where no undercut is caused.

The pulse current waveform is formed of a plurality of pulse currents and this group of pulse is repeated to form a discharge current waveform. This means that one pulse is divided into a plurality of pulses. The division of pulse current waveform causes the upward magnetic force due to pulse arc discharge at the wire electrode to be intermittent, serving to alleviate the force tending to lift the molten droplet produced on the tip of wire electrode. As a result, not only in the argon-dominated shielding gas but also in the $CO_2$ shielding gas, the molten droplet produced on the tip of wire electrode is separated easily from the electrode before it grows up to a large molten droplet.

The set time $T_C$ at which the pulse period $C_A$ is switched from one to the other, can be selected to be the best in accordance with the welding conditions such as the diameter of electrode and shielding gas.

Figure 13:
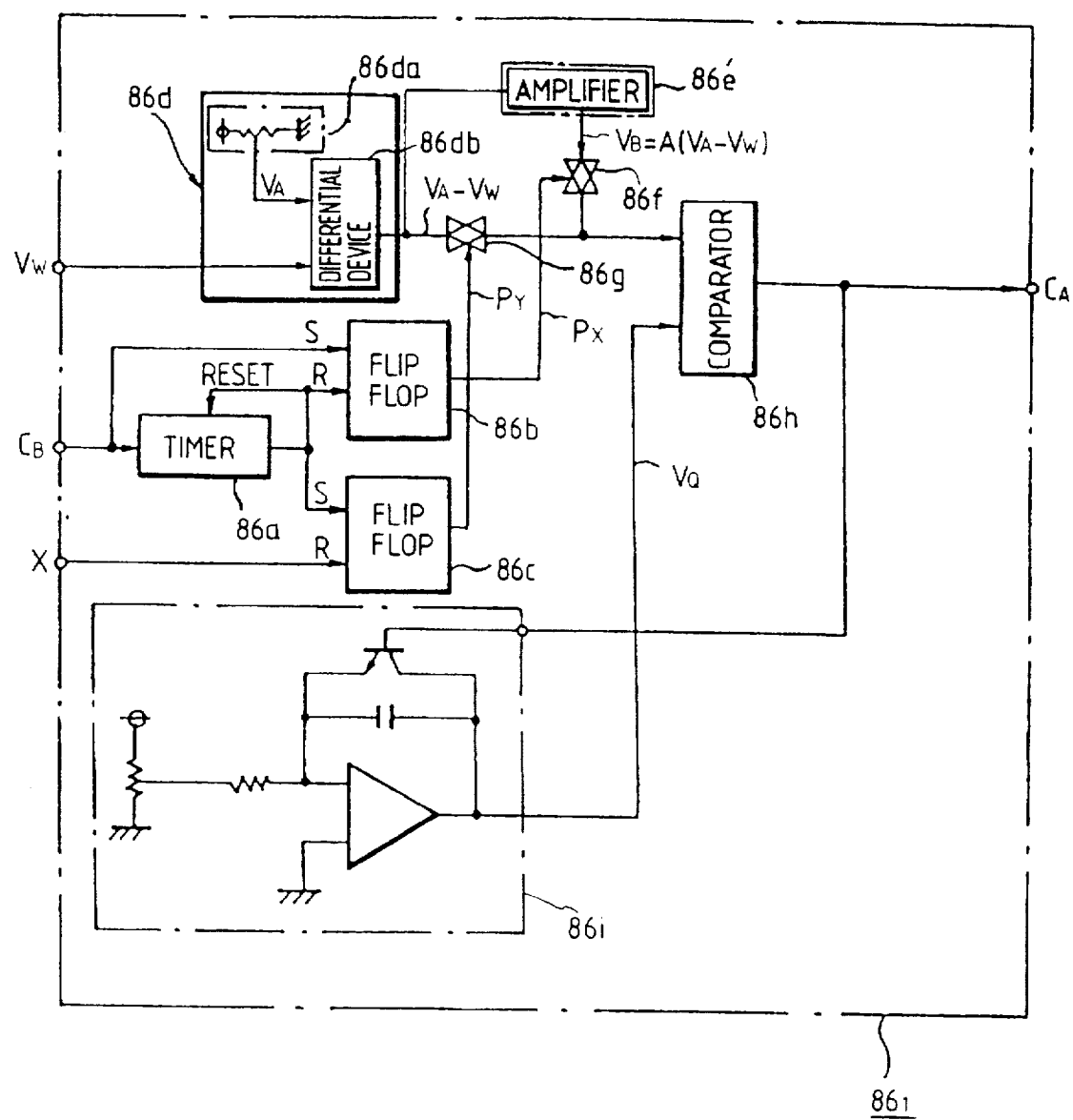
FIG. 13 is a circuit diagram of another embodiment similar to that in FIG. 10.

FIG. 13 shows another embodiment of the pulse period $C_A$ setting device 86 shown in FIG. 10. The first pulse period setting device 86e' takes the form of an amplifier instead of a variable resistor, the output $V_B$ of the amplifier being the output $V_A-V_W$ of the second pulse period setting device 86d times a predetermined amplification factor A such that the first pulse period $C_{A1}$ is also controlled to vary just as the second pulse period. By this arrangement, the first pulse period $C_{A2}$ can also be controlled in accordance with the wire-supplying speed $V_W$ just as in the first pulse period to retard the variations of arc length during the first pulse period. Since the growth and separation of molten droplet is aimed, it is quite natural that the first pulse period $C_{A1}$ has a shorter output timing than the second pulse period.

Figure 14:
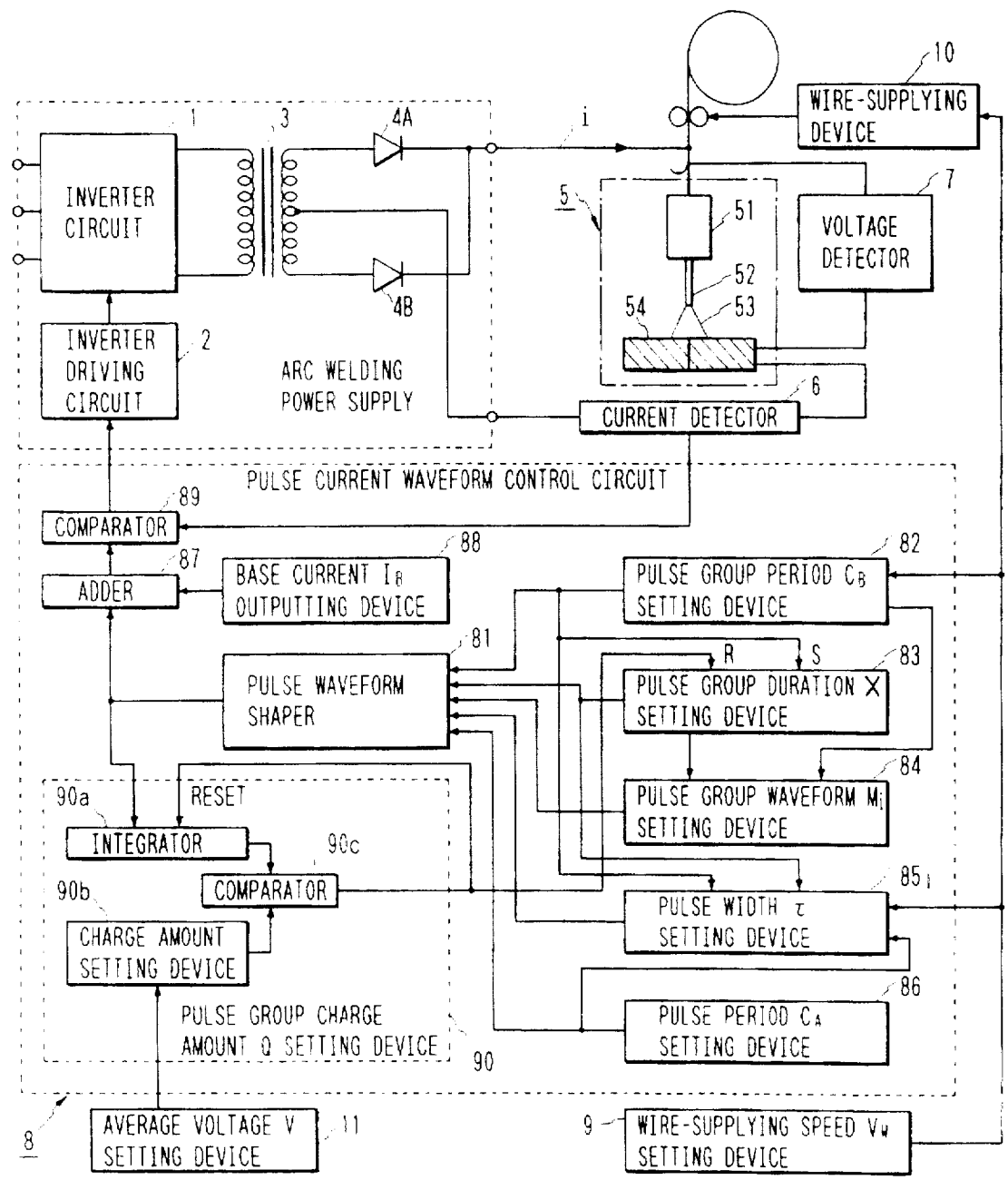
FIG. 14 is a block diagram showing an embodiment of a pulse welding apparatus according to a fourth invention.
Figure 15:
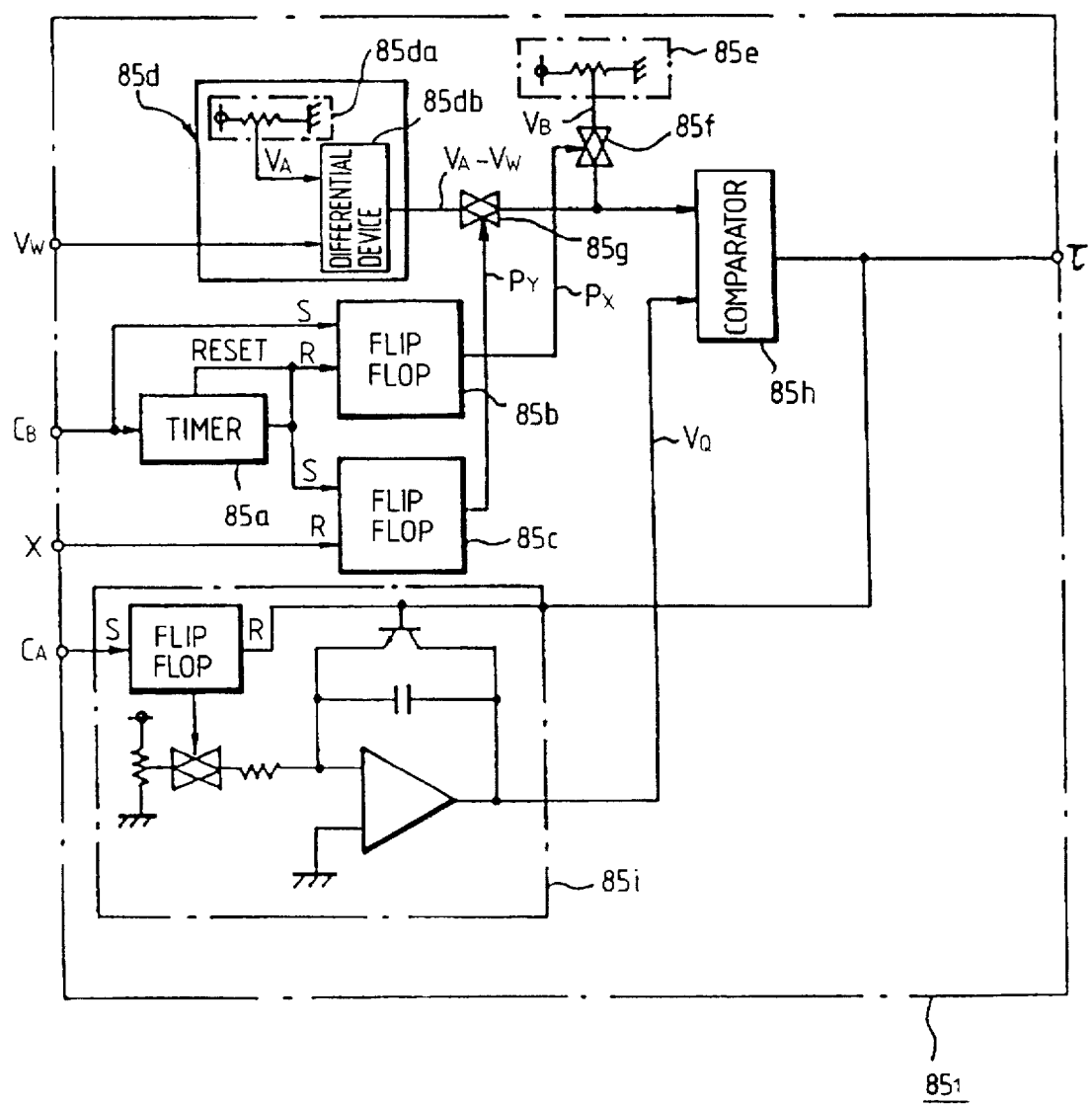
FIG. 15 is a circuit diagram showing an embodiment of the pulse width τ setting device ($85_1$) in FIG. 14.

FIG. 14 is a diagram showing an embodiment of a fourth invention, which differs from an embodiment of the pulse current waveform control circuit 8 shown in FIG. 9 in that the pulse width setting device $85_1$ varies the pulse width $\tau$ within the pulse group duration X in accordance with the set speed $V_W$ inputted from the wire-supplying speed $V_W$ setting device 9. FIG. 15 shows a specific circuit example of the pulse width setting device $85_1$ (in this embodiment, the pulse period $C_A$ setting device 86 outputs a constant period signal regardless of the wire-supplying speed).

In other words, as shown in FIG. 15, the pulse width setting device $85_1$ is provided with a timer which starts to time in response to the pulse group period $C_B$ signal to output an H level output after the set time $T_C$ and is then reset to the L level immediately, a first flip flop 85b which is set by the pulse group period $C_B$ signal and is reset by the H level output of the timer 85a, a second flip flop 85c which is set by the H level output of the timer 85a and is reset by the pulse group duration X signal, a first and a second pulse width setting device 85e and 85d for outputting set values $V_B$ and $V_A-V_W$ to set a first and a second pulse width $\tau_1$ and $\tau_2$, respectively, analog switches 85f and 85g which are controlled their opening and closing by the output of the flip flops 85b and 85c, a comparator 85h which compares the set values $V_B$ and $V_A-V_W$ of a first 85e and a second pulse width setting device 85d with the output $V_Q$ of the integrator $85_i$ to output the H level output when $V_Q$ reaches $V_B$ or $V_A-V_W$ so as to reset the integrator 85i to output the H level of the integrator 85i as the pulse width signal $\tau$ ($\tau_1$ and $\tau_2$) (the integrator 85i is caused to start integration when actuated by the analog switch which is opened by the output of the flip flop that is set by the pulse period signal $C_A$ and is reset by the output of the comparator 85h).

The second pulse width setting device 85d is provided with a setting device 85da and a differential device 85db which provides the differential output $V_A-V_W$ between the set value $V_A$ and the wire-supplying speed $V_W$ to output a larger signal with decreasing wire-supplying speed $V_W$. When the wire-supplying speed $V_W$ decreases below the set value $V_A$, the differential output $V_A-V_W$ inversely proportional to the wire-supplying speed increases to a larger value so that the pulse width $\tau$ decreases in accordance with the value of $V_A-V_W$. This allows the pulse-absent duration (base current duration) to be longer to retard the growth of nugget per unit time in accordance with the wire-supplying speed $V_W$. The set time $T_C$ of the timer 85a is set to a time length required such that the tip of wire electrode is melted by the pulse current in accordance with the first pulse width signal $\tau_1$, the molten droplet is promoted to be constricted, the molten droplet is lifted up, and then dropped. The pulse current in accordance with the subsequently outputted second pulse width signal $\tau_2$ serves to promote the growth of the next molten droplet so that the transfer of molten droplet by the next pulse current group is regularly carried out.

Figure 16:
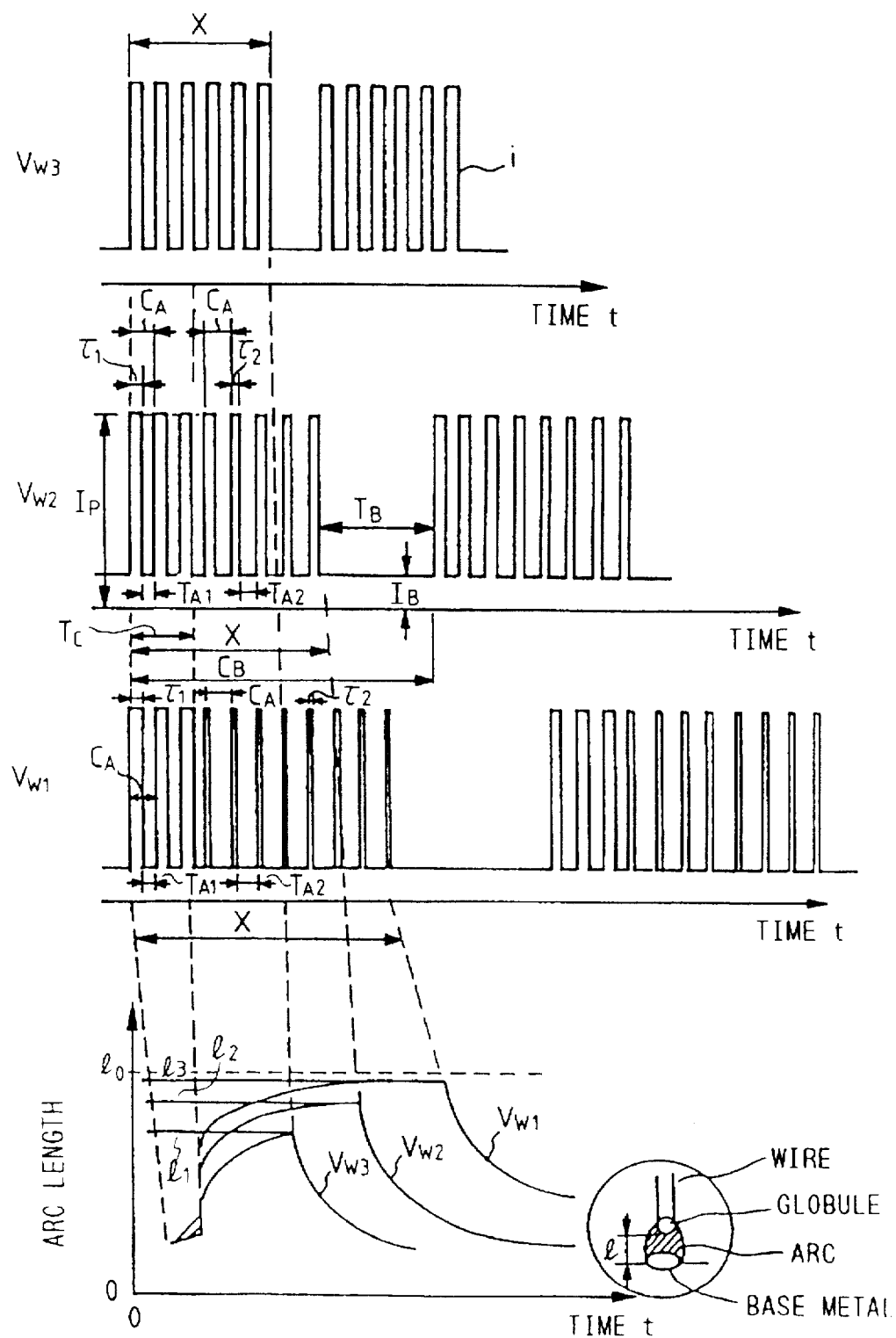
FIG. 16 is a diagram of the fourth invention, similar to that in FIG. 12.

According to FIGS. 14 and 15, as shown in FIG. 16, the pulse width $\tau$ of pulses within the pulse group duration X outputted from the pulse waveform shaper 81 is controlled by the pulse width $\tau$ setting device $85_1$ to vary in accordance with the wire-supplying speed $V_W$, e.g., the lower the wire-supplying speed $V_W$ is, the narrower the second pulse width $\tau_2$ is. In which case, the first pulse width $\tau_1$ signal and the pulse period $C_A$ are outputted always at a constant timing. In the embodiment of the previously mentioned first invention, the pulse intervals are varied in accordance with the wire-supplying speed so as to retard the amount of injection of the charge per unit time by pulse current within the pulse group, so that the rate of growth of molten droplet is controlled in accordance with the wire-supplying speed. In contrast to this, in the present embodiment, the amount of injection of charge per unit time within the pulse group is retarded by varying the pulse width within the pulse group in accordance with the wire-supplying speed as shown in FIG. 8 so that the same effects as in the first embodiment may be obtained.

Figure 17:
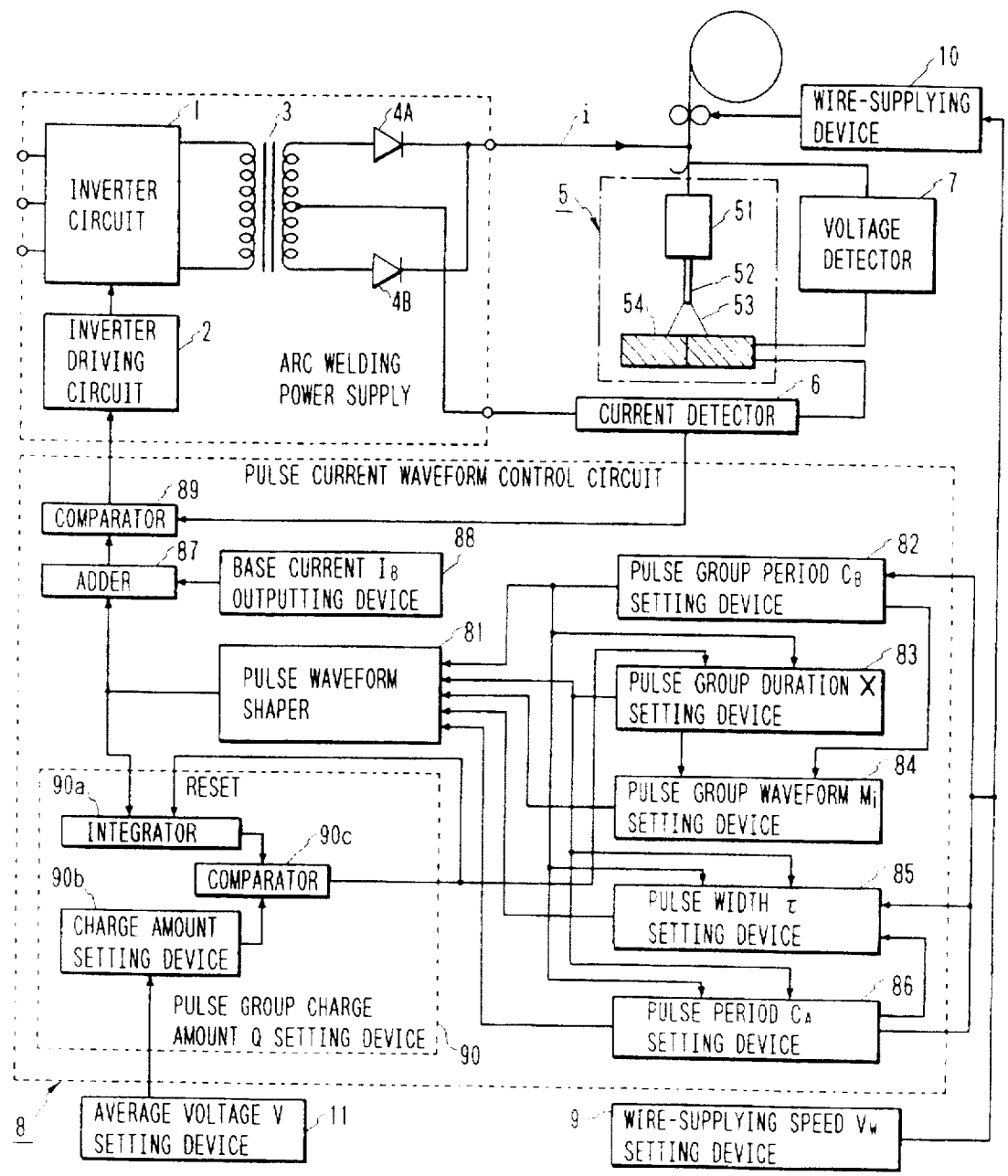
FIG. 17 is a block diagram showing an embodiment of a pulse welding apparatus according to a fifth invention.

FIG. 17 shows the construction of an embodiment according to a fifth aspect of the invention, in which the pulse current waveform control circuit 8 is provided with both the pulse period $C_A$ setting device 86 and the pulse width τ setting device 85 of the embodiment in FIGS. 9 and 10.

Figure 18:
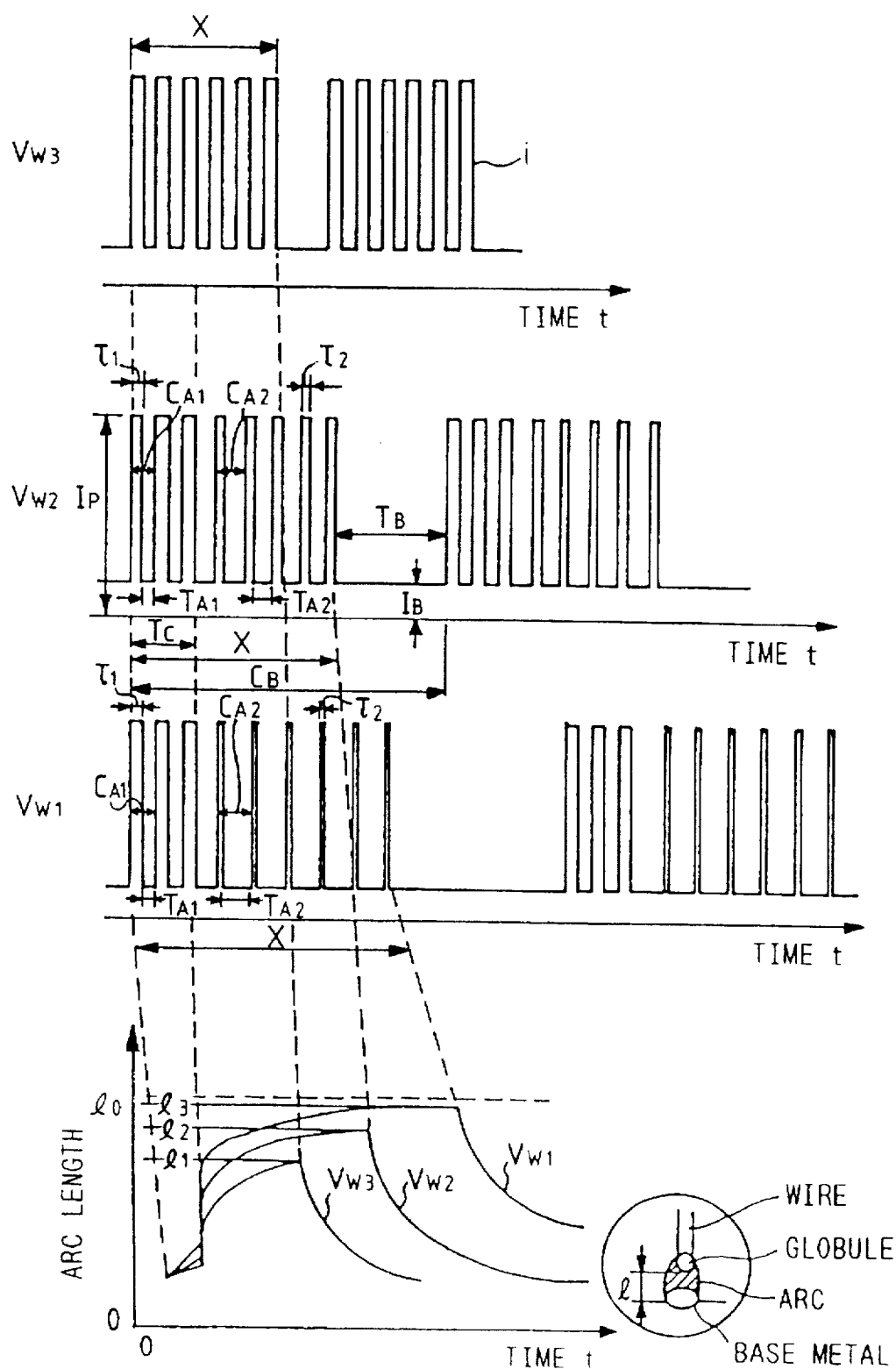
FIG. 18 is a diagram of the fifth invention, similar to that in FIG. 12.

According to the embodiment in FIG. 17, as shown in FIG. 18, by selecting the pulse width τ within the pulse group to be either $τ_1$ or $τ_2$ and the pulse period $C_A$ to be either $C_{A1}$ or $C_{A2}$ (pulse-absent period $T_A$ to be $T_{A1}$ and $T_{A2}$) in accordance with the wire-supplying speed, the amount of injection of charge by means of pulse current per unit time within the pulse group is retarded to thereby obtain the same results as the previously mentioned embodiments.

Figure 19:
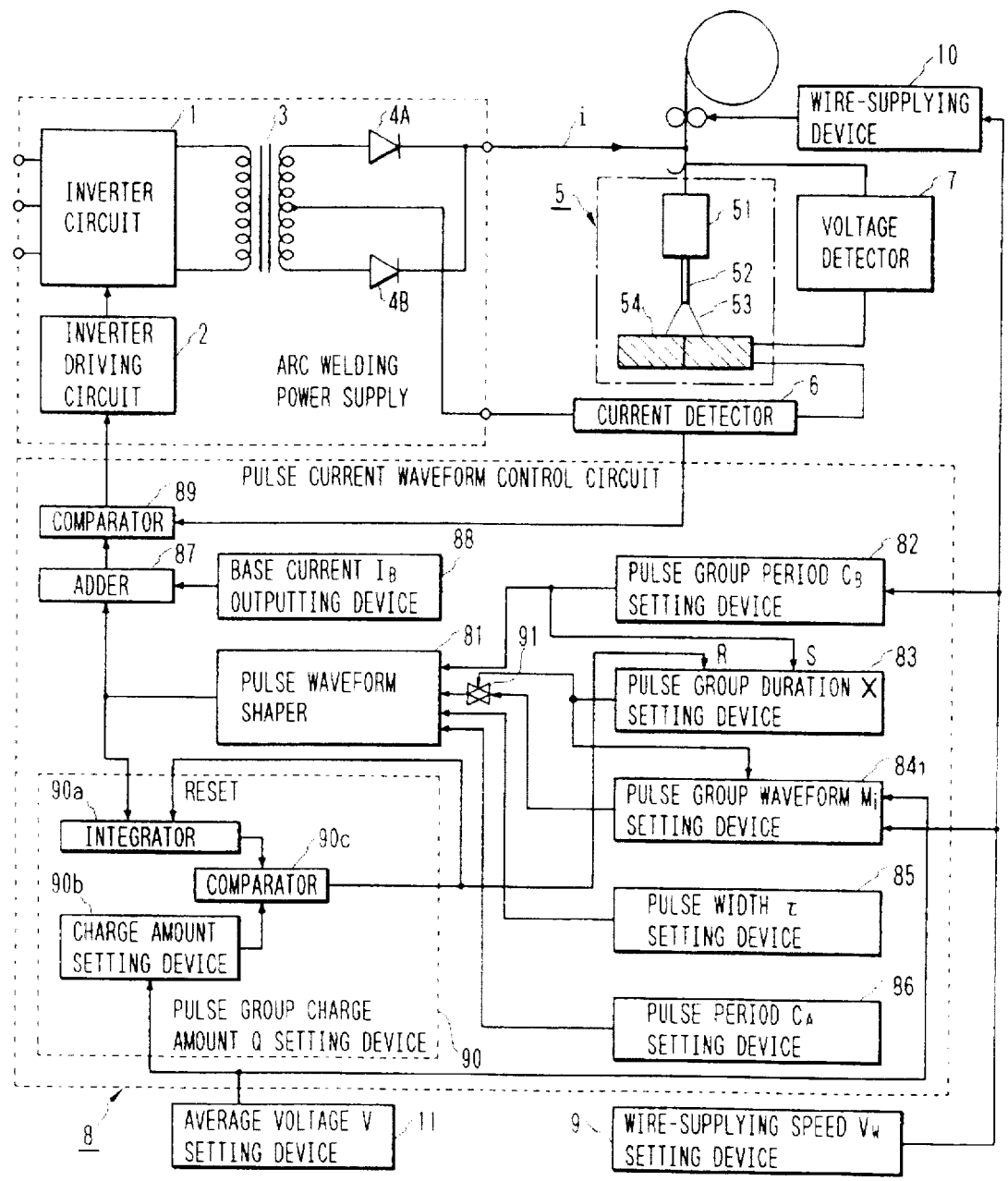
FIG. 19 is a block diagram of an embodiment of a pulse welding apparatus according to a sixth invention.

FIG. 19 shows the construction of an embodiment of a pulse welding apparatus according to a sixth aspect of the invention. The same reference numerals as in FIG. 14 denote the same or corresponding elements. In the figure, the reference numeral $84_1$ denotes a pulse group waveform Mi setting device according to the present embodiment.

In the pulse current waveform control circuit 8 of the embodiment, the pulse group duration X setting device 83, which is a flip flop that is reset by the output of the pulse group charge amount Q setting device 90, is set by the output of the pulse group period $C_B$ setting device 82. The output of the pulse group duration X setting device 83 controls the analog switch 91, placed between the pulse group waveform Mi setting device $84_1$ and the pulse waveform shaper 81, to open and close to control the output of the pulse group Mi setting device 84.

Figure 20:
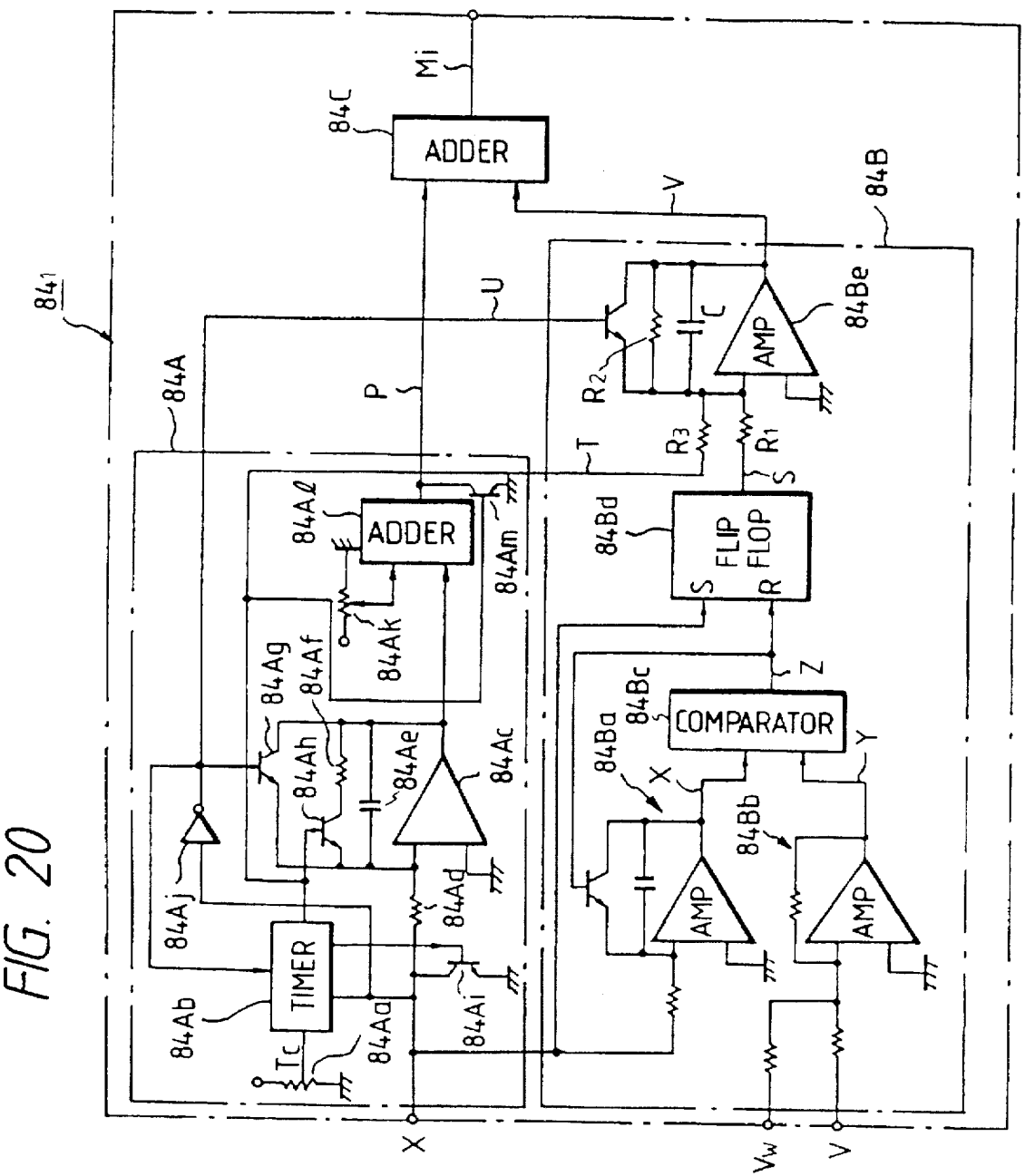
FIG. 20 is a circuit diagram of a pulse envelope Mi setting device shown in FIG. 19.

The pulse group waveform Mi setting device $84_1$ sets the hill-shaped envelope Mi signal of the pulse group current, which is outputted to the arc load 5, on the basis of the pulse group duration X signal from the pulse group duration X setting device 83, the set speed $V_W$ from the wire-supplying speed $V_W$ setting device 9, and the set voltage V from the average voltage V setting device 11. FIG. 20 shows a specific circuit example of the pulse group waveform Mi setting device $84_1$.

As shown in FIG. 20, the pulse group waveform setting device $84_1$ is provided with an adder 84c, a reference pulse group waveform setting device 84A, and a pulse group waveform slope-varying device 84B by which the slope of hill of a reference pulse group waveform P is varied in accordance with the wire-supplying speed $V_W$ and the average voltage V.

The reference pulse group waveform setting device 84A has a timer 84Ab which operates in accordance with a value that is set by means of a variable resistor 84Aa for setting the separation time $T_C$ of molten droplet or time required from beginning of outputting the pulse group till pulse peak value is reached, an amplifier 84Ac for amplifying the pulse group duration X signal, a resistor 84Ad and a capacitor 84Ae that serves as a charging circuit when the output of the amplifier 84Ac goes up, a resistor 84Af that serves together with the capacitor 84Af as a discharge circuit when the output of the amplifier 84Ac decreases, transistors 84Ag, 84Ah, and 84Ai, an inverting buffer 84Aj, a variable resistor 84Ak for providing an additional output when the output of the amplifier 84Ac increases, an adder 84Al, and a transistor 84Am.

The pulse group waveform slope-varying device 84B is provided with an integrator 84Ba which integrates the pulse group duration X signal and outputs a signal x, an amplifier 84Bb which adds and amplifies the wire-supplying speed $V_W$ and the average voltage V and then outputs a signal Y, a comparator 84Bc which outputs a signal Z when the signal x is equal to the signal Y, a flip flop 84Bd which is set by the pulse group duration X signal to output a signal S and is reset by the signal Z of the comparator 84Bc, and an amplifier which outputs a signal V to vary slope and which is provided with a charging circuit $CR_1$ that consists of a resistor $R_1$ and a capacitor C and is charged by the signal S, a discharge circuit $CR_2$ that consists of a resistor $R_1$ and a capacitor C and discharges the output, and a charging circuit $CR_3$ that consists of a resistor $R_3$ and a capacitor C and recharges the signal T after discharge. The pulse group waveform slope-varying device 84B is adapted to provide the signal Mi by adding the output signal V from the pulse group waveform slope-varying device 84B to the reference pulse group waveform outputted from the reference pulse group waveform setting device 84A.

Figure 21:
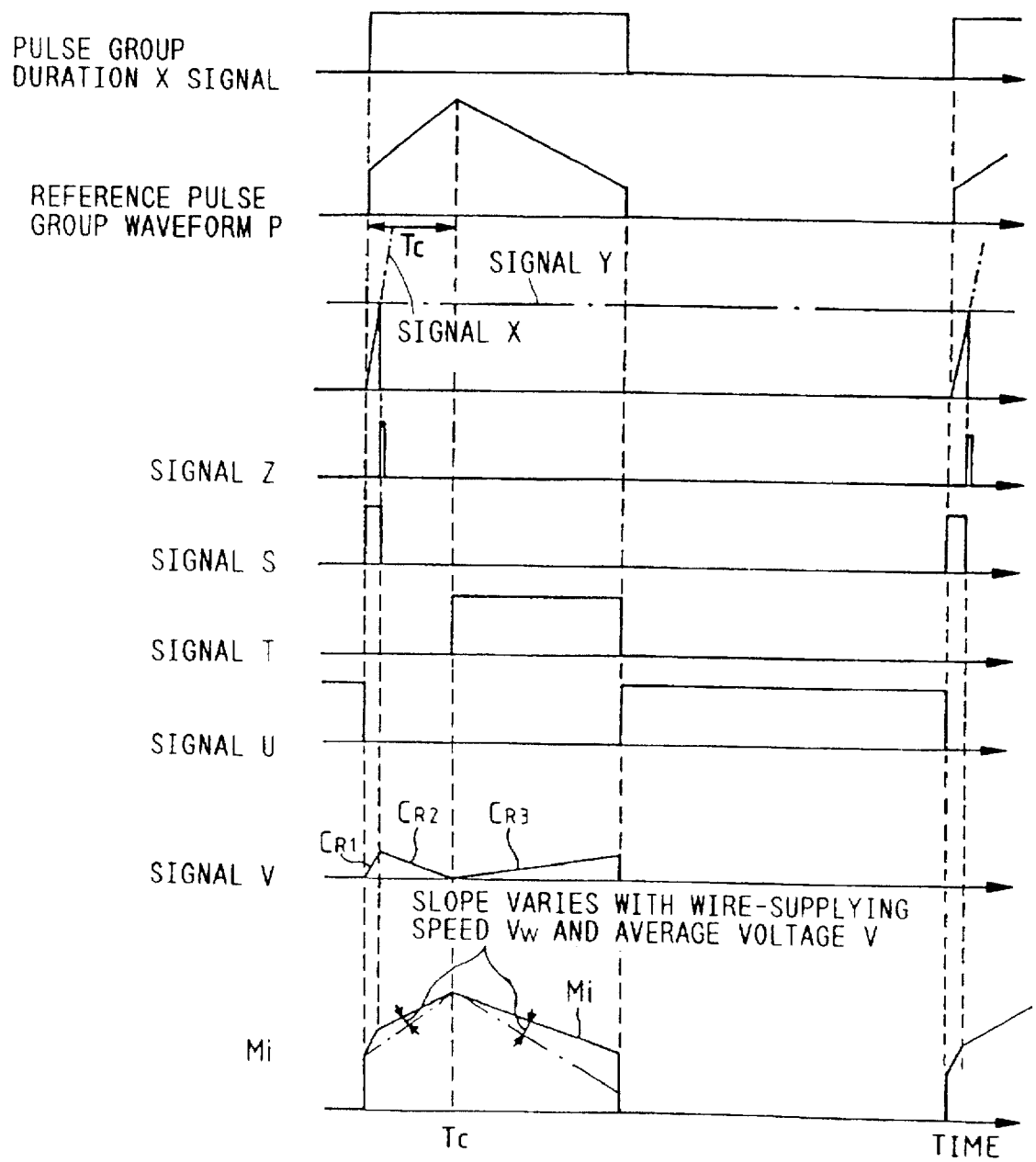
FIG. 21 is the operation waveforms of respective structural elements in FIG. 20.

The production of the hill-shaped pulse envelope Mi which is variably controlled the slope thereof by the pulse waveform Mi will now be described with reference to FIG. 21 which illustrates the respective waveforms.

When the pulse group duration X signal is inputted into the reference pulse group waveform setting device 84A, the timer 84Ab is set by the pulse group duration X signal and the amplifier 84Ac integrates the pulse group duration X signal by means of the charging circuit consisting of the resistor 84Ad and capacitor 84Ae till the time $T_C$ of the timer 84c set via the variable resistor 84Aa. When the time $T_C$ is reached, the transistor 84Ah is turned on by the timer 84c and the output signal of the amplifier 84d decays in accordance with the resistor 84Ac. When the pulse group duration X signal goes low, the invertor buffer 84Ag goes high turning the transistor 84Ag on. This causes the output of the amplifier 84Ac to immediately become zero. The output signal of the amplifier 84Ac is added to the output of the variable resistor 84Ak by the adder 84Al till the time $T_C$ is reached, thereby applying a hill-shaped signal to the adder 84e.

In the mean time, in the pulse group waveform slope-varying device 84B, the amplifier 84Bb receives and adds the wire-supplying speed $V_W$ and the average voltage V to produce the signal Y, and the integrator 84Ba receives and integrates the pulse group duration X signal to produce the signal x which in turn is compared by the comparator 84Bc with the signal Y. When the signal x is equal to the signal Y, the signal Z is outputted.

The integrator 84Ba is reset by the signal Z causing the output x thereof to immediately go zero while also the flip flop 84Bd which has been set by the pulse group duration X signal is reset causing the output S thereof to go low. The amplifier 84Be which receives the output S of the flip flop 84Bd, starts charging by means of the charging circuit $CR_1$ in synchronism with the pulse group duration X signal and discharges through the discharge circuit $CR_2$ causing the output thereof to be zero when the flip flop 84Bd is reset. When the set time $T_C$ of the timer 84Ab is reached, the amplifier 84Be is again charged through the charging circuit $CR_3$ into which the timer output T is inputted. Then, when the inverted signal U of the pulse group duration X signal goes high, the output signal V of the amplifier 84Be immediately goes zero.

Thus, the adder 84c produces a signal Mi which is the output P of the reference pulse group waveform setting device 84A added to the output signal V of the pulse group waveform slope-varying device 84B, and then outputs the hill-shaped signal Mi to the pulse waveform shaper 81.

That is, the pulse envelope Mi signal from the pulse group waveform setting device 84 produces a hill-shaped pulse envelope so that in the phenomenon of the growth and separation of molten droplet on the tip of the wire electrode, the electromagnetic pinch force caused by the pulse current reaches the maximum when the constriction of molten droplet is produced. Thus, the molten droplet is promoted to be constricted at the boundary of the solid portion of the wire electrode so as to ensure the separation and transfer of the base metal. Further, the pulse group peak value waveform is lowered after the separation of molten droplet to thereby retard the lifting phenomenon of the molten droplet produced on the tip of wire electrode as well as to allow the growth of molten droplet. This facilitates the separation of molten droplet during the next pulse group.

Figure 22:
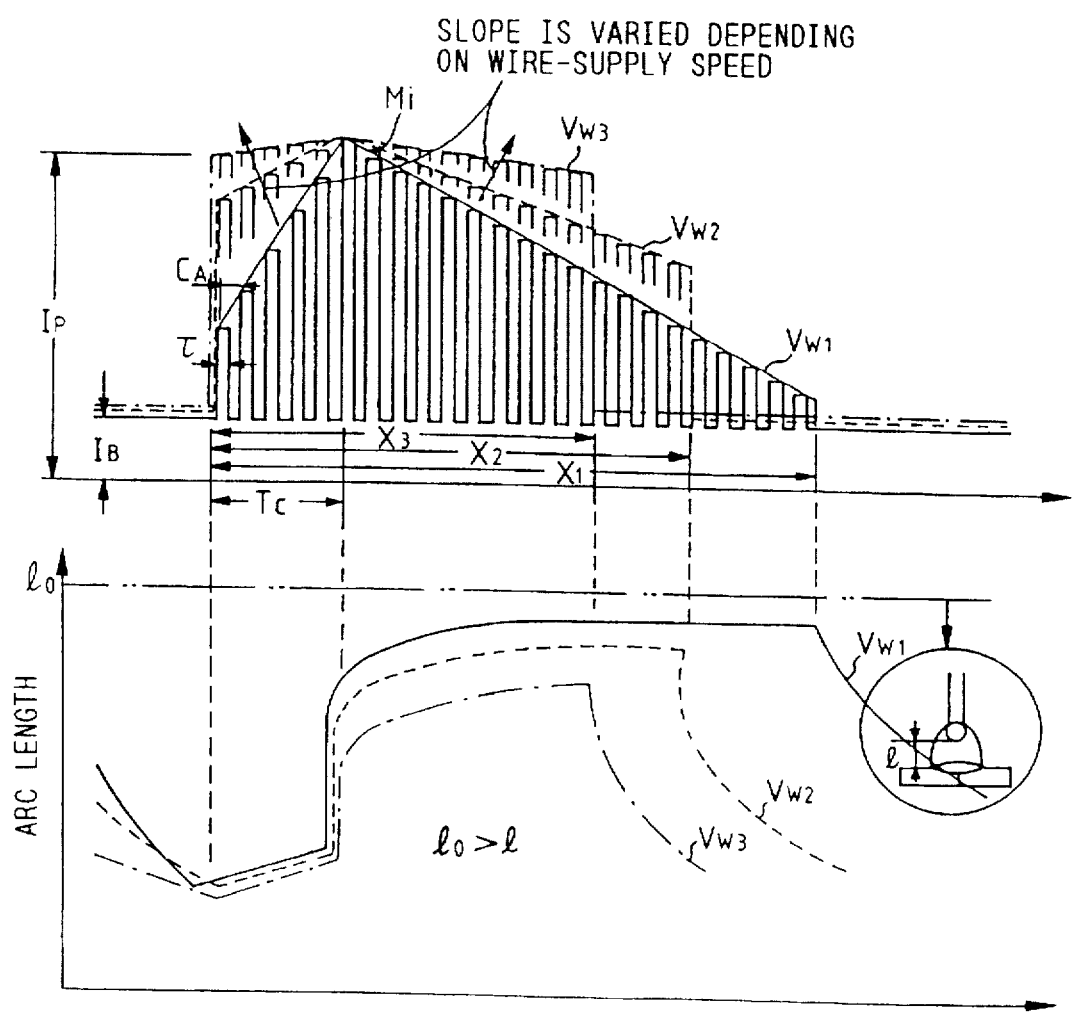
FIGS. 22 and 23 are illustrative diagrams showing effects derived from an embodiment of the sixth invention in FIG. 19.

As shown in FIG. 22, when the average voltage V is constant, the pulse group waveform Mi is changed the slope thereof with the peak value thereof held constant, thus the lower the wire-supplying speed $V_W$ is ($V_{W3} < V_{W2} < V_{W3}$), the longer the pulse group X is ($X_3 < X_2 < X_1$). This retards the rate of growth of molten droplet such that the length l of arc produced is held below an allowable value lo to prevent undercut.

Similarly, as shown in FIG. 18, with the peak value of the pulse group waveform Mi fixed, the higher the average voltage V, the smaller the slope of Mi is ($V_1 > V_2 > V_3$). Thus, the upward electromagnetic force developed by the arc current is less than when the peak value of the pulse current group waveform is also changed. Thus, this allows the arc length l to be below an allowable value lo, preventing undercut.

The operation of the embodied apparatus will now be described. In FIG. 19, the pulse waveform shaper 81 receives the pulse group period $C_B$ signal, pulse group (envelope) Mi signal, pulse width $\tau$ signal, and pulse period $C_A$ signal from the pulse group period $C_B$ setting device 82, pulse group waveform Mi setting device 84, pulse width setting device 85, and pulse period $C_A$ setting device 86, respectively. The pulse group duration X setting device 83 is set by the pulse group period $C_B$ signal, which in turn is set in accordance with the wire-supplying speed $V_W$, and is reset by the output of the pulse group charge amount Q setting device 90. The pulse group waveform Mi setting device 84 is adapted to output an output in accordance with the pulse group period $C_B$ signal.

The pulse waveform shaper 81 determines on the pulse envelope Mi the pulse peak values of the respective pulse signals having a pulse width $\tau$ and a pulse period $C_A$ and then shapes the thus obtained pulses into an intermittent pulse group waveform in synchronism with the pulse group period $C_B$ signal. The intermittent pulse group waveform is further shaped into a waveform which the base current $I_B$ signal from the base current $I_B$ output device 88 is superposed. The thus superposed pulse current signal and the current detected by the current detector 6 are inputted to the invertor drive circuit 2 which outputs the invertor driving signal to the invertor circuit section 1 to operate the invertor.

The thus driven invertor outputs a shaped alternating waveform to the high frequency transformer 3. The high frequency diodes 4A and 4B rectify the output signal from the high frequency transformer 3 into a d-c current to thereby supply the weld zone or arc load 5 with the pulse arc current waveform i.

The arc load 5 is supplied with the pulse arc current waveform i together with the wire electrode 52 by a motor (no shown). Thus, the pulse arc current waveform i produces the pulse arc discharge 53 across the wire electrode 52 and the work 54 to be welded to melt the work 54 to be welded and the tip of wire electrode 52. The melted portion of the wire electrode is dropped onto the melted portion of the work 54 to be welded, thus performing welding. As a result, the wire electrode 52 is consumed continuously. The above mentioned motor operates to continuously supply the welding torch 51 with the wire electrode 52.

Thus, according to the aforementioned embodiment, by periodically passing the pulse arc current having a given pulse width $\tau$ and a period $C_A$, the molten droplet produced on the wire electrode in synchronism with the pulse group grows with the aid of the arc current of pulse group, the electromagnetic pinch force in accordance with the pulse frequency creates the constriction of molten droplet, which is then expedited by the pulses to further grow such that the molten droplet is separated from the electrode. After the molten droplet is separated from the electrode, a new molten droplet is produced on the tip of wire electrode and is further grown while being lifted up by the pulses, then during the base current $I_B$ period the lifted molten droplet on the wire tip will hang down, then the molten droplet is shaped before the beginning of the next pulse group. Thus, the growth and separation of molten droplet are repeated in a regular manner. To ensure the regular separation of molten droplet, the separation time $T_C$ from the application of pulse group is determined taking into account the variations of welding conditions and effects of external disturbances and the pulse peak value are set to be the maximum near the time $T_C$. To retard the lift of the new molten droplet produced after the molten droplet is separated, the peak value of pulse group is lowered after elapse of the time $T_C$ so that the electromagnetic pinch force due to the pulse arc discharge becomes the maximum at pulses with high pulse peak value to ensure the separation of molten droplet. Further, the pulse current waveform is constructed of a plurality of pulse currents and this pulse current group is formed into a discharge current waveform in which the pulse groups are periodically repeated. This means that one pulse is divided into a plurality of pulses. The division of a pulse current causes the upward electromagnetic force at the wire electrode due to the pulse arc discharge to become intermittent, serving to reduce the force tending to lift the molten droplet produced on the tip of wire electrode. As a result, not only in the argon-dominated shielding gas but also in the $CO_2$ shielding gas, the molten droplet produced on the tip of wire electrode is separated easily from the electrode before it grows up to a large molten droplet.

Figure 23:
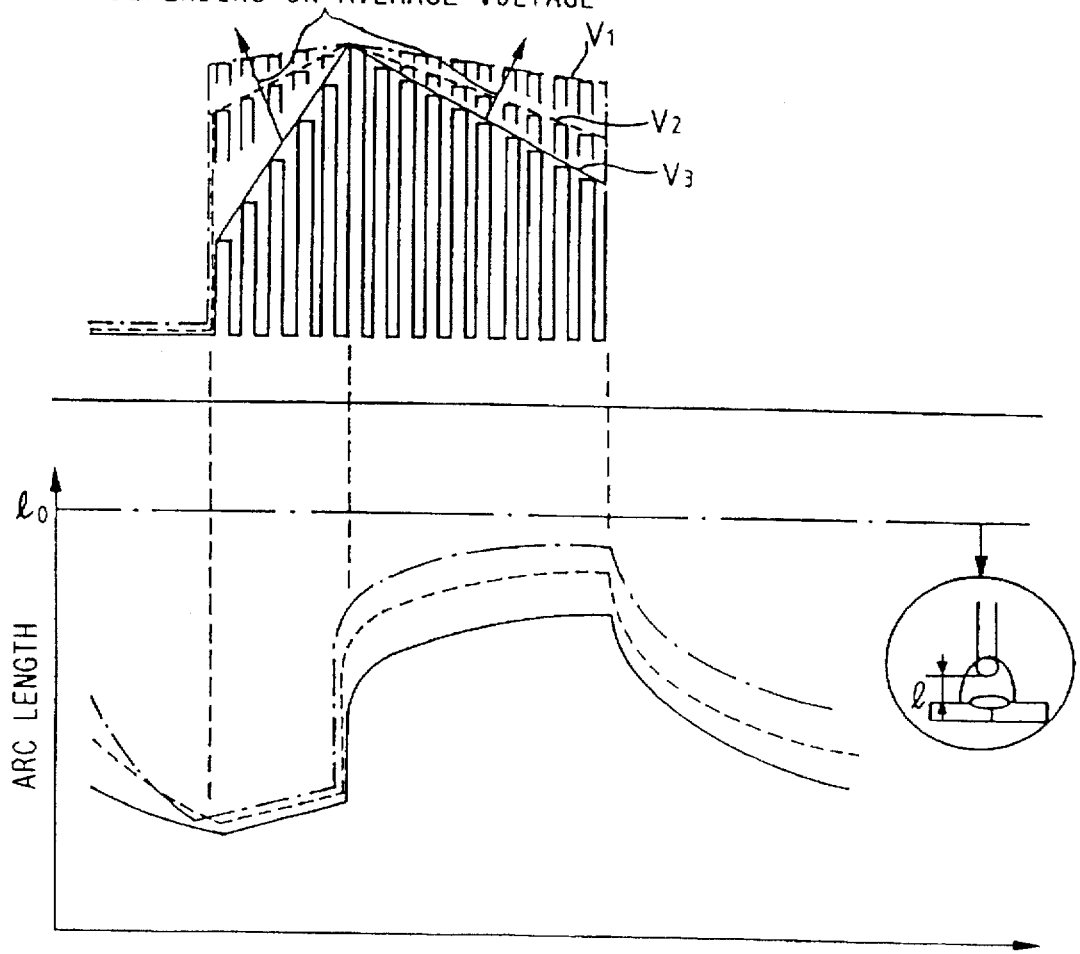

As shown in FIGS. 22 and 23, with the peak value of the pulse group waveform Mi fixed, the pulse group waveform Mi is controlled to vary in accordance with the wire-supplying speed or the average voltage V. Thus, the arc length developed between the molten droplet and base metal can be retarded below an allowable value to prevent undercut.

The separation time $T_C$ in the aforementioned embodiment can, of course, be selected in accordance with the welding conditions such as the wire diameters and shielding gas.

Figure 24A:
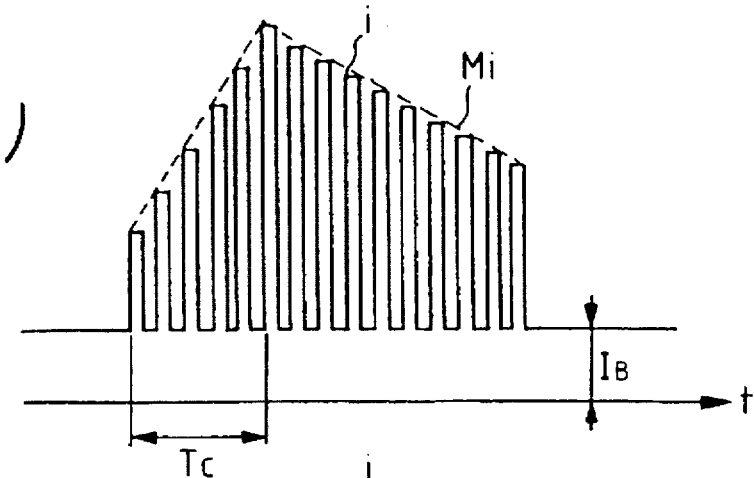
FIGS. 24a–24d are waveform diagrams illustrating the pulse modulation method in an embodiment according to the sixth invention.
Figure 24B:
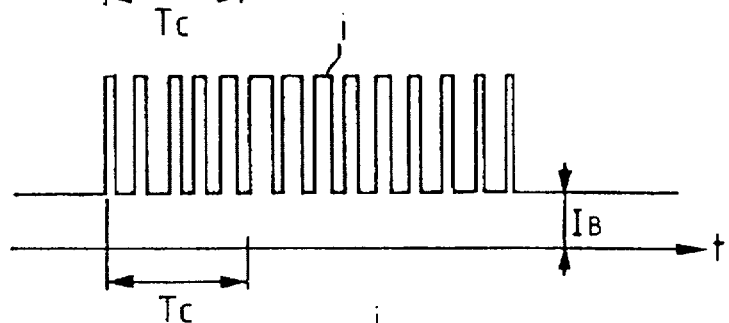
Figure 24C:
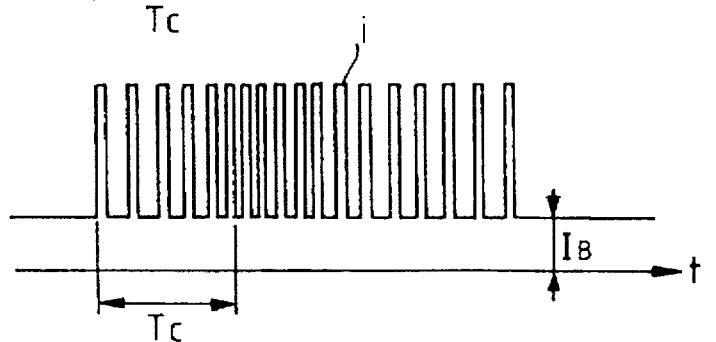
Figure 24D:
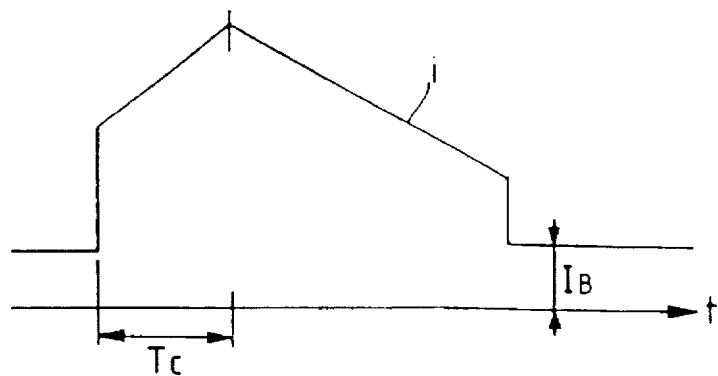

While the embodiment has been described with respect to the one using pulse amplitude modulation shown in FIG. 24a, either pulse amplitude modulation in FIG. 24b or pulse frequency modulation in FIG. 24b may be utilized. In either case, the average current needs only to be the maximum after elapse of the set time as shown in FIG. 24d; the average current can be varied its slope by carrying the modulation in accordance with the wire-supplying speed or the average voltage V with the peak value fixed.

Figure 25:
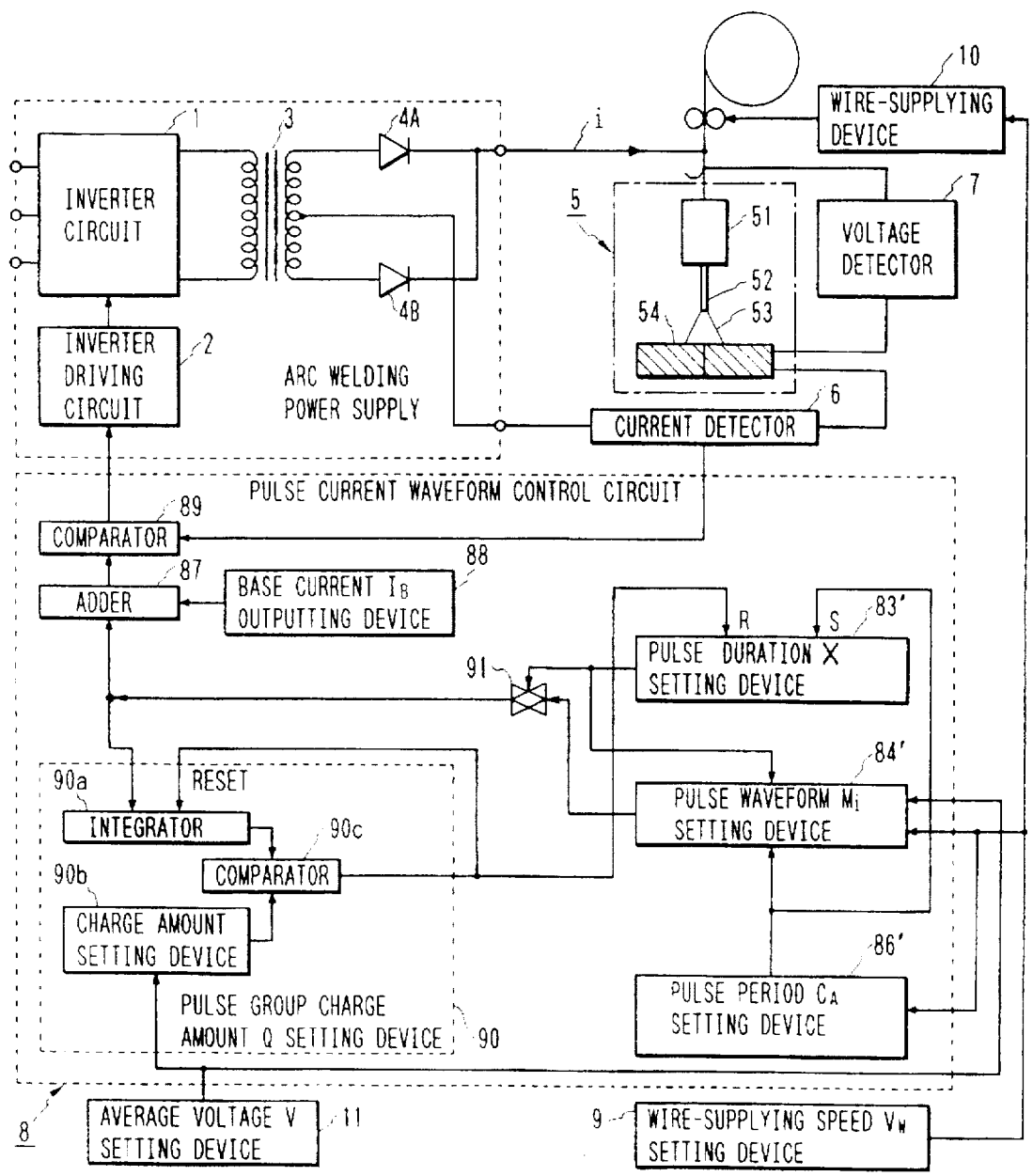
FIG. 25 is a block diagram similar to FIG. 19, illustrating an embodiment of a seventh invention.

While the embodiment of the sixth aspect of the invention has been described with respect to a pulse arc welding apparatus using the pulse group waveform, the invention may take the form of a pulse welding apparatus in which the single pulse current waveform obtained from configuration in FIG. 25 is periodically repeated.

In other words, FIG. 25 shows an embodiment of a pulse welding apparatus according to a seventh aspect of the invention. In the figure, the same references as in FIG. 19 denote the same elements. The pulse current waveform control circuit 8 is so constructed that the output of a pulse period $C_A$ setting device 86' is outputted to a pulse waveform Mi setting device which produces a single pulse and to the set terminal of a pulse duration X setting device 83' which sets the pulse width, and the pulse period $C_A$ setting device 86' is supplied with the setting of wire-supplying speed. The circuit of the aforementioned pulse waveform Mi setting device 84' may be of the same construction as that in FIG. 20.

In this embodiment, as in FIG. 19, the electromagnetic force of the pulse arc discharge becomes the maximum at a high pulse peak due to the fact that the current reaches its peak value after the set time $T_C$, ensuring the molten droplet to separate at the time $T_C$ at which the pulse peak is high. Also, the pulse group waveform is varied its slope in accordance with the wire-supplying speed or average voltage with the peak value of the pulse waveform fixed. Thus, the arc length is held below a predetermined value to prevent undercut.

The respective embodiments may also be applied to cases where the both the wire-supplying speed and the average voltage V vary. Additionally, the welding may be carried out in the shielding gas of a mixture of argon and $CO_2$, resulting in the same effects as the above-described embodiments.

Figure 26A:
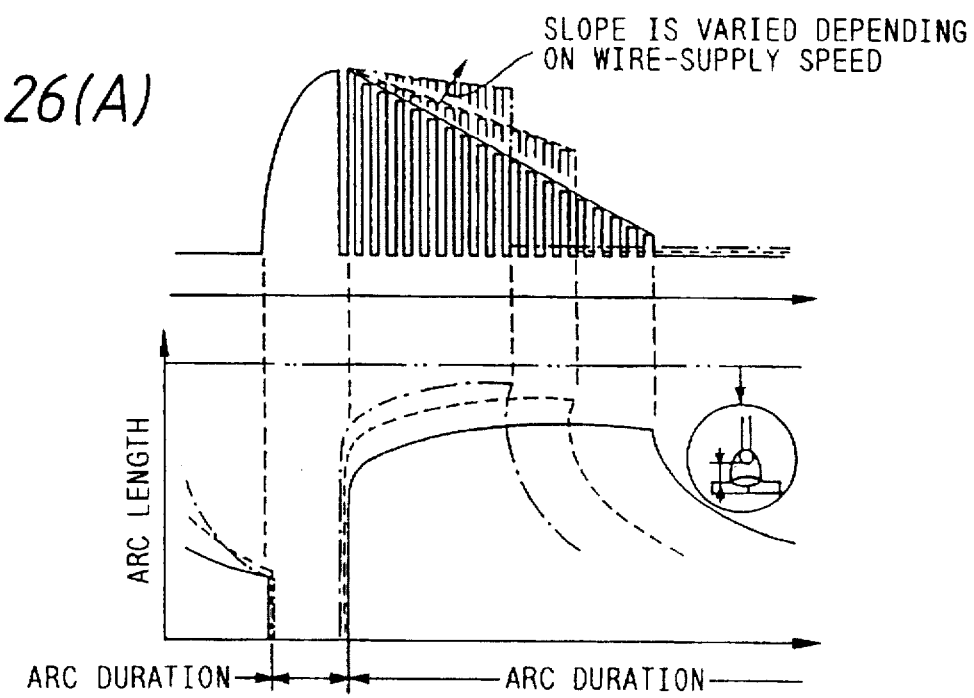
FIGS. 26a and 26b are illustrative diagram of pulse group waveforms when applied to a short-circuiting arc welding apparatus.
Figure 26B:
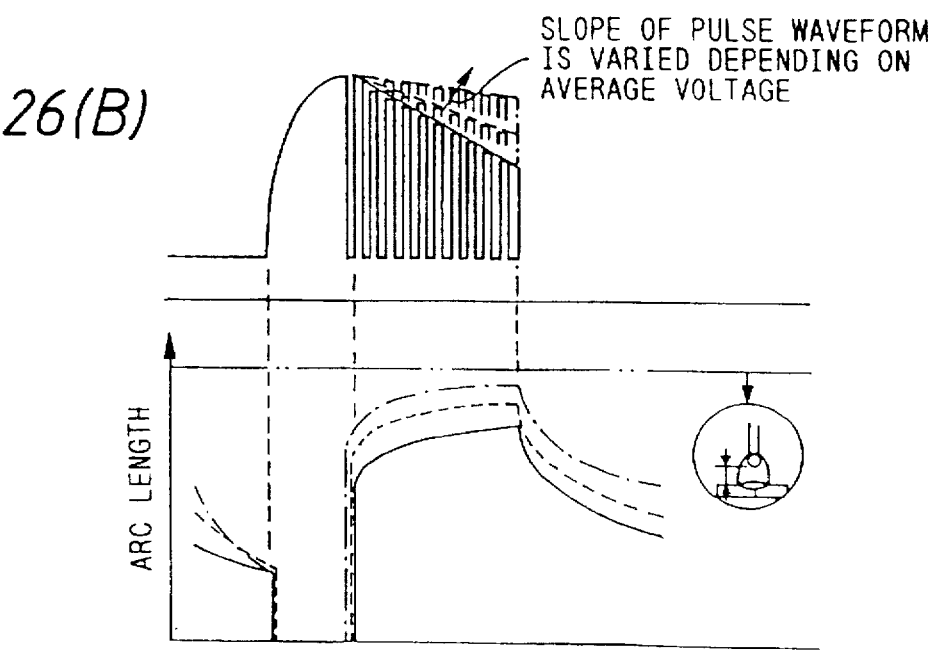

While the above embodiments have been described with respect to a pulse arc welding apparatus, the embodiments may also be applied to a short-circuiting arc welding apparatus whose current waveform is shown in FIGS. 26a and 26b.

The waveforms in FIGS. 26a and 26b are varied their slopes in accordance with the wire-supplying speed or average voltage, as in the previously mentioned embodiments, when the welding process shifts from short-circuit to arc with the current waveform being optimum by which the molten droplet are smoothly short-circuit-separated during short-circuiting period. Thus, the advantage is that the variations of short-circuiting duration and arc duration are reduced permitting short-circuiting arc welding with regular repetition of short-circuiting and arc.

Figure 27:
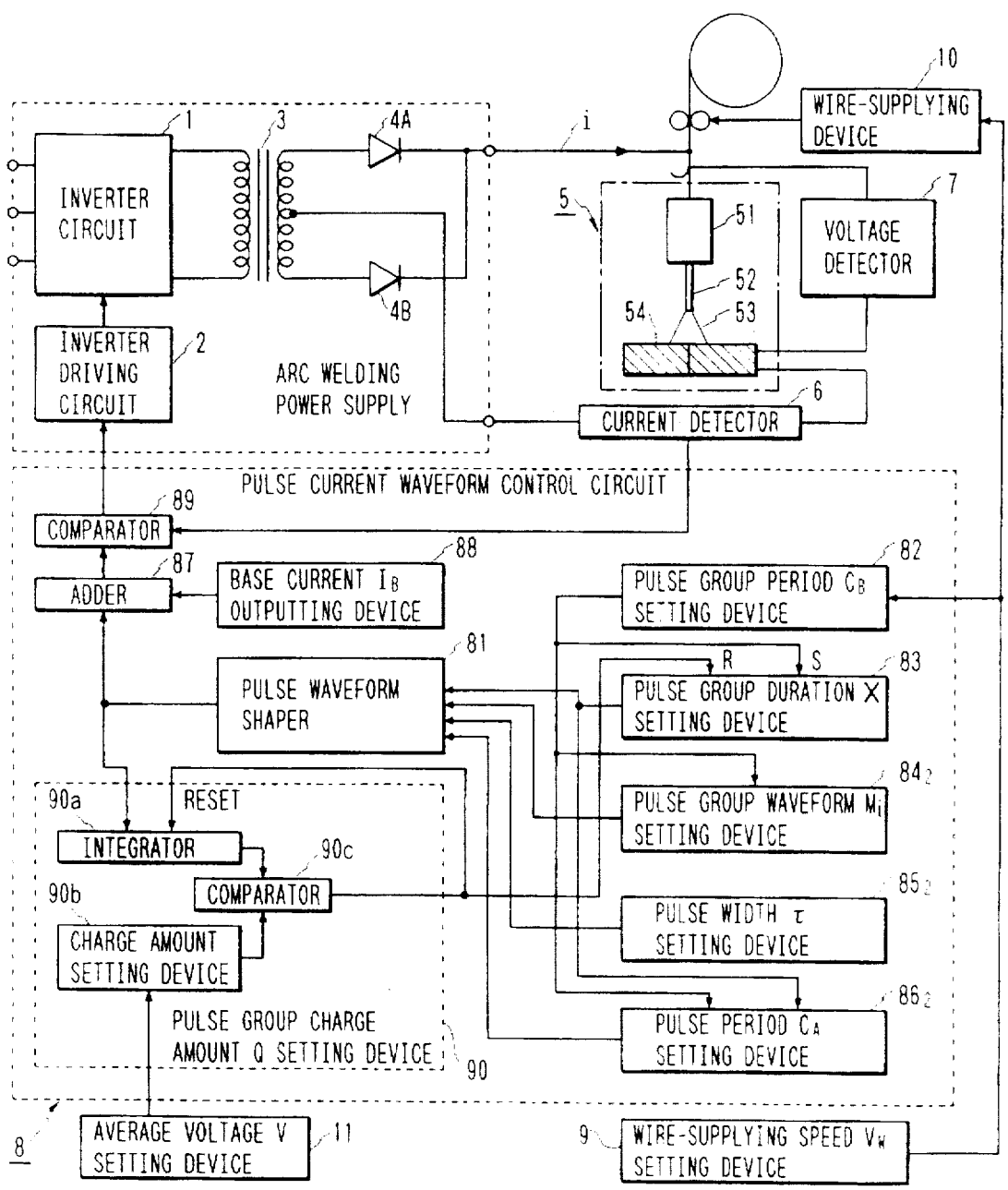
FIG. 27 is a block diagram showing an embodiment of a pulse welding apparatus according to an eighth invention.
Figure 28:
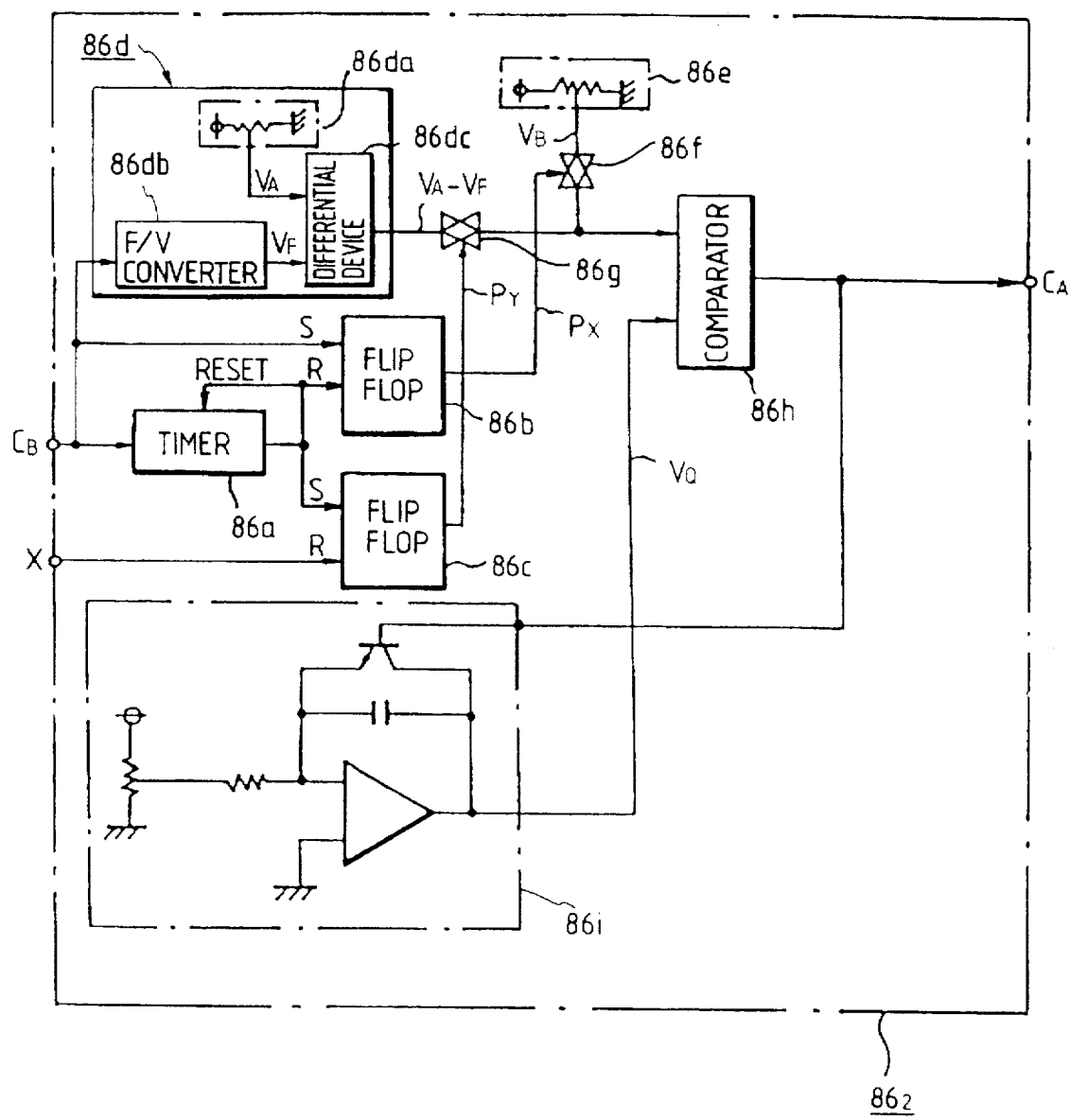
FIG. 28 is a block diagram showing a pulse period $C_A$ setting device shown in FIG. 27.

FIG. 27 shows a block diagram showing an embodiment of a pulse welding apparatus according to an eighth aspect of the invention. The same reference numerals as in FIG. 1 designate the same or corresponding elements. In the figure, the reference numeral $84_2$ denotes a pulse group waveform Mi setting device of the embodiment which causes the pulse intervals or pulse period $C_A$ within the pulse group duration X to vary in accordance with the pulse group period $C_B$ from the pulse group period $C_B$ setting device 82. FIG. 28 shows a specific circuit example of the pulse group waveform Mi setting device $84_2$.

As shown in FIG. 28, the pulse group waveform Mi setting device $84_2$ is provided with a timer 86a which operates in response to the pulse group period $C_B$ signal and is reset to cause the output thereof to change to the L level after it outputs the H level output after elapse of the set time $T_C$, a first flip flop 86b which is set by the pulse group period $C_B$ signal and is reset by the H level output of the timer 86a, a second flip flop 86c which is set by the H level output of the timer 86a and is reset by the pulse group duration X signal, a first 86e and a second pulse period setting device 86d which output the set value $V_B$ and $V_A-V_F$ for setting a first and second pulse period $C_{A1}$ and $C_{A2}$, respectively, analog switches 86f and 86g which are controlled their switching operation by the output of flip flops 86b and 86c, and a comparator which compares the set values $V_B$ and $V_A-V_F$ of the first and second pulse period setting devices 86e and 86d with the output $V_Q$ of an integrator 86i so as to output an H level output as the pulse period signal $C_A$ ($C_{A1}$, $C_{A2}$) when the integrated output $V_Q$ reaches $V_B$ or $V_A-V_F$ to reset the integrator 86i. The second pulse period setting device 86d is provided with a setting device 86da for outputting the set voltage $V_A$, and an F/V converter 86db which frequency-converts the pulse group period $C_B$ signal to output the voltage $V_F$, a subtractor 86dc which outputs the difference output $V_A-V_F$ between the set value $V_A$ and the conversion voltage $V_F$, and outputs a larger signal with the increasing frequency of pulse group period $C_B$ signal. Setting the value $V_A$ greater than the maximum voltage $V_F$ causes the polarity of the differential output proportional to the pulse group period $C_B$ to become positive. The pulse period $C_A$ becomes longer in accordance with ($V_A-V_F$) and the longer pulse period $C_A$ causes a longer pulse-absent duration (i.e., base current duration) to thereby retard the growth of the molten droplet per unit time. The set time $T_C$ of the timer 86a is the time period for the molten droplet, produced on the tip of wire electrode by means of a preceding pulse group current waveform determined by the first pulse period signal $C_{A1}$, to be constricted at the boundary of the wire electrode and molten droplet by pulse current, and for the constriction to grow till it is separated from the electrode. The pulse current in accordance with the second pulse period signal $C_{A2}$ outputted after the first pulse period signal promotes the molten droplet to grow so that the next pulse current group effects the regular transfer of the molten droplet onto the base metal.

Figure 29:
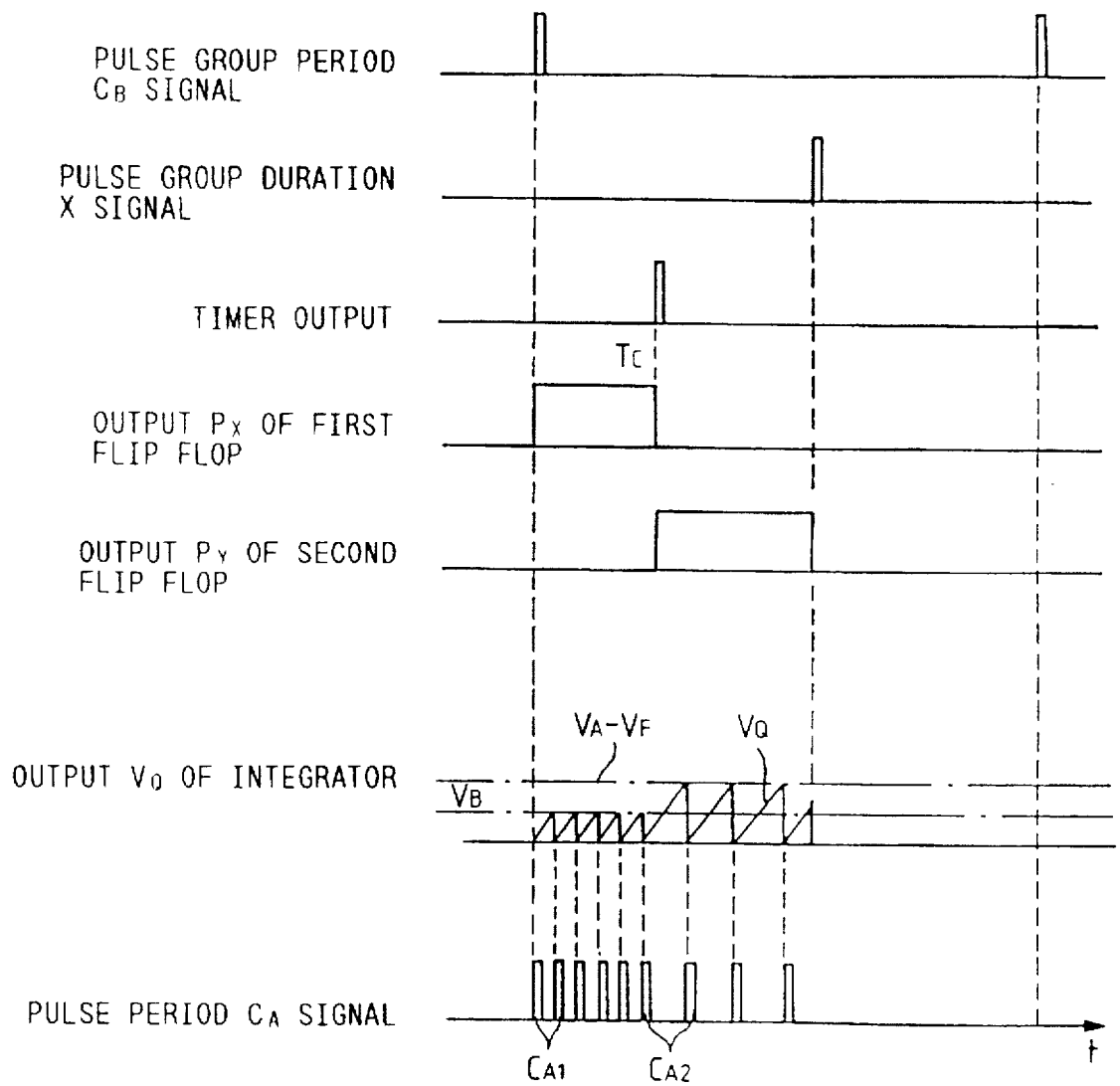
FIG. 29 is an operation time chart of FIG. 28.

The production of the first and second pulse period signals $C_{A1}$ and $C_{A2}$ by the pulse period $C_A$ setting device $86_2$ will now be described with reference to FIG. 29. When the pulse group period $C_B$ signal from the pulse group period $C_B$ setting device 82 is inputted to the set terminal of the first flip flop 86b as well as to the timer 86a, the first flip flop 86b is set to output the H level output $P_X$ which causes the analog switch 86f to close to direct the output $V_B$ of the first pulse period setting device 86e to the comparator 86h. The comparator 86h compares the output $V_B$ of the first pulse period setting device 86e with the output $V_Q$ of the integrator 86i to provide an output when $V_Q$ is equal to $V_B$. The output of the comparator 86h is the pulse period $C_{A1}$ signal determined by the first pulse period setting device 86e. The integrator 86i is reset by the output of the comparator 86h to resume integration, thereby repeating to output the first pulse period $C_{A1}$ signal.

When the timer 86a times to the set time $T_C$, the first flip flop 86b is reset by the timer output to output the L level $P_X$ which causes the analog switch 86f to be nonconductive so that the input from the first pulse period setting device 86e to the comparator is shut off. The second flip flop 86c is set by the timer output to output $P_Y$ of the H level which causes the analog switch 86g is closed to direct the output $V_A-V_F$ of the second pulse period setting device 86d to the comparator 86h. The comparator 86h compares the output $V_A-V_F$ of the second pulse period setting device 86d with the output $V_Q$ of the integrator 86i to provide an output when $V_Q$ is equal to $V_A-V_F$. The output of the comparator is the pulse period $C_{A2}$ determined by the second pulse period setting device 86d. The integrator 86i is reset by the output of the comparator 86h to resume integration, thereby outputting the second pulse period $C_{A2}$ signal determined by the above-mentioned comparison.

The pulse period $C_A$ signal from the pulse period setting device $86_2$ is adapted to cause the pulse intervals to be long with increasing repetition period of pulse current group. For the growth and separation of molten droplet produced on the tip of wire electrode when performing pulse arc welding, the first pulse period $C_{A1}$ signal having a relatively short period is outputted for the set time $T_C$ of the timer 86a i.e., the constriction of molten droplet at the boundary of the solid portion of wire electrode and molten droplet is expedited to ensure the separation of the molten droplet onto the base metal. Then, after the molten droplet has been separated from the electrode, the second pulse period $C_{A2}$ of a relatively long period is outputted to hold the pulse interval or pulse-absent duration longer so that the growth of molten droplet per unit time is retarded. Thus, retarding the lift of the molten droplet produced on the wire electrode and expediting the growth of the molten droplet, facilitates the separation of molten droplet during the next pulse group. The pulse interval is varied to control separately.

The operation of this embodiment will be described with reference to waveforms in FIG. 30. The pulse waveform shaper 81 receives the pulse duration X signal from the pulse group duration X setting device 83, the pulse group waveform (envelope) Mi signal from the pulse group waveform Mi setting device $84_2$, the pulse width τ signal from the pulse width τ setting device $85_2$, and the pulse period $C_A$ signal from the pulse period $C_A$ setting device $86_2$. At this time, the pulse group duration X setting device 83 in the form of a flip flop is set by the pulse group period $C_B$ signal determined by the wire-supplying speed $V_W$, and is reset by the output of the pulse group charge amount Q setting device 90. The pulse group waveform Mi setting device 84 provides an output in accordance with the pulse period $C_B$ signal and the pulse period $C_A$ setting device 86 provides an output in accordance with the pulse group period $C_B$ signal and pulse group duration X signal.

The pulse waveform shaper circuit 81 determines the pulse peak values of the respective pulse signals having a pulse width τ and a pulse period $C_A$ on the pulse envelope Mi in synchronism with the pulse group duration X signal to shape the pulses into an intermittent pulse group waveform as shown in FIG. 12. Further, the base current $I_B$ signal from the base current $I_B$ outputting device 88 is superposed to the intermittent pulse group waveform. The shaped pulse current signal and the current signal detected by the current detector 6 are inputted to the invertor drive circuit 2 which outputs the invertor drive signal in accordance with the pulse current waveform shown in FIG. 30 to the invertor circuit section 1 to drive it.

By driving the invertor, the shaped alternating waveform is outputted to the high frequency transformer 3. Then, the output of the transformer 3 is rectified into a d-c waveform, which is supplied in the form of a pulse arc current waveform in FIG. 30 to the weld zone or the arc load 5.

The arc load 5 is continuously supplied with the wire electrode together with the pulse current waveform i by means of a motor (not shown). Thus, the pulse arc current waveform i produces the pulse arc discharge 53 across the wire electrode 52 and the base metal 54 to melt both the base metal 54 and the tip of wire electrode 53. The melted portion of the wire electrode 52 is successively dropped onto the melted portion of the base metal, thus performing welding. As a result, the wire electrode 52 is continuously consumed. To supply wire being consumed, the wire electrode 52 is continuously supplied to the welding torch by the motor.

Figure 30:
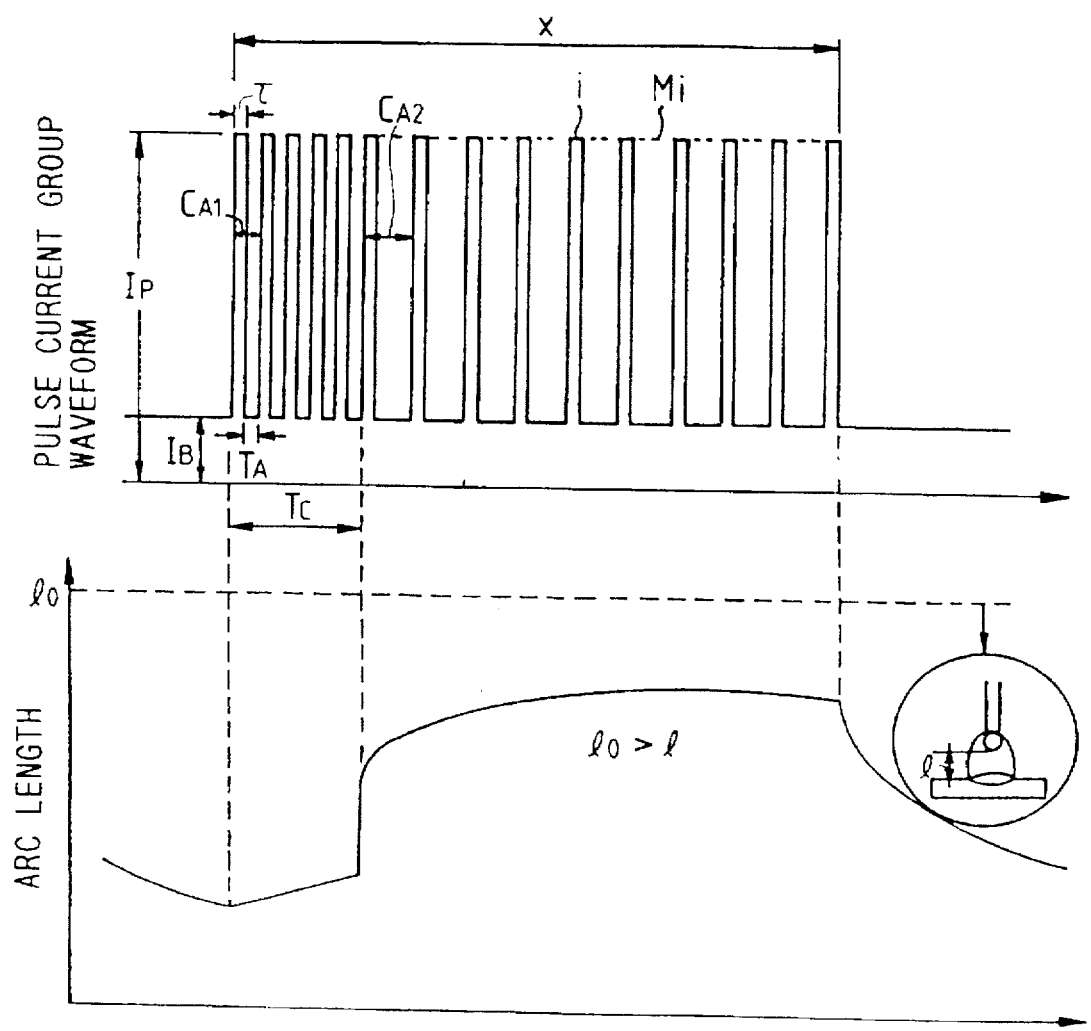
FIG. 30 is a waveform diagram illustrating the operation and effects derived from FIG. 28.

In the aforementioned embodiment, as shown in FIG. 30, the pulse period $C_A$ within the pulse group duration X outputted from the pulse waveform shaper 81 is variably controlled by the pulse period $C_A$ setting device 86 of the construction in FIG. 28 in accordance with the pulse group period $C_B$. For example, the second pulse period $C_{A2}$ becomes longer with increasing pulse group period $C_B$, thus causing the pulse intervals to increase. In which case, the first pulse period $C_{A1}$ signal is outputted at a fixed timing at all times. Thus, the pulse period or pulse interval is controlled to vary by the pulse period $C_A$ setting device 86. For the growth and separation of molten droplet on the tip of wire electrode in pulse-arc welding, the constriction at the boundary of the solid portion of wire electrode and molten droplet is expedited by pulse currents with pulse intervals determined by a relatively short pulse period signal $C_{A1}$ till the timer 86a times to the set time $T_C$ so as to cause the molten droplet to separate from the electrode onto the base metal at a predetermined time after beginning of pulse current group.

After the molten droplet has separated at the time $T_C$ of the timer 86a, a new molten droplet grows, while being lifted, on the tip end of wire electrode with the aid of pulse group, then the molten droplet on the wire tip will hang down during the base period and is shaped till the next pulse group begins, thus regularly repeating the growth and separation of molten droplet. In order to prevent the variations of arc length by providing pulse intervals proportional to the pulse group period $C_B$, i.e., pulse-absent period, the pulse current outputted in accordance with a relatively long second pulse period $C_{A2}$ having a pulse interval proportional to the pulse group period $C_B$ will reduce the lift phenomenon of the new molten droplet produced on the wire electrode and enables the molten droplet to grow, facilitating the separation of molten droplet during the next pulse group to regularly effect the transfer of the molten droplet onto the base metal. In this case, the second pulse period $C_{A2}$ is variably controlled in accordance with the pulse group period $C_B$ so that the arc length is reliably retarded below an allowable arc length lo where no undercut results.

The pulse current waveform is formed of a plurality of pulse currents, the pulse current group is arranged into a discharge current waveform which is periodically repeated. This means that one pulse is divided into a plurality of pulses. This division of pulse current causes the upward electromagnetic force due to the pulse arc discharge at the wire electrode to become intermittent, alleviating the force to lift the molten droplet produced on the wire tip. Therefore, not only in the argon-dominated shielding gas but also in $CO_2$ gas, the molten droplet produced on the tip of wire electrode can leave the wire electrode before it becomes large.

Of course, the set time TC in the aforementioned embodiment at which the pulse period $C_A$ is switched from one value to another, can be selected to be the best in accordance with the welding conditions such as the electrode diameter and shielding gas.

Figure 31:
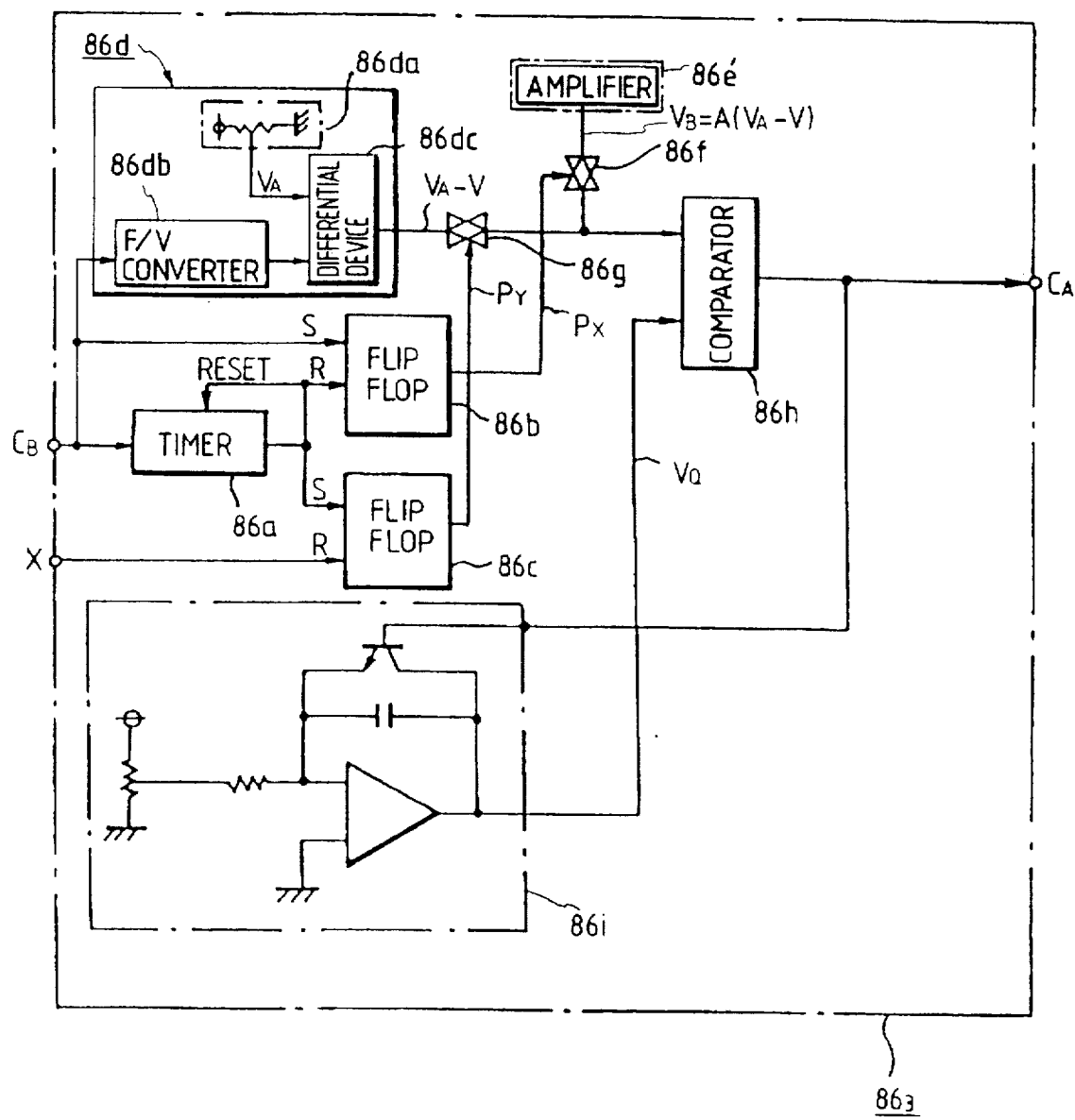
FIG. 31 is a waveform diagram illustrating a ninth invention, similar to that in FIG. 28.

FIG. 31 shows a ninth invention, in which a first pulse period setting device 86e' is constructed of an amplifier rather than a variable resistor whose output $V_B$ is the product of the output $V_A-V_F$ of the second pulse period setting device 86d and a predetermined amplification factor A to thereby variably controlling the first pulse period $C_{A2}$ just as in the second pulse period $C_{A1}$. By this arrangement, the first pulse period $C_{A2}$ can also be controlled in accordance with the pulse group period $C_B$ just as the first pulse period $C_{A1}$ is controlled, thus retarding the variations in the arc length during the first pulse period duration. It is justified that the first pulse period $C_{A1}$ is shorter than the second pulse period $C_{A2}$ because the growth and separation of molten droplet is a prime object.

Therefore, in this embodiment, the pulse interval is increased in accordance with the pulse group period to reduce the amount of charge injected by pulse current per unit time within the pulse group, thereby permitting control of the rate of growth of molten droplet in accordance with the pulse group period.

While the aforementioned embodiment has been described with respect to means by which the amount of charge of pulse group is detected to hold it to a desired level, the energy injected into the molten droplet may also be held constant to obtain the same effects. Although the embodiment has been described with respect to a pulse arc welding apparatus, the invention may also be applied to a short-circuiting welding apparatus, as far as the apparatus has a means embodied in FIG. 9, rendering the short-circuiting period and arc period regular and retarding the variations in the amount of bead and the depth into which the bead is melted for good quality of short-circuiting arc welding.

Figure 32:
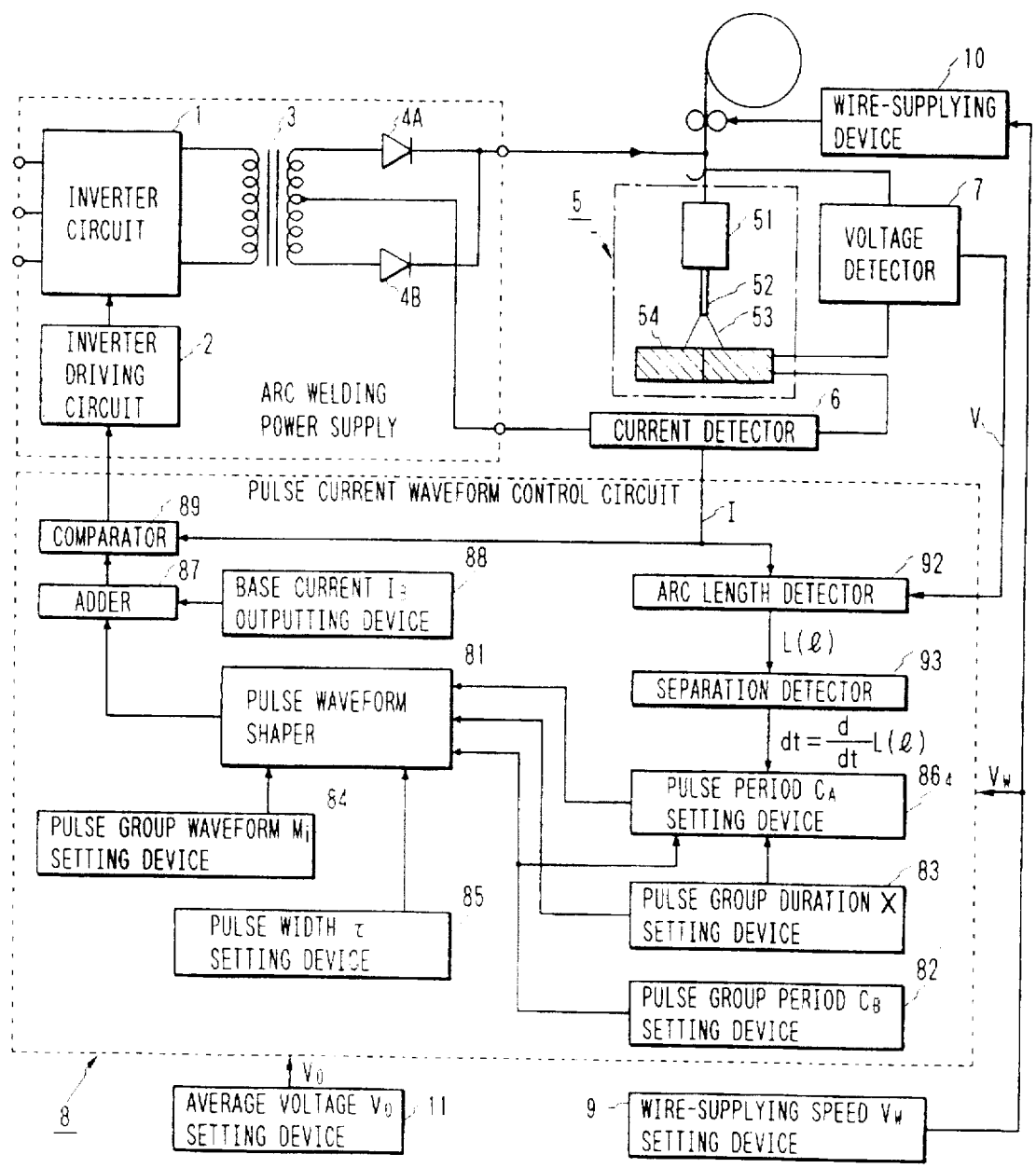
FIG. 32 is a block diagram showing an embodiment of a pulse welding apparatus according to a tenth invention.
Figure 33:
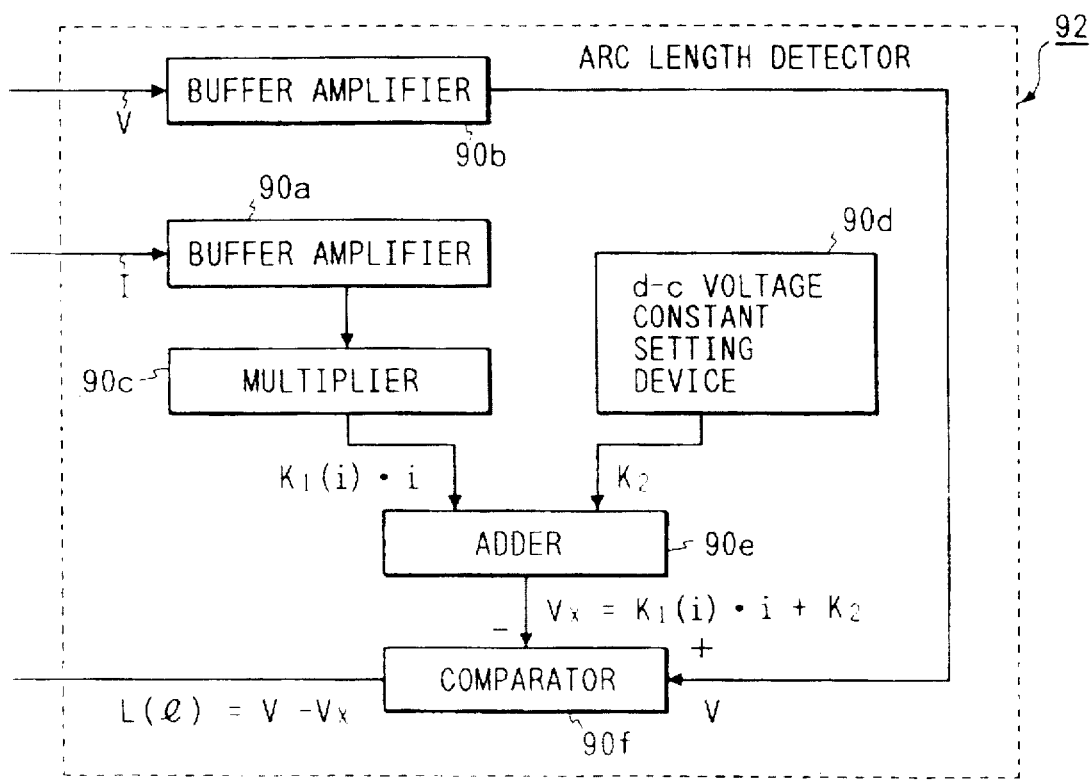
FIG. 33 is a circuit diagram of another embodiment of an arc length detector in FIG. 32.

FIG. 32 is a block diagram showing an embodiment of a pulse welding apparatus according to a tenth aspect of the present invention. In the figure, the same reference numerals as in FIG. 1 denote the same or corresponding elements. In the figure, the reference numeral $86_4$ denotes a pulse period $C_A$ setting device according to the embodiment. The reference numeral 90 denotes an arc length detector 90 which detects the arc length L(l) between the tip of wire electrode and the base metal in accordance with the current I detected by the current detector 6 and the voltage V detected by the voltage detector 7. The arc length detector 90 is of the construction shown in FIG. 33. In FIG. 33, the arc length detector 90 includes buffer amplifiers 90a and 90b, a multiplier 90c which reads a current i via the buffer amplifier 90a and determines a value K1(i), and a d-c voltage constant setting device 90d for setting an offset voltage constant K2, and an adder 90e which adds the outputs of the multiplier 90c and the d-c voltage constant setting device 90d, and a comparator 90f which compares the adder output VX=K1(i)·i+K2 with the detected voltage V from the voltage detector 7 to output the comparison result L(l)=V−VX. Thus, the arc length signal is detected according to the length of arc in accordance with the detected voltage and detected current.

In other words, the arc length signal V can be expressed by $$V = R(i) \cdot i + Al + B$$

where R(i) is an arc positive characteristic constant, i is an arc length, A is a proportional constant with respect to arc length, l is an arc length, and B is a minimum voltage. Alternatively, in terms of circuit constants, the arc length can be expressed by the voltage $V_X$ $$VX = K1(i) \cdot i + K2$$

where K1(i) is a constant and K2 is an offset voltage constant. Thus, the difference L(l) is given by $$L(l) = V - V_x$$
$$= \{R(i)K1(i)\}i + Al + B - K2$$

if R(i)≈K1, then L(l)=Al+(B−K2), therefore the comparison difference L(l) is a function of arc length. By selecting suitable values of A, B, and K2, the comparison difference L(l)=V−VX outputted from the comparison 10f is an arc length signal, thereby detecting the actual arc length.

The reference numeral 91 denotes a separation detector for producing a separation signal $d_f$ of the molten droplet on the basis of the arc length detection value L(l) of the arc length detector 90. The separation can be detected from a differentiation signal $d_f=d\{L(l)\}/dt$ since the arc voltage L(l)=V−V$_X$ in accordance with the arc length from the arc length detector 90 increases abruptly when the molten droplet leaves the electrode. In FIG. 32, the reference numeral 9 and 10 are a wire-supplying speed $V_W$ setting device for setting the wire-supplying $V_W$ and a wire-supplying apparatus for controlling the wire-supplying speed on the basis of the speed set by the wire-supplying speed device 9. The numeral 11 is an average voltage V setting device for setting the pulse peak value, which forms the pulse group, to set an average voltage Vo to be supplied to the pulse group waveform Mi setting device 84.

Figure 34:
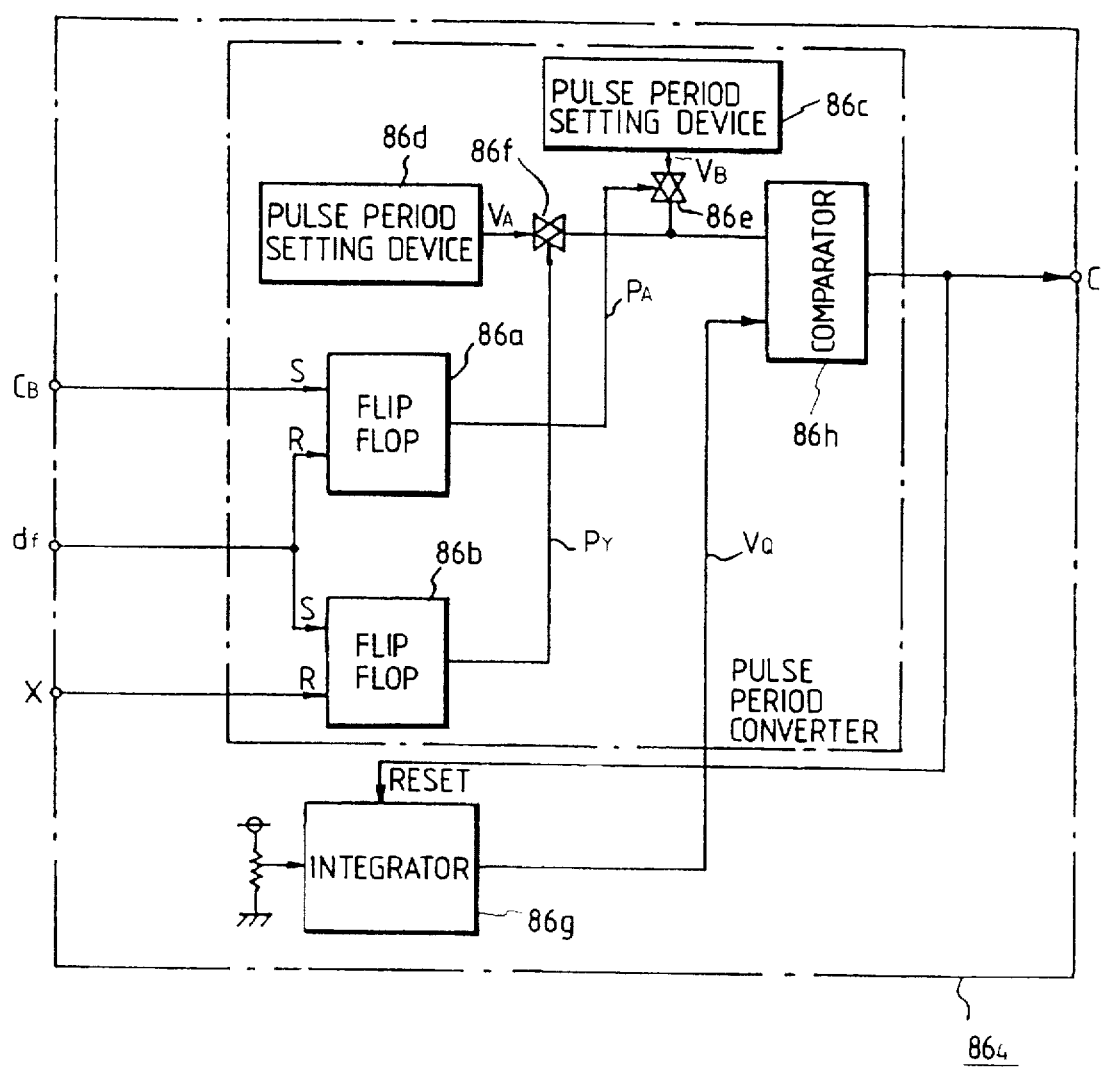
FIG. 34 is a circuit diagram showing an embodiment of a pulse period $C_A$ setting device.

With the construction in FIG. 32, the pulse period $C_A$ setting $86_4$ causes the pulse period $C_A$ or pulse interval (base current duration=pulse-absent duration) to vary in accordance with the pulse group period $C_B$ and separation signal $d_f$ supplied thereto. FIG. 34 shows a specific circuit example thereof.

As shown in FIG. 34, the pulse period $C_A$ setting device $86_4$ is provided with a first flip flop 86a which is set by the pulse group period $C_B$ signal and is reset by the detection signal $d_f$ from the separation detector 91, a second flip flop 86b which is set by the detection signal $d_f$ of the separation detector 91 and is reset by the pulse group duration X signal, a first and second period setting devices 86c and 86d which output a set value $V_B$ and $V_A$ for setting the first and second pulse period $C_{A1}$ and $C_{A2}$, respectively, analog switches 86e and 86f which are opened and closed in accordance with the output of the flip flops 86a and 86b, and a comparator which compares the set values $V_B$ and $V_A$ with the output $V_Q$ of the integrator 86g to output an H level to reset the integrator 86g as well as to output as the pulse period signal $C_A$ when the integrated output $V_Q$ reaches $V_B$ or $V_A$. The set value $V_A$ of the second pulse period setting device 86d is greater than the set value $V_B$ of the first pulse period setting device 86e so that the pulse period $C_A$ outputted from the comparator 86h, which compares the $V_A$ with $V_Q$, will have the pulse period $C_{A2}$ in accordance with the set value $V_A$ longer than the pulse period $C_{A1}$ in accordance with the set value $V_B$. Thus, the pulse period $C_A$ causes the longer pulse-absent duration (base current duration) so as to retard the rate of growth of molten droplet per unit time.

Therefore, the molten droplet on the tip of wire electrode which has been produced by the pulse group current waveform preceding to a pulse group in accordance with the first pulse period group signal $C_{A1}$, is constricted by the pulse current at the boundary of molten droplet and the wire electrode and then the constriction is promoted to separate from the electrode, then the next molten droplet is promoted to grow by the pulse current in accordance with the second pulse period signal $C_{A2}$ outputted after the separation signal $d_f$ is issued by the separation detector 91, thereby performing the regular transfer of the molten droplet.

Figure 35:
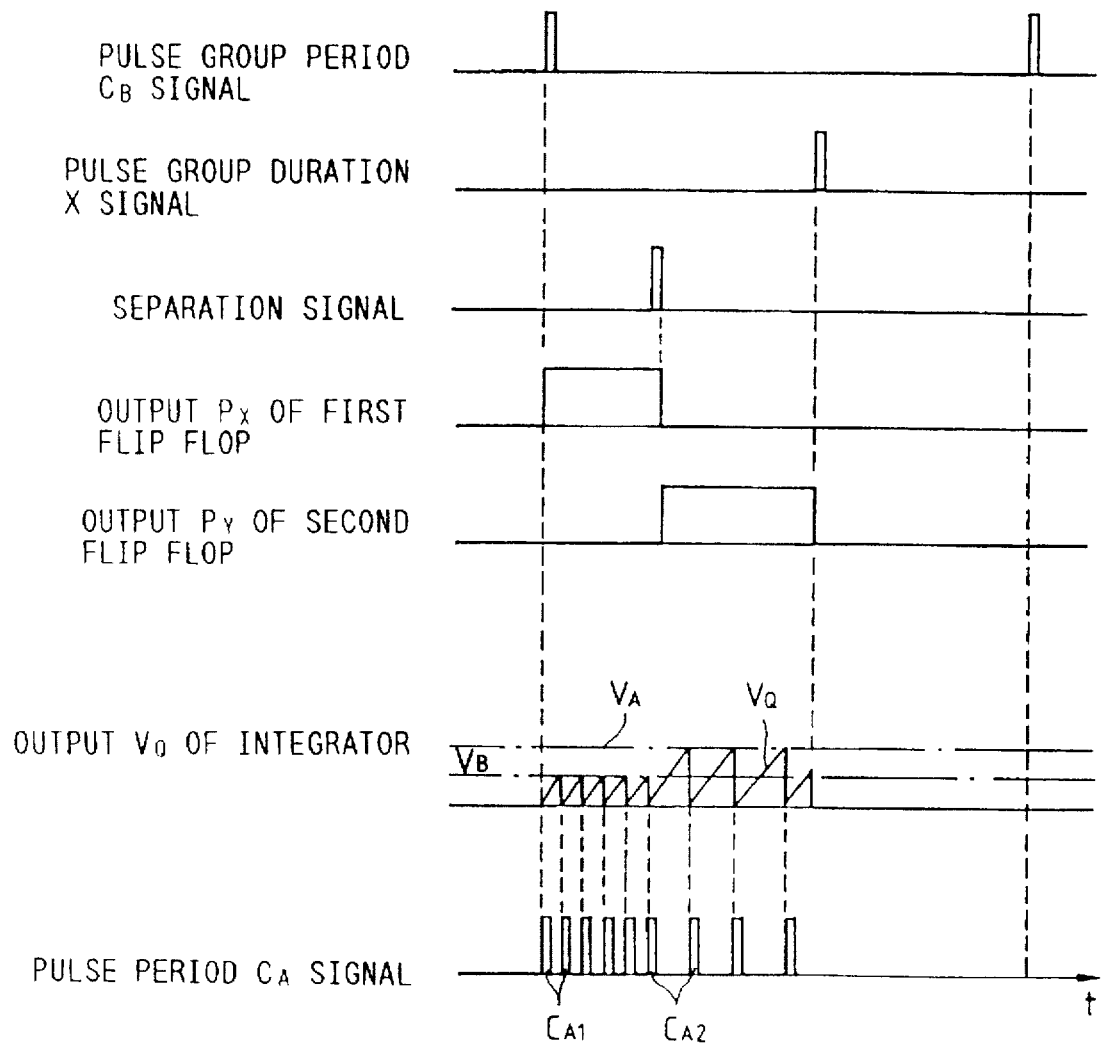
FIG. 35 is an operation time chart of the circuit in FIG. 34.

The production of the first and second pulse period signals $C_{A1}$ and $C_{A2}$ produced by the pulse period $C_A$ setting device $86_4$ will now be described with reference to FIG. 35.

When the pulse group period $C_B$ signal from the pulse group period $C_B$ setting device 82 is inputted to the set terminal of the first flip flop 86a, the first flip flop 86b is set by the pulse group period $C_B$ signal to provide the output signal $P_X$ which in turn causes the analog switch 86e, and the output $V_B$ of the first pulse period setting device 86c is inputted to the comparator 86h. The comparator 86h compares the output $V_B$ of the first pulse period setting device 86c with the output $V_Q$ of the integrator 86g to provide an output when $V_Q$ equals $V_B$. The output $V_Q$ has the pulse period $C_{A1}$ in accordance with the first pulse period setting device 86c. The integrator 86g is reset by the output of the comparator 86h to resume integration to repeatedly output the first pulse period $C_{A1}$ in accordance with the aforementioned comparison result.

When the separation signal $d_f$ from the separation detector 91 arrives, the first flip flop 86a is reset in synchronism with the separation signal $d_f$ to output $P_X$ of the L level which causes the analog switch 86e to become non-conductive to shut off the comparison input to the comparator from the first pulse period setting device 86c. At the same time, the second flip flop 86b is set by the separation signal $d_f$ to provide an output $P_Y$ of the H level which in turn causes the analog switch 86f to close to direct the output $V_A$ of the second pulse period setting device 86d to the comparator 86h. The comparator 86h compares the output $V_A$ of the second pulse period setting device with the output $V_Q$ of the integrator 86g to provide an output when $V_Q$ equals $V_A$, the output $V_Q$ has the pulse period $C_{A1}$ in accordance with the second pulse period setting device 86d. The integrator is reset by the output of the comparator 86h to resume integration to repeatedly output the second pulse period $C_A$ signal in accordance with the aforementioned comparison result.

The pulse period $C_A$ signal outputted from the pulse period setting device $86_4$ is arranged to have different pulse intervals in accordance with the separation detection of molten droplets produced on the tip of wire electrode.

In the phenomenon of the growth of molten droplets on the tip of wire electrode and the separation of the molten droplets from the electrode, the first pulse period $C_{A1}$ signal of a relatively short period is outputted till the constriction of the molten droplet on the tip of the wire electrode is well promoted such that the molten droplet is ensured to separate from the electrode onto the base metal i.e., till the detection signal $d_f$ is supplied from the separation detector 91; then, after the molten droplet has been separated from the electrode, the second pulse period $C_{A2}$ signal having a relatively long period is outputted to hold a long pulse-absent period. This enables to variably control the pulses with different intervals, which permit not only the rate of growth of a new molten droplet to be retarded but also the lift phenomenon of the molten droplet to be suppressed. As a result, the molten droplet grows promptly, being ready to subsequently separate at regular timings with the aid of the pulse group.

The operation of the embodied apparatus will be described with reference to the waveforms in FIG. 36. The pulse waveform shaper 81 receives the pulse group period $C_B$ signal from the pulse group period $C_B$ setting device 82, the pulse group duration X signal from the pulse group waveform Mi setting device 84, the pulse group (envelope) Mi signal from the pulse group waveform Mi setting device 84, the pulse width τ signal from the pulse width τ setting device 85, and the pulse period $C_A$ signal from the pulse period $C_A$ setting device $86_4$, respectively. At the same time, the pulse period $C_A$ setting device 86 outputs the pulse period $C_A$ in accordance with the pulse group period $C_B$ signal. The pulse period $C_A$ takes the form of the pulse period signal $C_{A1}$ until the separation signal $d_f$ is supplied from the separation detector 91 and takes the form of the pulse period signal $C_{A2}$ having a relatively longer than the pulse period signal $C_{A1}$ after the separation signal $d_f$ has been supplied.

Figure 36:
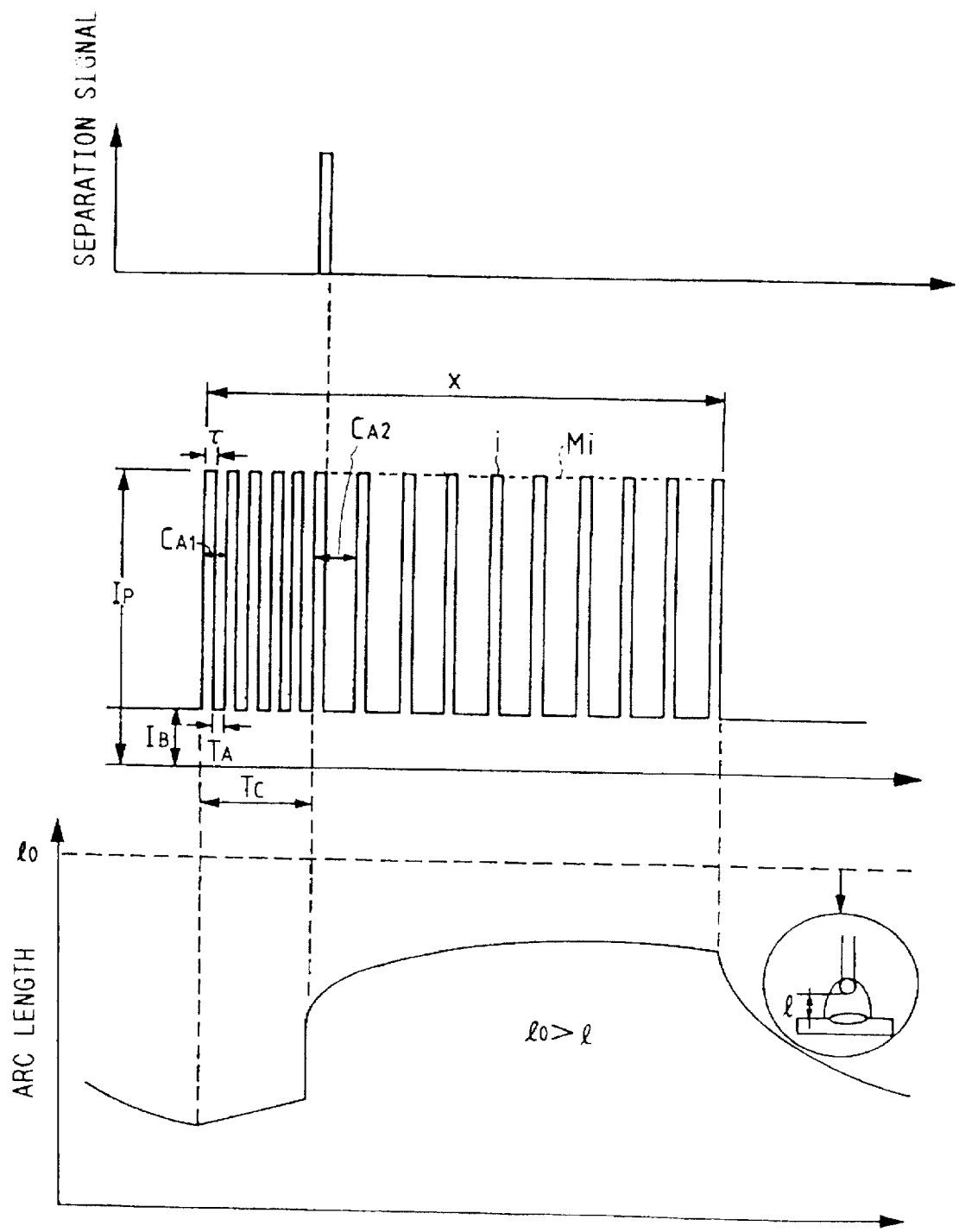
FIG. 36 is a waveform diagram illustrating the operation and effects derived from a block diagram in FIG. 32.

The pulse waveform shaper circuit 81 determines the pulse peak values of the respective pulse signals having pulse width τ and a pulse period $C_A$ on the pulse envelope Mi in synchronism with the pulse group duration X signal and shapes the respective signals into the intermittent pulse envelope waveform as shown in FIG. 36. Then, the signals are further formed into a waveform where the base current $I_B$ from the base current $I_B$ output device 88 is superposed to the aforementioned intermittent pulse group waveform. The thus formed pulse current signal and the current signal detected by the current detector 6 are inputted to the invertor drive circuit 2 which outputs the invertor drive signal in accordance with the pulse arc current waveform i shown in FIG. 36 to the invertor circuit section 1 to drive the invertor.

Driving the invertor causes the shaped alternating waveform to be outputted from the high frequency transformer 3. The output of the high frequency transformer 3 is rectified by the high frequency diodes 4A and 4B into a d-c waveform so as to supply the pulse arc current waveform i to the arc load 5.

The arc load 5 is continuously supplied with the pulse arc current waveform i together with the wire electrode 52 by a motor (not shown). Thus, the pulse arc current waveform i produces the pulse arc discharge 53 across the wire electrode 52 and the base metal 54 which the discharge 53 in turn melts the tip end of the wire. The melted portion of the wire electrode 52 drops onto the melted portion of base metal to perform welding. As a result, the wire electrode 52 is continuously being consumed. To replenish the amount of consumed electrode, the wire electrode 52 is continuously being supplied to the welding torch 51.

The pulse period $C_A$ within the pulse group duration X outputted from the pulse waveform shaper 81 is variably controlled by the pulse period $C_A$ setting device $86_4$ of the construction in FIG. 34 in accordance with the separation signal $d_f$ from the separation detector 91. Then, in the phenomenon of the growth of molten droplets on the tip of wire electrode and the separation of the molten droplets from the electrode, before the separation signal $d_f$ is supplied, the molten droplet is promoted to be constricted at the boundary of the solid portion of wire electrode and the molten droplet by the pulse current with pulse intervals in accordance with a fixed, relatively short pulse period signal $C_{A1}$, thus separating from the electrode onto the base metal.

After the molten droplet has been separated, a new molten droplet grows while being lifted by the pulse group, and the lifted molten droplet on the tip of wire electrode will hang down during the subsequent base duration to shape up by the beginning of the next pulse group, thus repeating the growth and separation of molten droplet regularly. The molten droplet is grown and the lift phenomenon of a new molten droplet grown on the tip of wire is retarded by the pulse current which is outputted in accordance with a relatively long second pulse period $C_{A2}$ outputted upon the detection of the separation signal $d_f$ so as to prevent the variation of arc length l. This facilitates the separation of molten droplet during the subsequent pulse group, performing the transfer of molten droplet in a regular fashion. In this case, by the relatively long second pulse period $C_{A2}$ which is repeated upon the detection of the separation signal $d_f$, the arc length is ensured to be less than the allowable arc length lo where no undercut results.

The pulse current waveform is formed of a plurality of pulse currents which is repeated periodically to form a discharge current waveform. This means that one pulse is divided into a plurality of pulses. This division of pulse current causes the upward electromagnetic force due to the pulse arc discharge at the wire electrode to become intermittent, alleviating the force tending to lift the molten droplet produced on the wire tip. Therefore not only in the argon-dominated shielding gas is argon but also in $CO_2$ gas, the molten droplet produced on the tip wire electrode can leave the wire electrode before it becomes large.

In the aforementioned embodiment, while the pulse interval is switched from one value to another when the molten droplet separates from the electrode, either the pulse width or pulse period may be switched from one value to another when the molten droplet separates from the electrode. In other words, the arc length is prevented from becoming longer because the residual molten droplet is lifted up after the previous molten droplet has separated by using narrower pulse widths and longer pulse periods, thus reducing the lifting force due to pulses to control the rate of growth of molten droplets.

Although the aforementioned embodiment has been described with respect to a pulse arc welding apparatus, the embodied means of the present invention can be applied to a short-circuiting arc welding apparatus so as to make the short-circuiting period and the arc period regular and to reduce the variations of the reinforcement of welding bead and weld penetration, thus allowing to perform short-circuiting arc welding with better quality.

Figure 37:
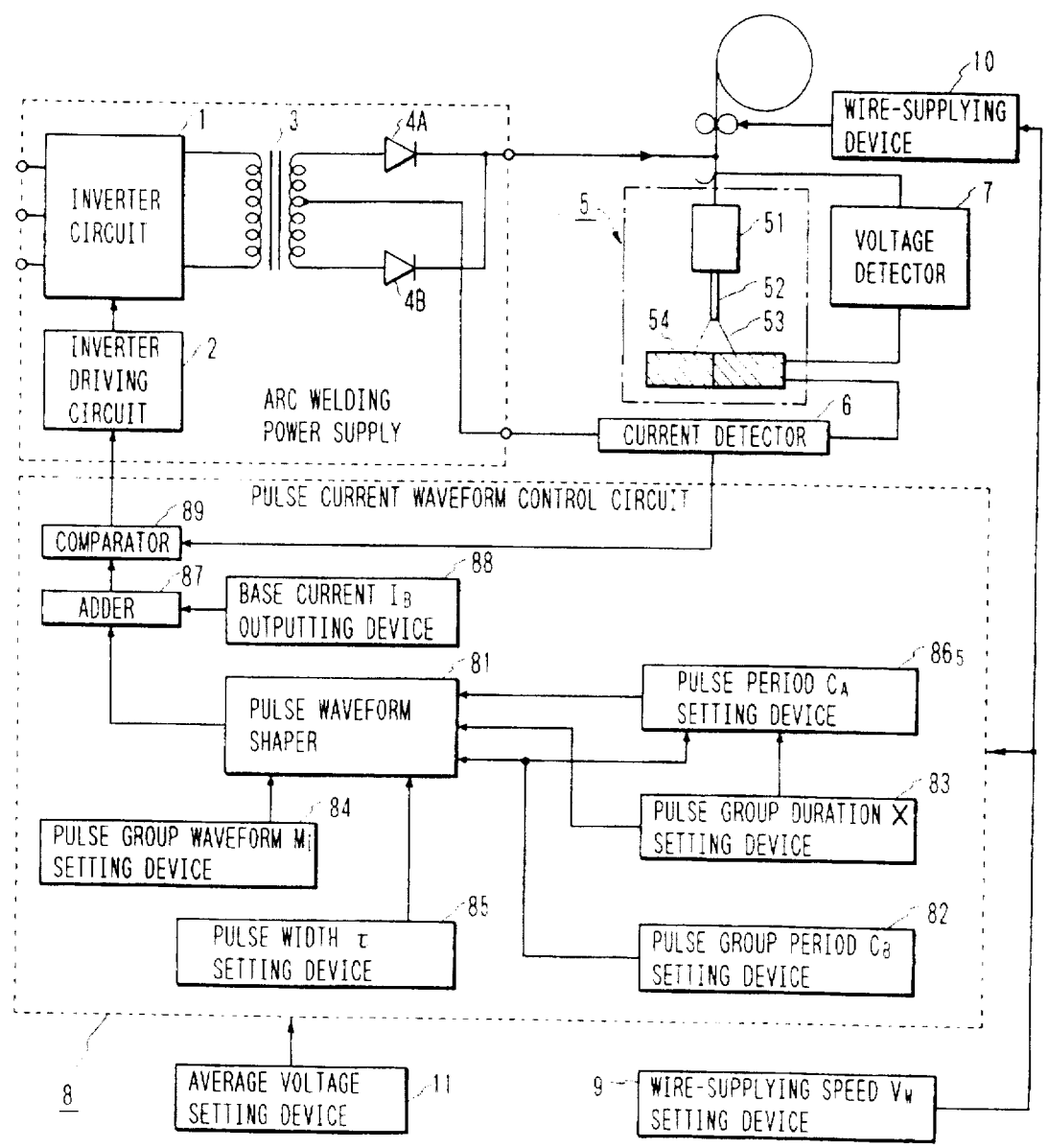
FIG. 37 is a block diagram of an embodiment of a pulse welding apparatus according to an eleventh.

FIG. 37 shows an embodiment of a pulse welding apparatus according to an eleventh invention. In the figure, elements similar to those in FIG. 1 have been given the same or similar reference numerals. In the figure, the reference numeral $86_5$ denotes a pulse period $C_A$ setting device according to the embodiment in which the pulse period $C_A$ setting device $86_5$ receives the pulse group period $C_B$ from the pulse group period $C_B$ setting device 82 to vary the pulse period $C_A$ or pulse interval within the pulse group duration X. FIG. 33 shows a specific circuit example of the pulse period $C_A$ setting device $86_5$.

Figure 38:
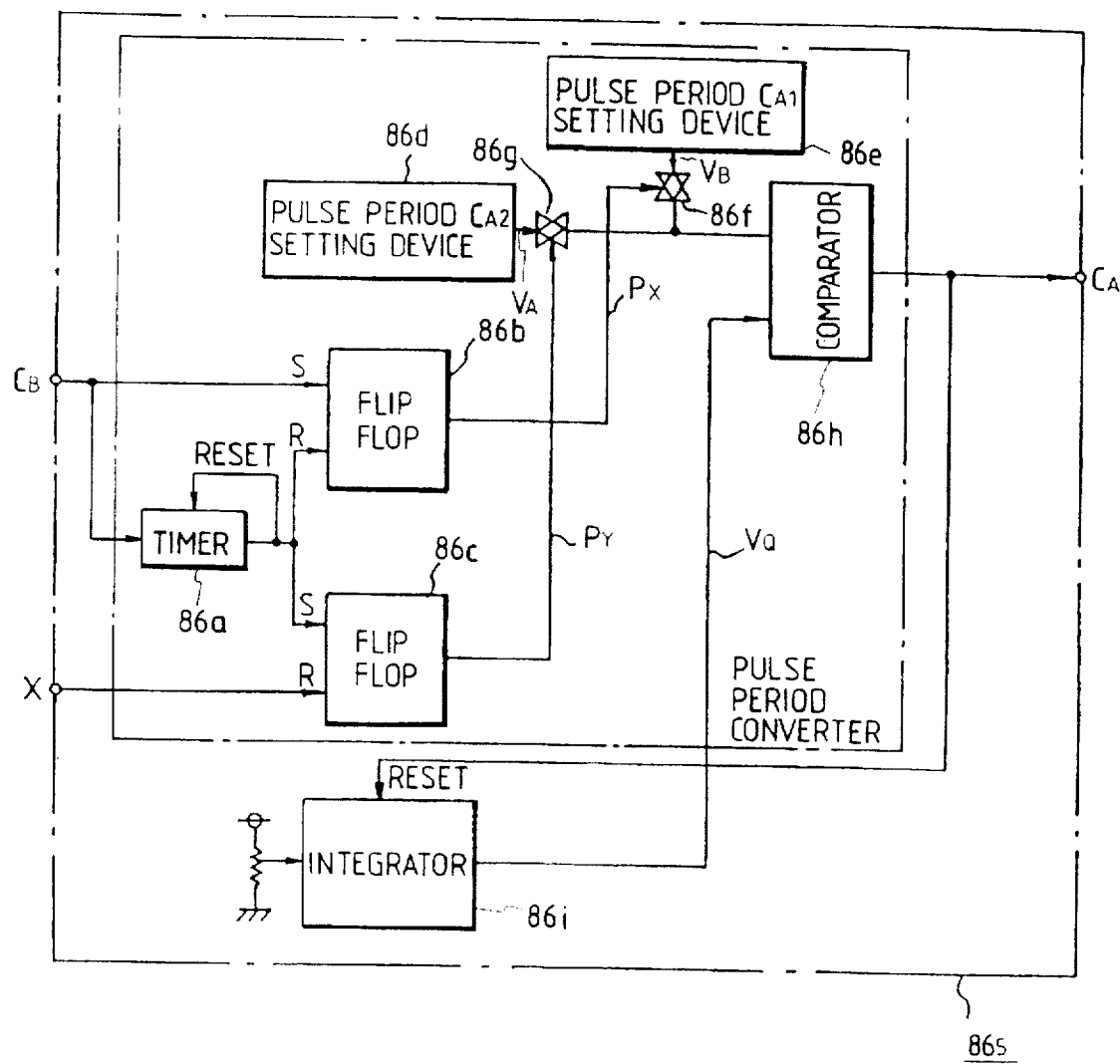
FIG. 38 is a circuit diagram showing the pulse period $C_A$ setting device in FIG. 37.

As shown in FIG. 38, the pulse period $C_A$ setting device $86_5$ is provided with a timer 86a which operates in response to the pulse group period $C_B$ signal and is immediately reset to an L level output after it provides an H level after the set time $T_C$, a first flip flop 86b which is set by the pulse group period $C_B$ signal and is reset by the H level output of the timer 86a, a second flip flop 86c which is set by the H level output of the timer 86a and is reset by the pulse group duration X signal, a first and a second pulse period setting device 86e and 86d which outputs the set time $V_B$ and $V_A$, respectively, used for setting the first and second pulse periods $C_{A1}$ and $C_{A2}$, analog switches 86f and 86g which are controlled to open and close by the output of the flip flops 86b and 86c, and a comparator 86h which compares the set values $V_B$ and $V_A$ with the output $V_Q$ of the integrator 86i to output an H level which serves as the pulse period signal $C_A$ ($C_{A1}$ and $C_{A2}$) and resets the integrator 86i when the integrated output $V_Q$ reaches $V_B$ or $V_A$. The set value $V_A$ of the second pulse period setting device 86d is set greater than the set value $V_B$ of the first pulse period setting device 86e. This allows the pulse period $C_A$, outputted from the comparator 86h as a result of comparison with the integration output $V_Q$, to have the pulse period $C_{A2}$ longer than the pulse period $C_{A1}$. The pulse period $C_A$ causes the pulse-absent duration (base current duration) to be long thereby retarding the rate of growth of the molten droplet. The set time $T_C$ of timer 86a determines the time $T_C$ such that the molten droplet which has been produced on the tip of wire electrode by the preceding pulse group current waveform determined by the first pulse period signal $C_{A1}$ is constricted, the constriction is well developed, and the molten droplet is then separated from the electrode. The pulse current determined by the second pulse period signal $C_{A2}$ serves to promote the growth of the next molten droplet so as to perform the transfer of the molten droplet in a regular manner.

Figure 39:
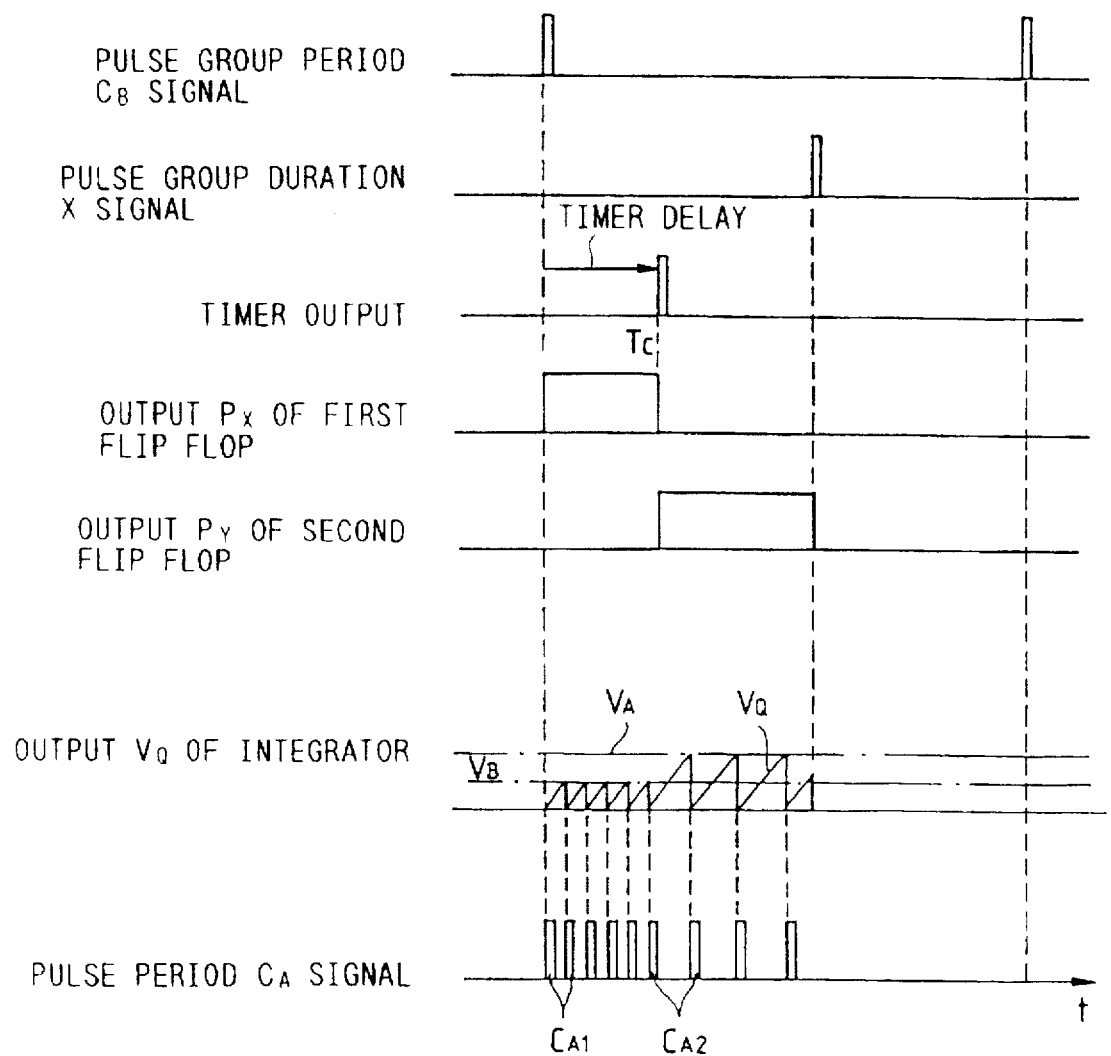
FIG. 39 is an operation time chart of the circuit in FIG. 38.

The production of the first and second pulse period signal $C_{A1}$ and $C_{A2}$ by the pulse period setting device 86 will be described with reference to FIG. 39. When the pulse group period $C_B$ signal from the pulse group period $C_B$ setting device 82 is inputted to the set terminal as well as to the timer 86a, the first flip flop 86b is set to provide an output $P_X$ of an H level which causes the analog switch 86f to close so as to direct the output of the first pulse period setting device 86e to the comparator 86h. The comparator 86h compares the $V_B$ of the first pulse period setting device 86e with the output $V_Q$ of the integrator 86i to provide the pulse period $C_A$ signal when $V_Q$ equals $V_B$. This pulse period $C_A$ signal is the pulse period $C_{A1}$ determined by the first pulse setting device 86e. The integrator 86i is reset by the output of the comparator 86h to resume integration so as to repeatedly output the first pulse period $C_{A1}$ signal based on the aforementioned comparison result.

Then, when the timer times to the set time $T_C$, the first flip flop 86b is reset by the timer output to output $P_X$ of an L level which in turn causes the analog switch 86f to open, shutting off the comparison input from the first pulse period setting device 86e to the comparator 86h. At the same time, the second flip flop 86c is set by the timer output to output $P_Y$ of an H level which causes the analog switch 86g to close to direct the output $V_A$ of the second pulse period setting device 86d to the comparator 86h. The comparator 86h compares the output $V_A$ of the second pulse period setting device 86d with the output $V_Q$ of the integrator 86i to provide an output when $V_Q$ equal $V_A$. This output is the pulse period $C_A$ signal having the pulse period $C_{A2}$ determined by the second pulse period setting device 86d. The integrator 86i is reset by the output of the comparator 86h to resume integration, thereby repeatedly outputting the second pulse period $C_{A2}$ signal based on the aforementioned comparison result.

In other words, the pulse period setting device $86_5$ is arranged to have a longer pulse interval after the set time $T_C$ at which the molten droplet on the wire tip separates therefrom. In the phenomenon of the growth of molten droplets on the tip of wire electrode, the first pulse period $C_{A1}$ signal of a relatively short period is outputted till the constriction of the molten droplet on the tip of the wire electrode is well promoted such that the molten droplet is ensured to separate from the electrode onto the base metal, i.e., during the set time $T_C$; then, after the molten droplet has been separated from the electrode, the second pulse period $C_{A2}$ having a relatively long period is outputted to hold a long pulse-absent period or pulse interval. This enables to variably control the pulses with different intervals, which permit not only the rate of growth of a new molten droplet to be retarded but also the lift phenomenon of the molten droplet to be suppressed. As a result, the molten droplet grows promptly, being ready to subsequently separate at regular timings with the aid of the pulse group.

The operation of this embodied apparatus will be described with reference to the waveform of FIG. 40. The pulse waveform shaper 81 receives the pulse group period $C_B$ signal from the pulse group period $C_B$ setting device 82, the pulse duration X signal from the pulse group duration X setting device 83, the pulse group waveform (envelope) Mi signal from the pulse group waveform Mi setting device $86_2$, and the pulse width τ signal from the pulse width τ setting device 85, and the pulse period $C_A$ signal from the pulse period $C_A$ setting device $86_5$. At this time, the pulse group duration X setting device 86 is arranged to send out an output in accordance with the pulse group period $C_B$ signal and the pulse group duration X signal. The pulse period $C_A$ outputted is the pulse period $C_{A1}$ from beginning of the outputting pulses till the timer times to the set time $T_C$, and is the pulse period $C_{A2}$ relatively longer than the pulse period signal $C_{A1}$.

Figure 40:
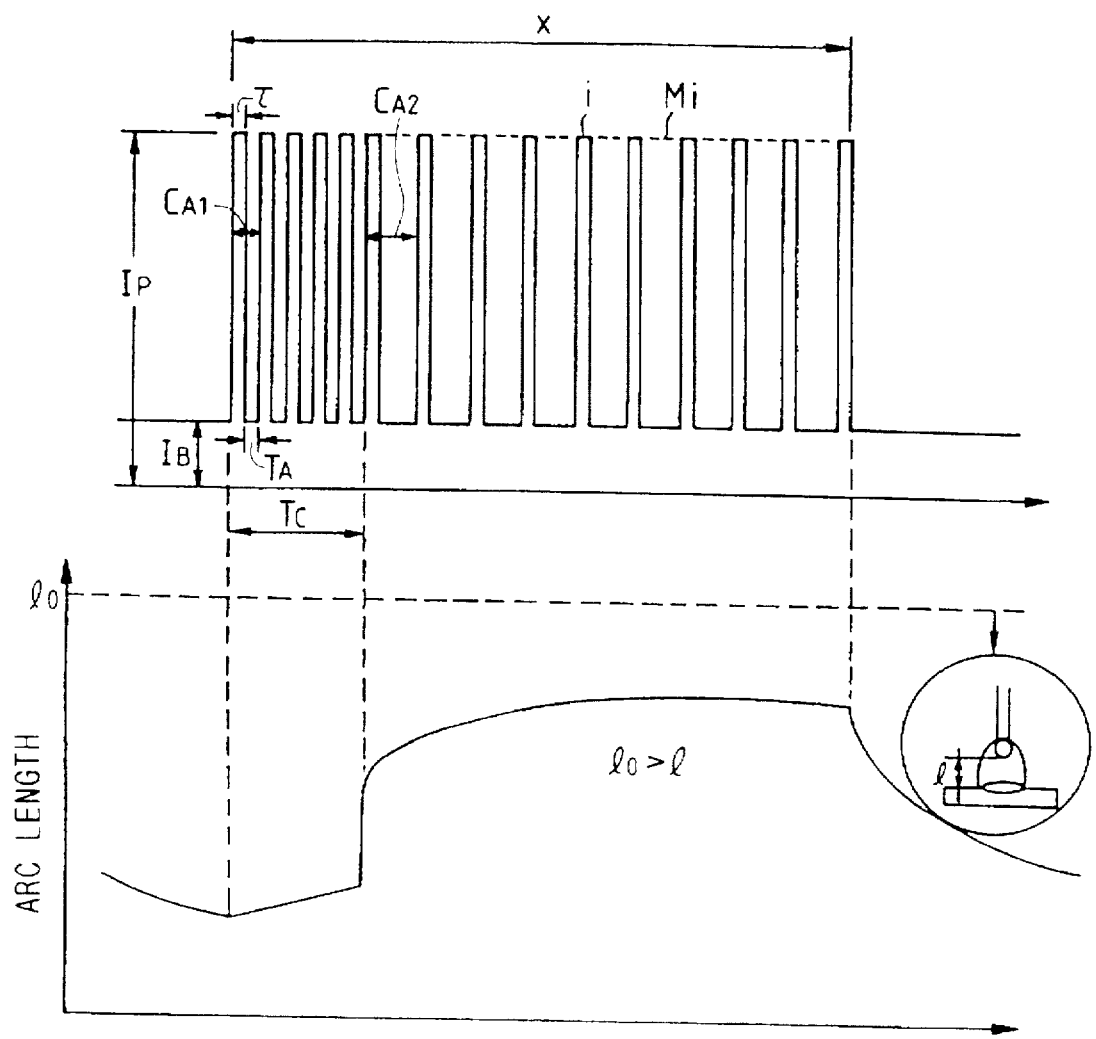
FIG. 40 is a waveform diagram illustrating the operation and effects thereof of FIG. 37.

The pulse waveform shaper circuit 81 determines the pulse peak values of the respective pulse signals having a pulse width τ and a pulse period $C_A$ on the pulse envelope Mi in synchronism with the pulse group duration X signal to shape up the pulses into an intermittent pulse group waveform as shown in FIG. 40. Further, the base current $I_B$ signal from the base current $I_B$ outputting device 88 is superposed to the intermittent pulse group waveform. The shaped pulse current signal and the current signal detected by the current detector 6 are inputted to the invertor drive circuit 2 which outputs the invertor drive signal in accordance with the pulse arc current waveform i shown in FIG. 40 to the invertor circuit section 1 to drive it.

By driving the invertor, the shaped alternating waveform is outputted to the high frequency transformer 3. Then, the output of the transformer 3 is rectified by the high frequency diodes 4A and 4B into a d-c waveform, which is supplied in the form of a pulse arc current waveform i in FIG. 40 to the weld zone or the arc load 5.

The arc load 5 is continuously supplied with the wire electrode 52 together with the pulse current waveform i by means of a motor (not shown). Thus, the pulse arc current waveform i produces the pulse arc discharge 53 across the wire electrode 52 and the base metal 54 to melt both the base metal and the tip of wire electrode. The melted portion of the wire electrode 52 successively drops onto the melted portion of the base metal to effect welding. As a result, the wire electrode 52 is continuously being consumed. To replenish the amount of electrode consumed, the wire electrode 52 is continuously supplied to the welding torch 51.

The pulse period $C_A$ within the pulse group duration X outputted from the pulse waveform shaper 81 is variably controlled by the pulse period $C_A$ setting device $86_5$ of the construction in FIG. 38 in accordance with the set time $T_C$ of the timer 86a. Then, in the phenomenon of the growth of molten droplets on the tip of wire electrode and the separation of the molten droplets from the electrode, the first pulse period $C_{A1}$ signal of a relatively short period is outputted in any pulse group period between the beginning of outputting pulses and the set time $T_C$ till the constriction of the molten droplet on the tip of the wire electrode is well promoted such that the molten droplet is ensured to separate from the electrode onto the base metal.

After the molten droplet has been separated at the time $T_C$, a new molten droplet grows on the tip of wire electrode while being lifted by the pulse group, and the lifted molten droplet on the tip of wire electrode will hang down during the subsequent base current duration to have shaped up before the beginning of the next pulse group, thus repeating the growth and separation of molten droplet in a regular manner. The molten droplet is grown and the lift phenomenon of a new molten droplet grown on the tip of wire is retarded by the pulse current which is outputted in accordance with a relatively long second pulse period $C_{A2}$ so as to prevent the variation of arc length l. This facilitates the molten droplet to separate during the subsequent pulse group, performing the transfer of molten droplet in a regular fashion. The arc length is ensured to be less than the allowable arc length lo where no undercut results.

The pulse current waveform is formed of a plurality of pulse currents which is repeated periodically to form a discharge current waveform. This means that one pulse is divided into a plurality of pulses. This division of pulse current causes the upward electromagnetic force due to the pulse arc discharge at the wire electrode to become intermittent, alleviating the force tending to lift the molten droplet produced on the wire tip. Therefore not only in the argon-dominated shielding gas but also in $CO_2$ gas, the molten droplet produced on the tip wire electrode can leave the wire electrode before it becomes large.

In the aforementioned embodiment, the set time $T_C$ at which the pulse period $C_A$ is switched from one value to another, may of course be selected to be the best in accordance with the welding conditions such as the diameters of electrodes and the shielding gases.

Although the aforementioned embodiment has been described with respect to a pulse arc welding apparatus, the embodied means of the present invention can be applied to a short-circuiting arc welding apparatus so as to provide regular short-circuiting/arc periods as well as to reduce the variations of the reinforcement of welding bead and weld penetration, thus allowing to perform short-circuiting arc welding with better quality.

Although the aforementioned embodiment has been described with respect to a welding apparatus in which the pulse interval is determined by setting an expected time length from beginning of pulse group to the separation of molten droplet as well as the pulse interval is switched from one value to another at the expected time. In other words, by using narrower pulse widths and longer pulse periods, the arc length is prevented from becoming longer because the residual molten droplet is lifted up after the previous molten droplet has separated, thus reducing the lifting force due to pulses to control the rate of growth of molten droplets.

Figure 41:
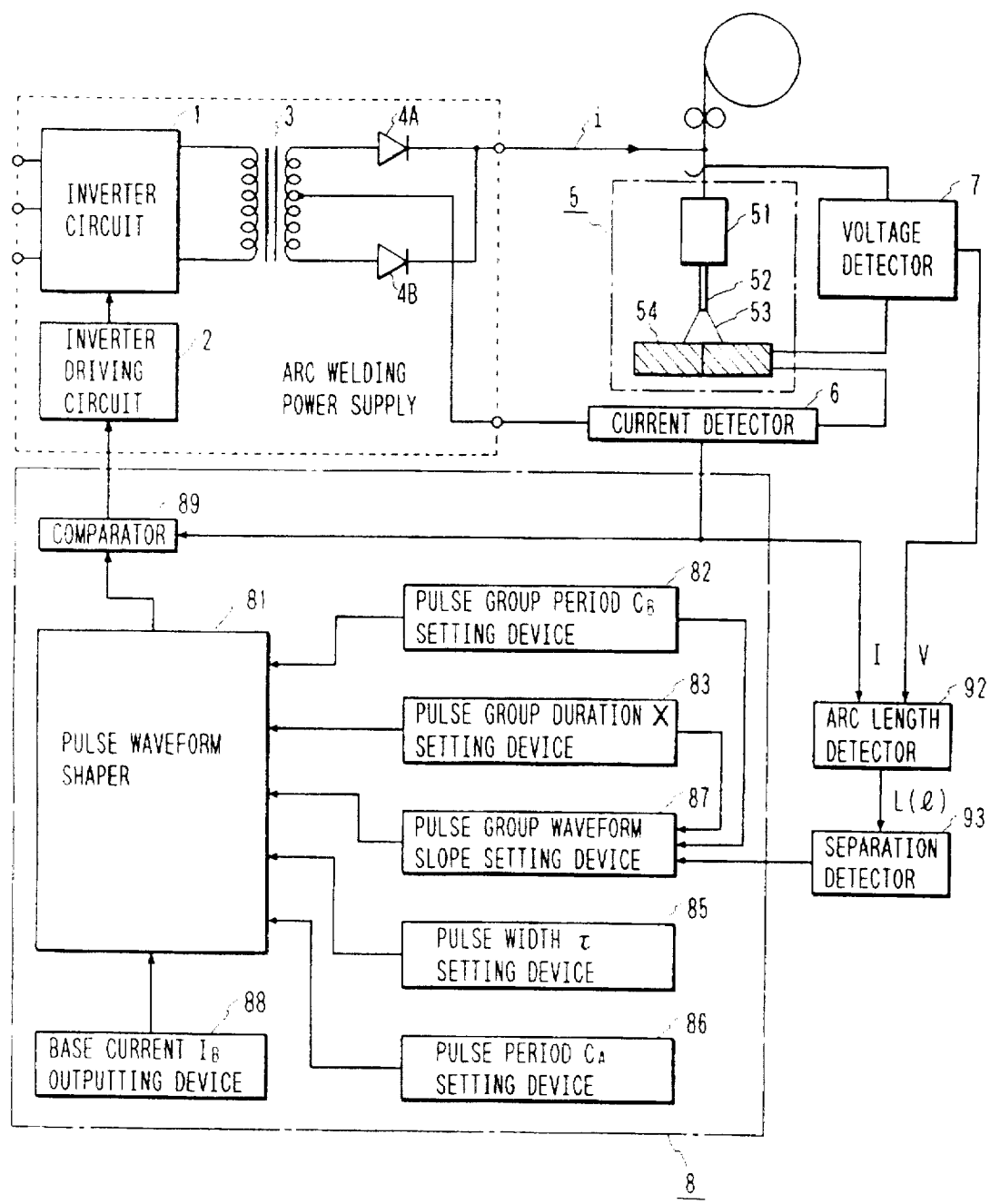
FIG. 41 is an overall block diagram of an embodiment of a twelfth invention.
Figure 42:
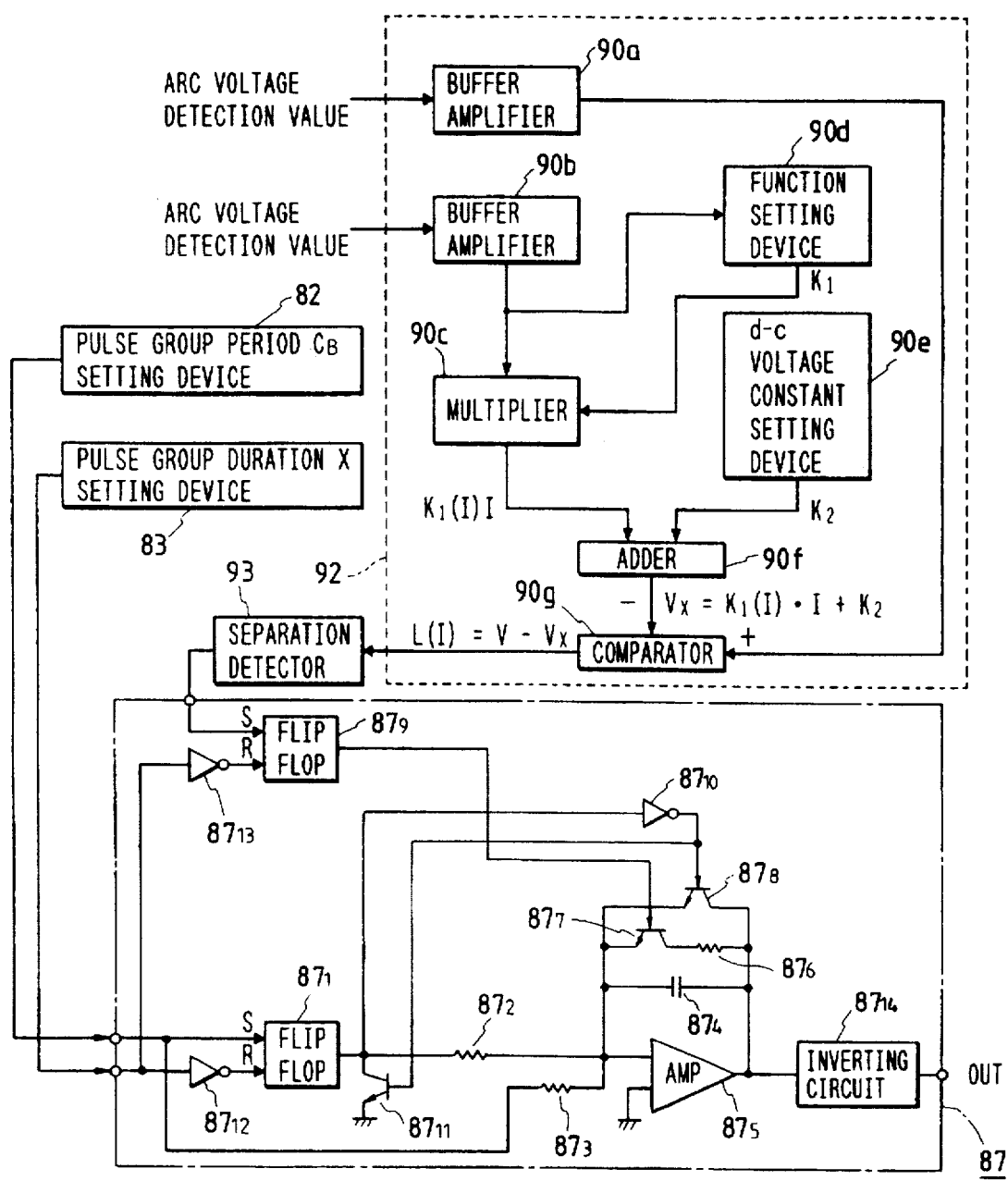
FIG. 42 is a block diagram of an internal detail of an arc length signal detector and a pulse group waveform slope setting device.
Figure 43:
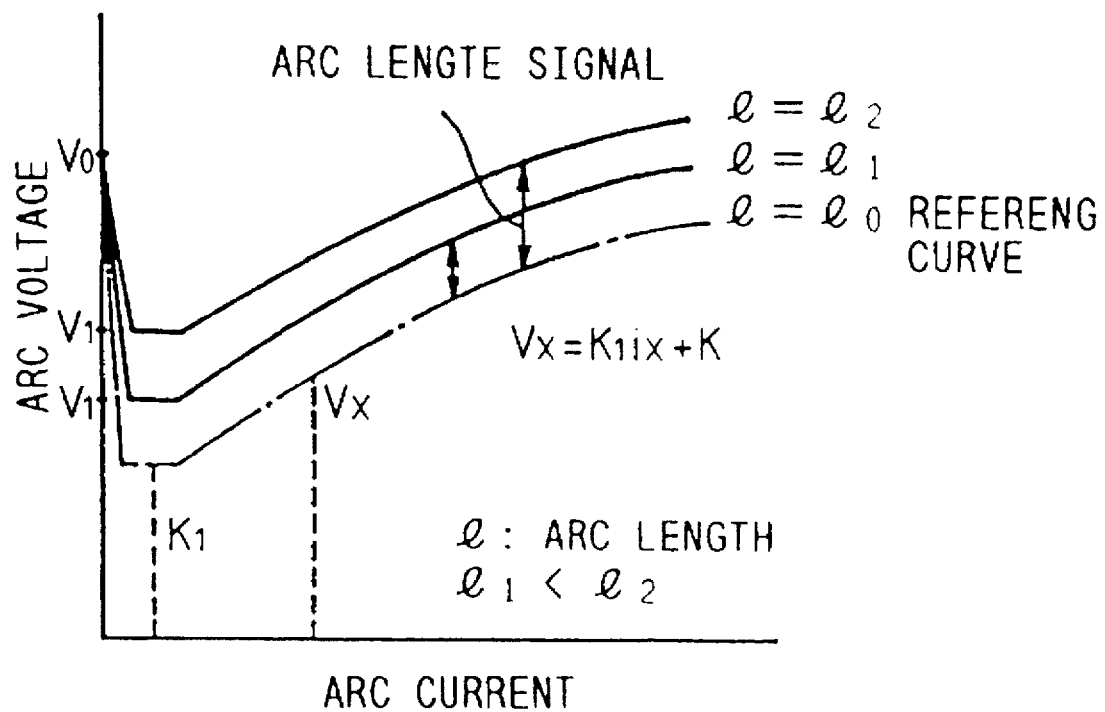
FIG. 43 is a diagram of an arc voltage vs arc current characteristics, showing the operation of arc length detecting operation.

FIG. 41 shows an embodiment of a pulse arc welding apparatus according to a twelfth invention. In the figure, elements similar to those in FIG. 32 have been given the same or similar reference numerals. In the figure, the reference numeral 92 denotes an arc detector which detects the variation of arc length on the basis of the arc detection voltage V and the arc detection current I to output a signal A(L(l)), and the detailed construction and operating characteristics thereof are shown in FIGS. 33 and 43, respectively. Reference numeral 93 denotes a separation detector which detects the separation of molten droplets on the basis of the arc length signal (L(l)). In the pulse current waveform control circuit 8, reference numeral 87 denotes a pulse group waveform slope setting device which varies the levels of the respective pulses forming the entire pulse current group so that the envelope of the peak levels of the pulses has a slope, thus providing the pulse group waveform. With construction (FIG. 42) of the pulse group waveform slope setting device 87, the reference numeral $87_1$ denotes a first flip flop (referred to as F/F1 hereinafter) which control the outputting the pulse group period signal $C_B$ and pulse group duration signal X, and the reference numerals $87_2$ and $87_3$ denote integrating circuit formed of resistors R1 and R2 (R2<R1), capacitor C $87_4$, and an OP amplifier $87_5$. Reference numeral $87_6$ signifies a resistor $R_3$ and numeral $87_7$ a transistor 1 (referred to as Tr1 hereinafter); these parts form a discharge circuit in which the charge stored across the capacitor C $87_4$ is discharged through the resistor $87_6$ when the Tr1 $87_7$ is turned on. Reference numeral $87_8$ denotes a transistor 2 (referred to as Tr2 hereinafter) which serves to short out the input and output terminals of the OP amplifier $87_5$. Reference numeral $87_9$ is a second flip flop (referred to as F/F2 hereinafter) which controls the Tr1 $87_7$ to turn on and $87_{10}$ denotes an invertor which controls the Tr2 $87_8$ to turn on. $87_{11}$ denotes a transistor 3 (referred to as Tr3 hereinafter) which pulls the output level of the F/F1 $87_1$ to the ground except when the pulse group duration signal X is inputted. The reference numerals $87_{12}$ and $87_{13}$ are buffers, respectively, through which reset signals are inputted to the F/F1 $87_1$ and F/F2 $87_9$. The reference numeral $87_{14}$ denotes an inverting circuit which inverts the output of the OP amplifier and outputs the inverted signal to the pulse waveform shaper 81.

Figure 44:
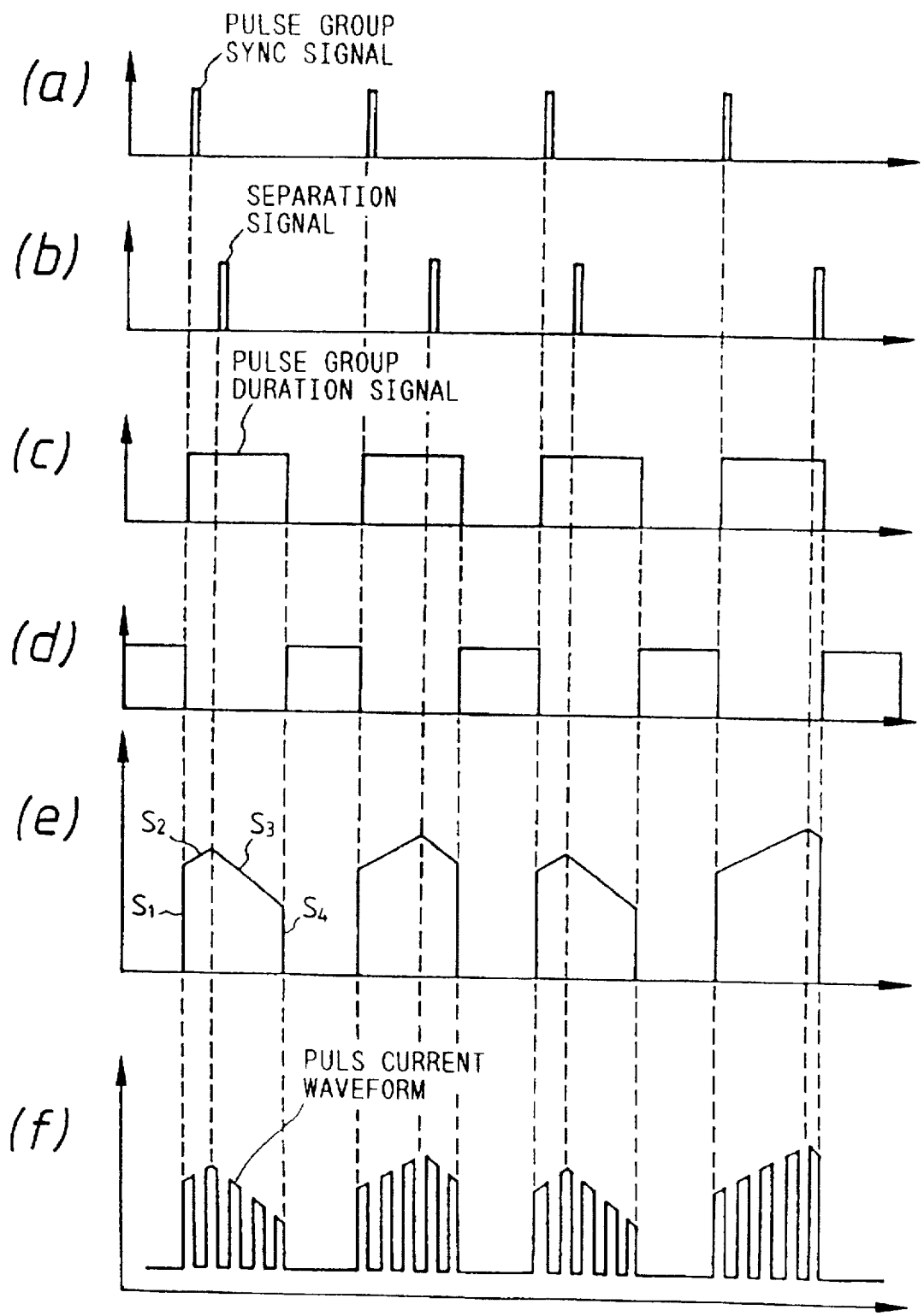
FIG. 44 is a signal waveform diagram illustrating the operation of the twelfth invention.

The operation of the pulse group waveform slope setting device 87 will now be described with reference to the signal waveforms in FIG. 44. When the pulse group period signal $C_B$ is inputted to the set terminal of the F/F1 $87_1$ from the pulse group period signal $C_B$ setting device 82 (FIG. 44(a)), the OP amplifier $87_5$ outputs a signal (S1 in FIG. 44(a)) to the invertor circuit $87_{14}$ in accordance with the charging characteristics having a time constant determined by the resistor R2 $87_3$ and the capacitor C $87_4$. The F/F1 $87_1$ outputs an H level to the resistor R1 $87_2$ before the output from the OP amplifier $87_5$ reaches the peak value. At this time, since the OP amplifier $87_5$ forms an integrating circuit having a charging time constant circuit of the resistor R1 $87_2$ and the capacitor $87_4$, the OP amplifier is charged by the H level with this time constant to provide an output (S2 in FIG. 44(e)). While the OP amplifier $87_5$ is outputting the charged voltage, the separation detection circuit 8 detects the separation of molten droplets by means of the signal A(L(l)) and outputs the separation signal (FIG. 44(b)) to the F/F2 $87_9$. the F/F2 $87_9$ outputs an H signal to the Tr1 $87_7$ which in turn causes the capacitor C $87_4$ to be shorted out through the resistor R3 $87_6$. As a result, the charge stored across the capacitor C $87_4$ is discharged through a discharge characteristics determined by a time constant of the resistor R3 $87_6$ and capacitor C $87_4$, thus the output of OP amplifier $87_5$ decreasing at a predetermined rate.

When the output decreases to a point, the pulse group duration signal X turns from the H level to the L level to cause the output of the OP amplifier to stop, then, the pulse group duration signal X which is turned to the H level is inputted via the invertor $87_{12}$ connected to the reset terminal of the F/F1 $87_1$. The output of the F/F1 $87_1$ is turned to the L level and is inputted to the invertor $87_{10}$ which outputs an inverted signal, causing Tr2 $87_8$ to turn on. The inverted pulse group duration signal X is inputted to its reset terminal of the F/F2 $87_9$ via the invertor $87_{13}$ and outputs an L level signal to Tr2 $87_7$ to turn Tr2 off. Thus, the voltage across the input and output terminals of the OP amplifier $87_5$ is short-circuited by Tr2 $87_8$ so that the output of the OP amplifier quickly drops to zero level (S4 in FIG. 44(e)). In order to prevent input signals from being inputted during the time period between the end of pulse group duration and the next pulse group duration, the inverted output of the invertor $87_{10}$ is inputted to Tr3 $87_{11}$ which pulls the output of the F/F1 $87_1$ to the ground potential, therefore holding the input level of the OP amplifier $87_5$ to the L level.

As described above, the controlled charge/discharge output of the OP amplifier $87_5$ are inverted by the invertor circuit $87_{14}$ which in turn outputs a hill-shaped envelope signal $E_S$ (FIG. 44(e)) to the pulse waveform shaper 81a. The pulse waveform shaper 81a superimposes the base current $I_B$ for every pulse group period $C_B$ to form an arc current which is outputted to the comparator 87.

As shown above, producing the pulse envelope signal $E_S$ by means of the pulse group waveform slope setting device 87 permits the pulse current level to gradually increase from the start of a group of pulse currents to thereby gradually increase the electromagnetic pinch force of the pulse discharge during pulse group period where the growth and separation of molten droplet occur on the tip of electrode. This promotes the molten droplets to be constricted at the boundary of the solid portion of electrode and the separation of molten droplet to be retarded, ensuring the molten droplet to be separated from the electrode onto the base metal.

Switching the slope of the pulse currents so that the pulse current level gradually decreases after the separation of molten droplet, serves to retard the lift of molten droplet due to pulse current when the molten droplet subsequently produced on the tip of wire electrode grows up, thus preventing the molten droplet from being delayed during the next pulse group.

Figure 45:
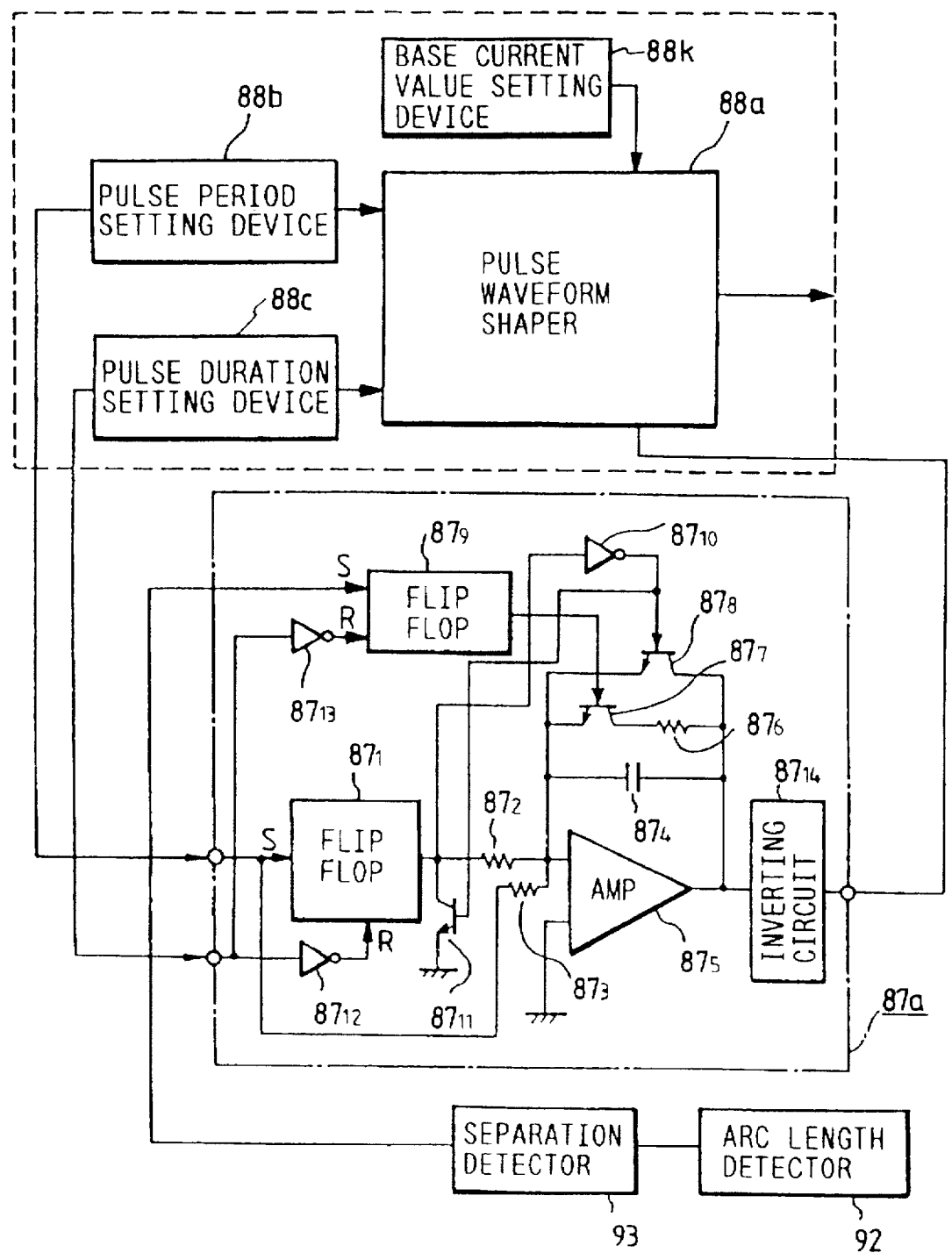
FIG. 45 is a block diagram of another embodiment of a pulse welding apparatus according to the twelfth invention.

Although the above-mentioned embodiment has been described with respect to the construction in which the pulse current group waveform is modulated by the hill-shaped envelope signal $E_S$, the same effect may be obtained by forming individually pulses having a predetermined pulse duration into hill-shaped pulses. FIG. 45 shows an example for such a circuit operation. The circuit includes a pulse period setting device 88b for setting the period of single pulses and a pulse duration setting device 88c for setting the pulse width or time during which that pulse is being outputted in place of the pulse group period $C_B$ setting device and the pulse group duration X setting device in FIG. 42. The operation thereof is similar to that of aforementioned embodiment.

The operation of the aforementioned arc length detector 92 will now be described with reference to FIG. 43.

The arc length detector 92 outputs the arc current detection value I into the multiplier 92c where the value I is multiplied by a function k1, inputted from a function setting device 92d, into a function K1(I), which in turn is inputted into the adder 92f. Since the adder 92f is supplied a d-c voltage constant K2 for setting the base current from the d-c voltage setting device 92c, the adder 92e outputs a reference arc voltage $V_X$ to the comparator 92g shown in FIG. 43. In this manner, the comparator 92g compares the reference arc voltage with the arc voltage detection value $V_1$ that is determined by the instantaneous arc length outputted from the buffer amplifier 92a to thereby output a differential signal, thus providing a signal A(L(l)) corresponding to the true arc length at each moment.

Figure 46:
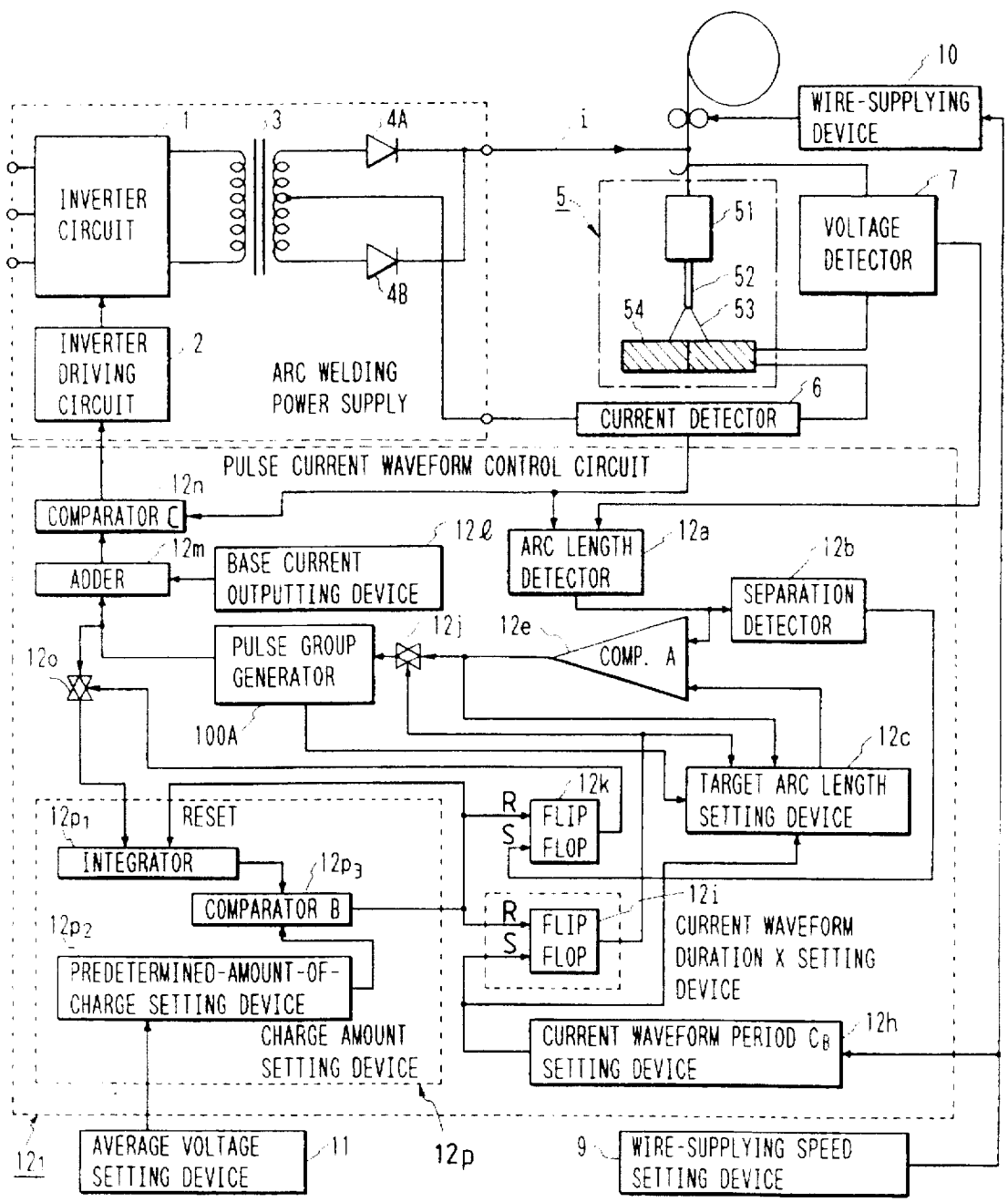
FIG. 46 is an overall block diagram of an embodiment of a pulse welding apparatus according to a thirteenth invention.

FIG. 46 is a block diagram showing an embodiment of a thirteenth aspect of the invention, in which the pulse current is run for a predetermined length of time every time the molten droplet separates from the electrode, the amount of charge of the pulse current is fixed, and the melting capacity is maintained constant at all times. In the figure, the reference numeral 12 denotes a pulse current waveform control circuit which controls the waveform of the pulse current forming the arc current together with the base current. The reference numeral 12a is an arc length detector which detects the instantaneous arc length to output an arc length signal, 12b is a separation detector which detects the separation of molten droplet on the basis of the arc length signal, 12c is a target arc length setting device for setting the instantaneous target arc length, 12e is a comparator which compares the instantaneous arc length signal with the target arc length to output the difference signal, 100A is a pulse group current generator for setting the reference pulse current waveform, 12h is a current waveform period setting device for setting the pulse current group output period $C_B$ in accordance with the wire-supplying speed, 12i is a current waveform duration X setting device which is set at each period $C_B$ and outputs an ON signal to an analog switch 9j, 12k is a flip flop F/F which is set by the separation detection signal to output an ON signal to an analog switch 12o, 12l is a base current outputting device, 12m is an adder for superimposing the base current to the produced pulse current group, 12n is a comparator A which compares the arc current detection value with pulse current outputted from the adder 12m and controls the invertor drive circuit 2 to turn on and off in accordance with the comparison result, and 12p is a charge amount setting device for setting the amount of charge of pulse current. The charge amount setting device includes an integrator $12_{p1}$ for integrating the pulse current group after the detection of separation, a predetermined-amount-of-charge setting device $12_{p2}$ for setting the amount of charge of the pulse current group that is run after the separation of molten droplet is detected, a comparator 12p3 B which outputs a reset signal to the current waveform duration X setting device 12i when the amount of charge of pulse current group is reached, and an average voltage setting device 11 for setting a predetermined amount of charge.

Figures 47A, 47B, 47C:
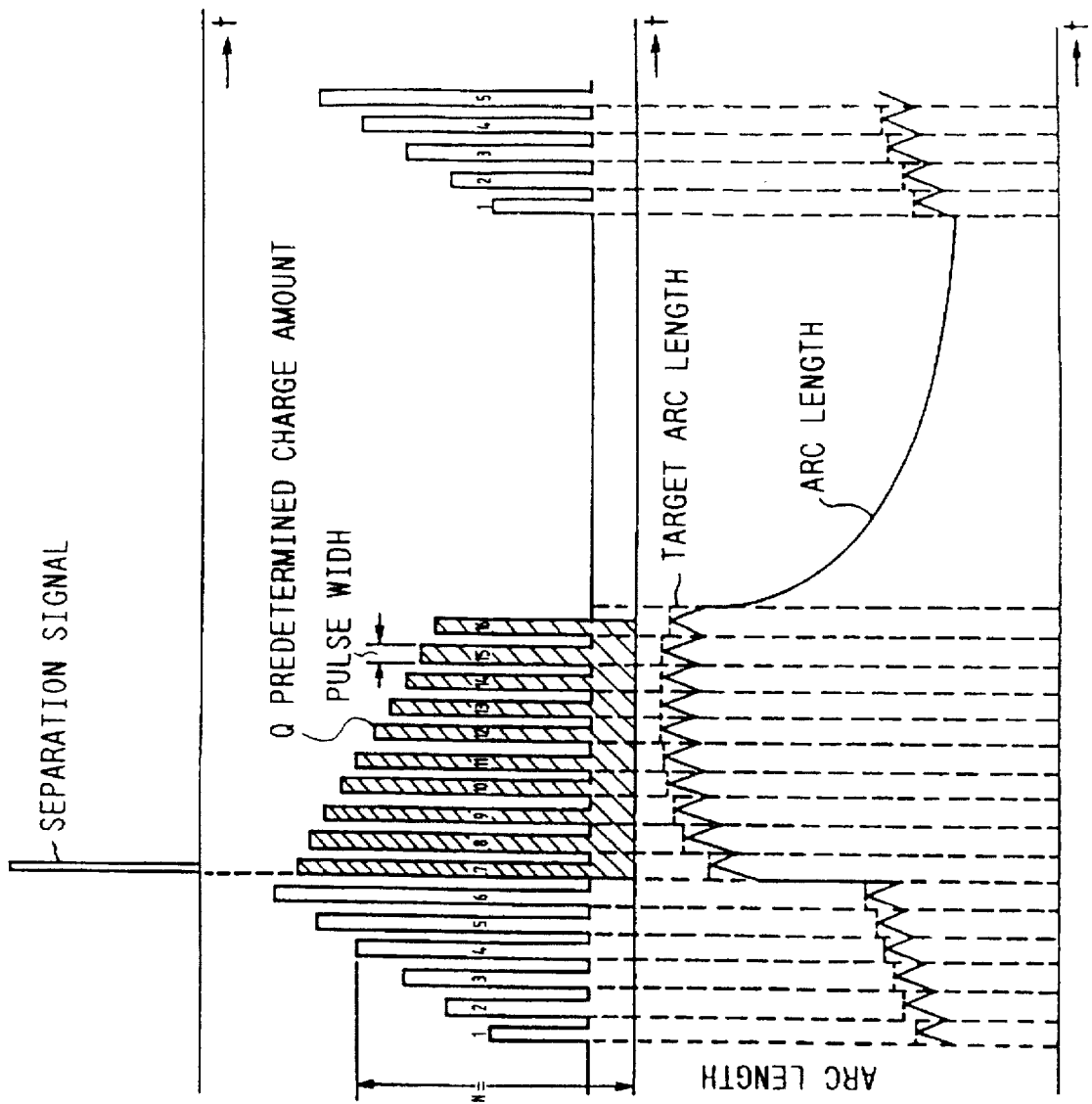
FIGS. 47a–47c show pulse waveforms illustrating the operation of another embodiment shown in FIG. 46.

The operation of the embodiment of the above-described construction will now be described with reference to the waveforms (a)–(c) in FIG. 47.

When the period signal is inputted from the current waveform period $C_B$ setting device 12h to the SET terminal of the current waveform duration X setting device 12i, the output of F/F 12i causes the analog switch 12j to become ON and direct the output of the comparator A 12e to the pulse group generator 100A. Then, the comparator A 12e receives the arc length detected by the arc length detector 12a and the target arc length set by the target arc length setting device 12c and compares the arc lengths ((c) in FIG. 47). The comparison result is either + or − difference signal and is inputted into the pulse group generator 100A to be added to or subtracted from the predetermined pulse current value to correct the pulse current waveform so that the target arc length is achieved. The base current outputted from the base current outputting device 12l is superposed to the pulse current waveform which will then become an arc current reference value and is directed to the comparator C 12n. The comparator C 12n compares the arc current detection value detected by the current detector with the arc current reference value and outputs the ON signal if arc current detection value<arc current reference value, so that the pulse arc current outputted from the arc welding power source is fed between the wire electrode 52 and the base metal 54. For a period during which the arc current detection value>arc current reference value, the comparator C 12n outputs the OFF signal to the invertor driving circuit. Then, when the separation signal is outputted from the separation detector, F/F 12k is set by the separation signal. This causes the analog switch 12o to become ON, directing the pulse current waveform to the charge amount setting device 12b. The respective incoming pulse current waveforms (N=7 to 16, (b) in FIG. 47) are integrated by the integrator 12p1 to subsequently be inputted as an amount of charge of pulse current to the comparator B 12p3. The comparator B 12p3 has been set, after the molten droplet has separated, the charge amount of a pulse current for obtaining a predetermined melting capacity as a comparison object. When the amount of charge inputted to the comparator B 12p3 is equal to the predetermined amount of charge, the comparator B 12p3 recognizes that the pulse current required for obtaining a predetermined melting capacity and outputs a reset signal to the integrator 12p1 as well as to the F/F 12i which is then reset to shut off the output from the comparator A 12e.

Carrying out the above-described operation for each separation detection at the current waveform period $C_B$, causes a predetermined amount of melted molten droplet to be produced on the tip of wire electrode after separation detection, thus providing uniform welding bead.

Figure 48A:
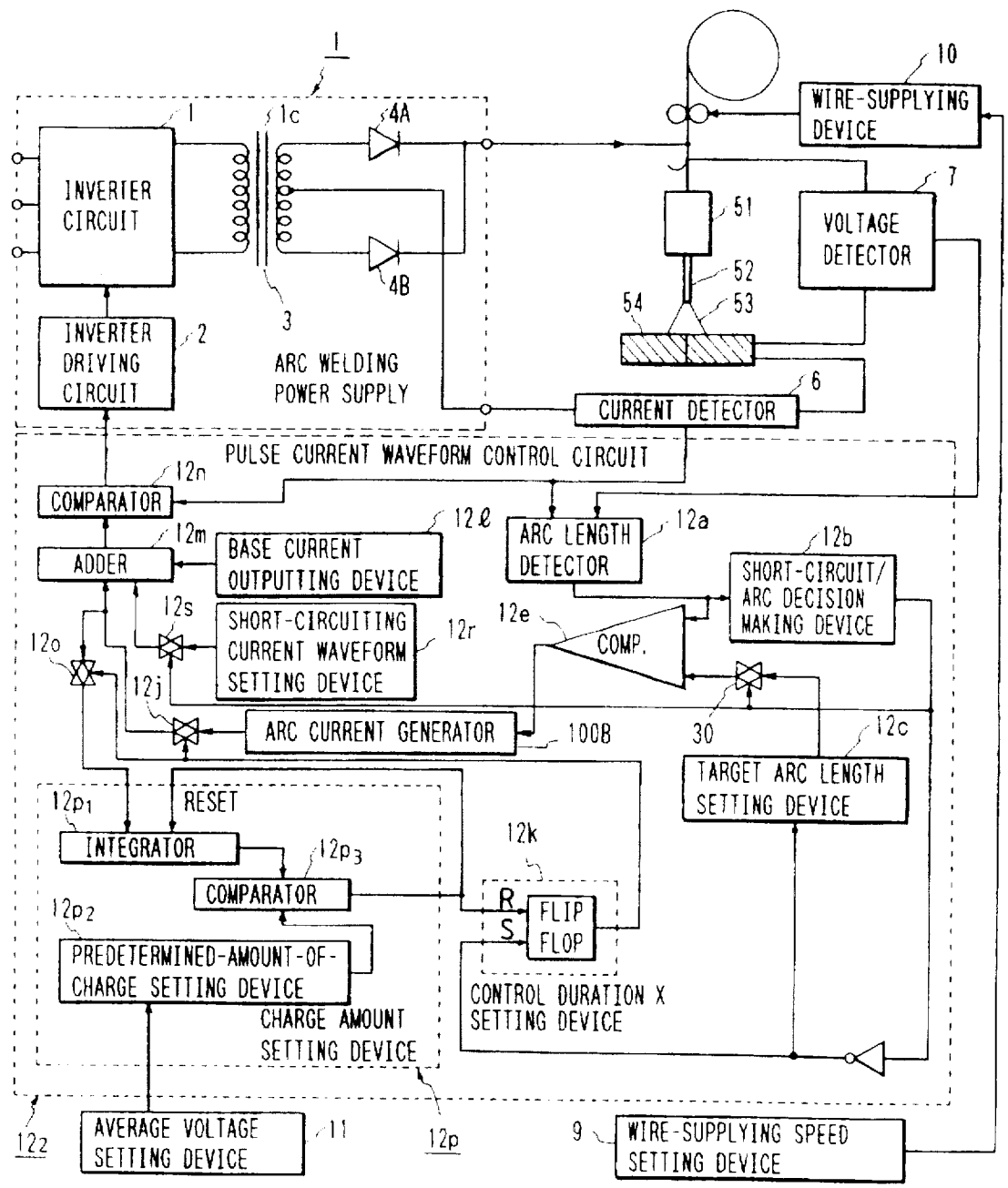
FIG. 48A is an overall block diagram of an embodiment of a short-circuiting arc welding apparatus according to a fourteenth invention.

An embodiment of a pulse welding apparatus according to a fourteenth aspect of the invention in which short-circuiting transfer arc welding is carried out will be described with reference to FIG. 48A. In the figure, the same reference numerals as in FIG. 46 represent the same or corresponding parts. The reference numeral 12q denotes a short-arc detector which makes a decision whether the molten droplet is in the short-circuited or in arc period to output an ON signal to the analog switch 12s, and reference numeral 12r denotes a short-circuit current waveform setting device for setting the short-circuiting current waveform to burn off the short-circuited molten droplet. The reference numeral 100B denotes an arc current generator for generating a current during arc period.

Figure 49A:
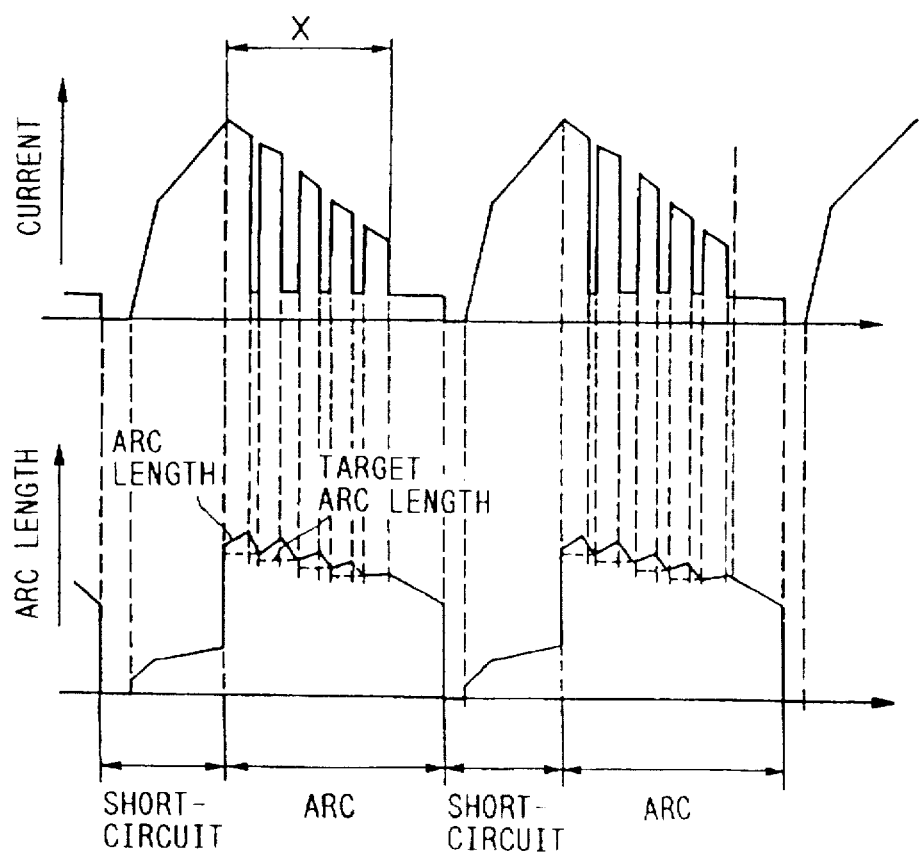
FIGS. 49A–49B are arc current waveform diagrams illustrating the operation of the embodiment of the short-circuiting arc welding apparatus in FIG. 48.

The operation of the embodiment of the aforementioned construction will be described with reference to FIGS. 49A–49B.

Figure 49B:
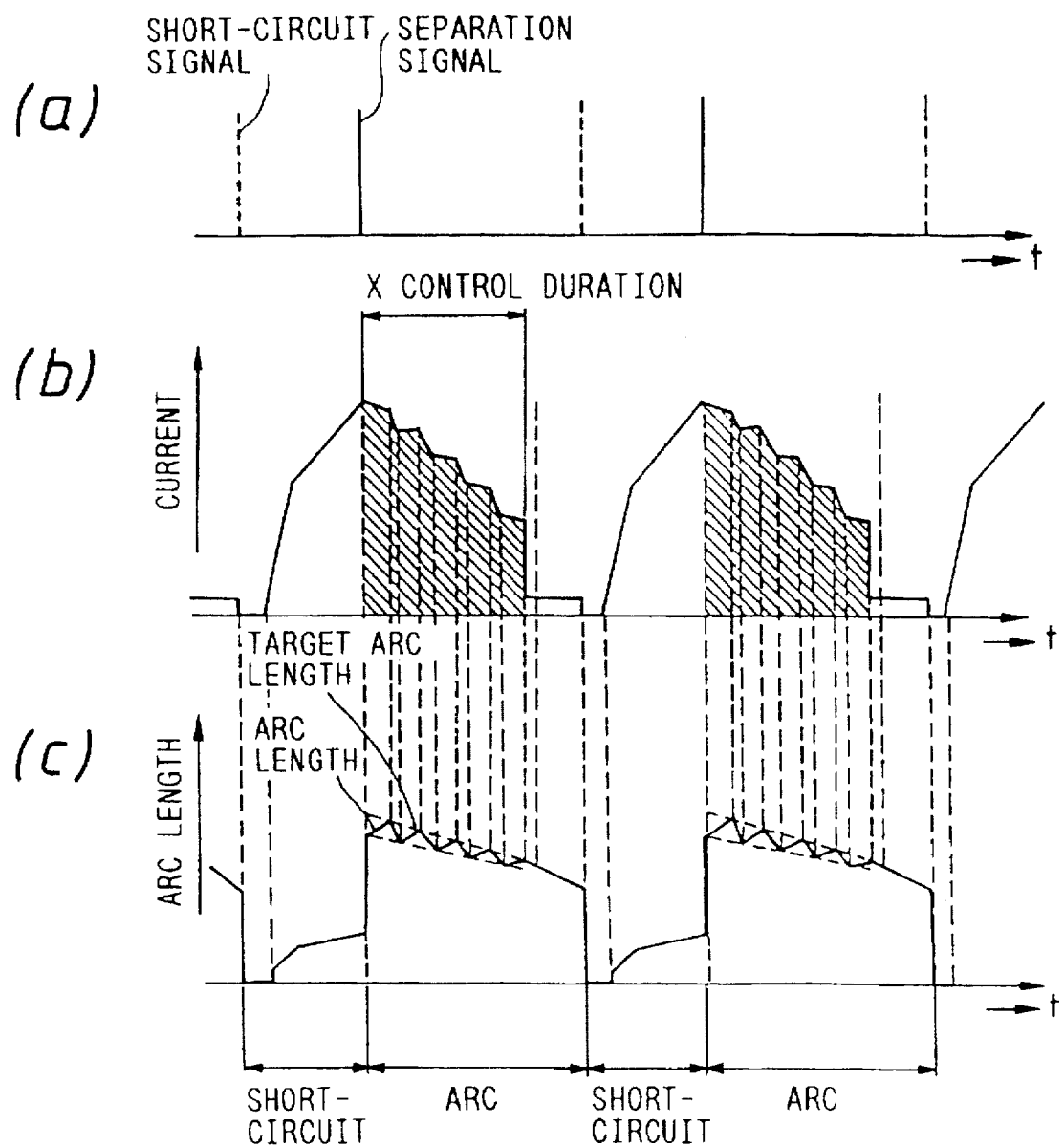

Short-circuiting the molten droplet to the base metal 54 causes the arc length to quickly decrease as shown in FIGS. 49B–49C which in turn causes the arc length signal into the short-circuit arc detector 12q to decrease quickly, thus detecting the short-circuiting. As a result, the analog switch 12s becomes ON, directing the short-circuiting current ((b) in FIG. 49), which serves to burn off the short-circuited molten droplet, from the short-circuiting current waveform setting device 12r to the adder 12m. The adder 12m superimposes the base current from the base current outputting device 12l to the short-circuiting current waveform to produce an arc current reference value for burning off the molten droplet, and output it to the comparator 12n. Thus, the molten droplet escapes from the short-circuited condition causing the arc to become longer. The arc detector 12q detects the escape on the basis of the arc length signal outputted from the arc length detector 12a to thereby output the SET signal to the control period X setting device 12k formed of F/F which in turn outputs ON signals to the analog switches 12j and 12o.

After the separation of molten droplet, the comparator 12e compares the arc length signal outputted at each moment from the arc length detector 12a with the target arc length outputted from the arc length detector 12c and outputs a difference signal of the respective arc lengths to the arc current generator 100B. The difference signal is added to or subtracted from the current value, which is set by the short-circuiting current waveform setting device 9r, by the arc current generator 100B so as to be corrected such that the target arc length is obtained. The corrected difference signal is supplied through the analog switch 12j to the adder 12m as well through the analog switch 12o to the charge amount setting device 12p. The difference signal is now an arc current for arc duration ((b) and (c) in FIG. 49B), instead of a short-circuit current, which is produced by superposing the base current. This is then supplied to the comparator 12n.

The corrected current waveform, which is inputted to the charge amount setting device 12p, is converted into the amount of change of the waveform of integrator 12p2 and is then supplied to the comparator 12p3 which compares it with the predetermined amount of charge of arc current set by the predetermined-amount-of-charge setting device 12p2 to reset the integrator 12p1 when the amount of charge of the waveform is equal to the predetermined amount of charge as well as to reset the F/F 12k which in turn causes the analog switch 12j and 12o to turn off. As a result, after the detection of separation signal, an arc current having a predetermined amount of charge is run through the wire electrode 52 so as to grow a required amount of molten droplet so that the molten droplet is short-circuited. When the short-circuited condition is detected by the short-circuited arc detector 12q, the previously described short-circuit current waveform for burning off the short-circuited molten droplet is outputted through the adder 12m from the short-circuit current waveform setting device 12r. Thus, each time the separation signal is outputted ((a) in FIG. 49), an arc current of a predetermined amount of charge, thus allowing the molten droplet of a predetermined melting capacity is short-circuited in a regular manner to produce good welding beads.

Figure 50A:
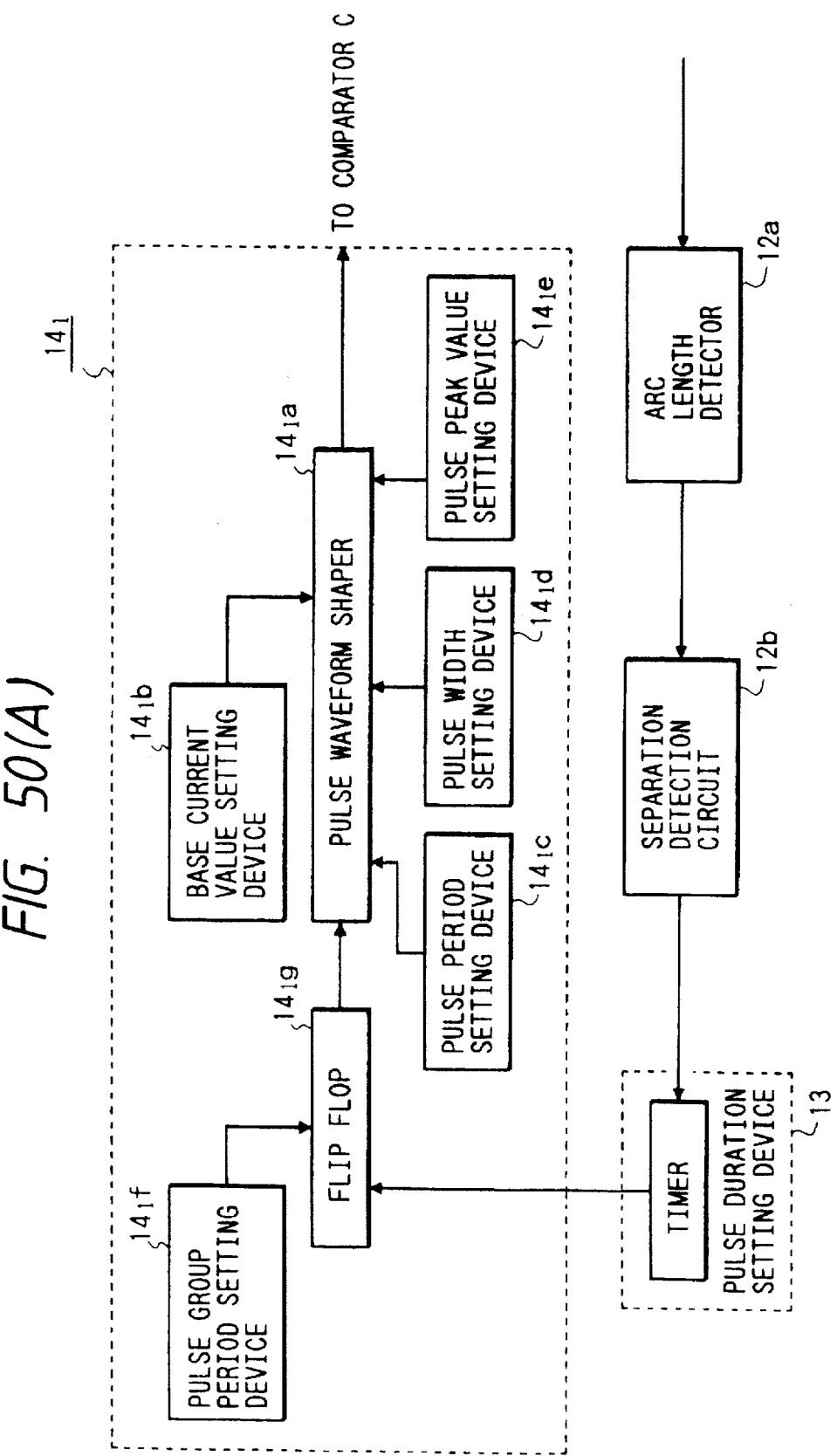
FIGS. 50A and 50B are block diagrams showing these other embodiments, respectively.

In the above-described invention, in order to control the output of the arc current of a predetermined charge-amount, the arc current is shut off when the amount of charge determined by integrating the arc current waveform outputted at each moment is equal to the predetermined level. However, it is also possible that after the detection of separation as shown in FIG. 50A, the timer is operated for a predetermined length of time during which the pulse current group is outputted to thereby output an arc current having a certain amount of charge. In FIG. 50A, reference numeral 12a denotes an arc length detector similar to the aforementioned embodiment, reference numeral 12b denotes a separation detecting circuit, reference numeral 13 denotes a pulse duration setting device for setting the pulse current output period, and reference numeral 141 is a current waveform setting circuit of the embodiment. The reference numeral $14_{1a}$ is a pulse waveform shaper which shapes the pulse current group waveform as depicted by (e) in FIG. 51A. $14_{1b}$ is a base current value setting device which sets the base current of the pulse current group, $14_{1c}$ is a pulse period setting device for setting the pulse period of the pulse group, $14_{1d}$ is a pulse width setting device for determining the pulse width, $14_{1e}$ is a pulse peak value setting device for setting the pulse peak value, $14_{1f}$ is a pulse group period setting device for setting the period at which the respective pulse group occurs, and $14_{1g}$ is a flip flop which causes the pulse waveform shaper to turn ON to output the pulse current group when the pulse group period signal is inputted thereto and which causes the pulse current group to be shut off when the timer-output set by the pulse duration setting device 13 is turned OFF.

The operation of the circuit of the aforementioned construction will now be described with reference to the waveforms (a)–(b) in FIG. 51A.

Figure 51B:
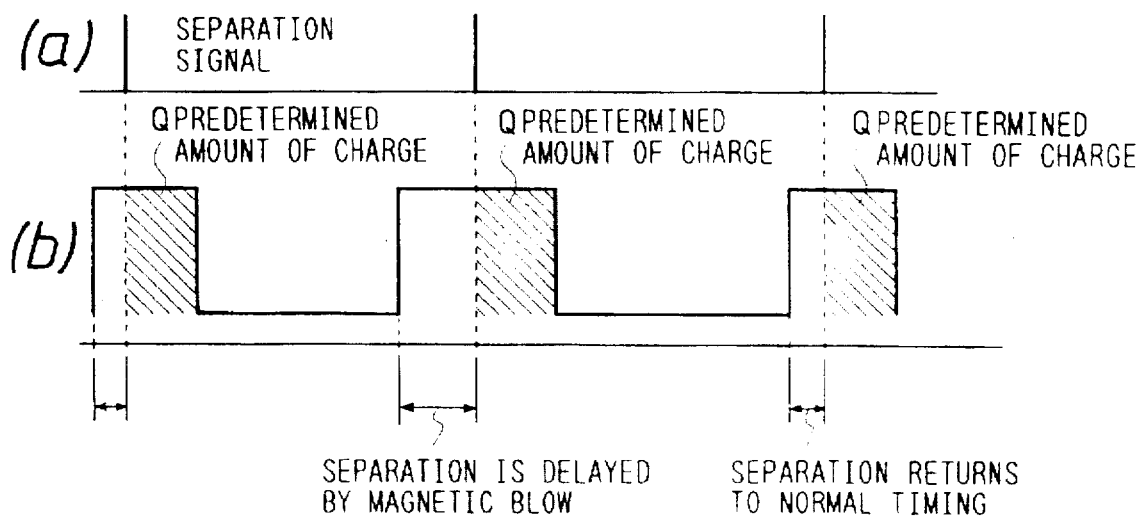
FIGS. 51A and 51B are pulse waveforms illustrating these other embodiments.
Figure 51A:
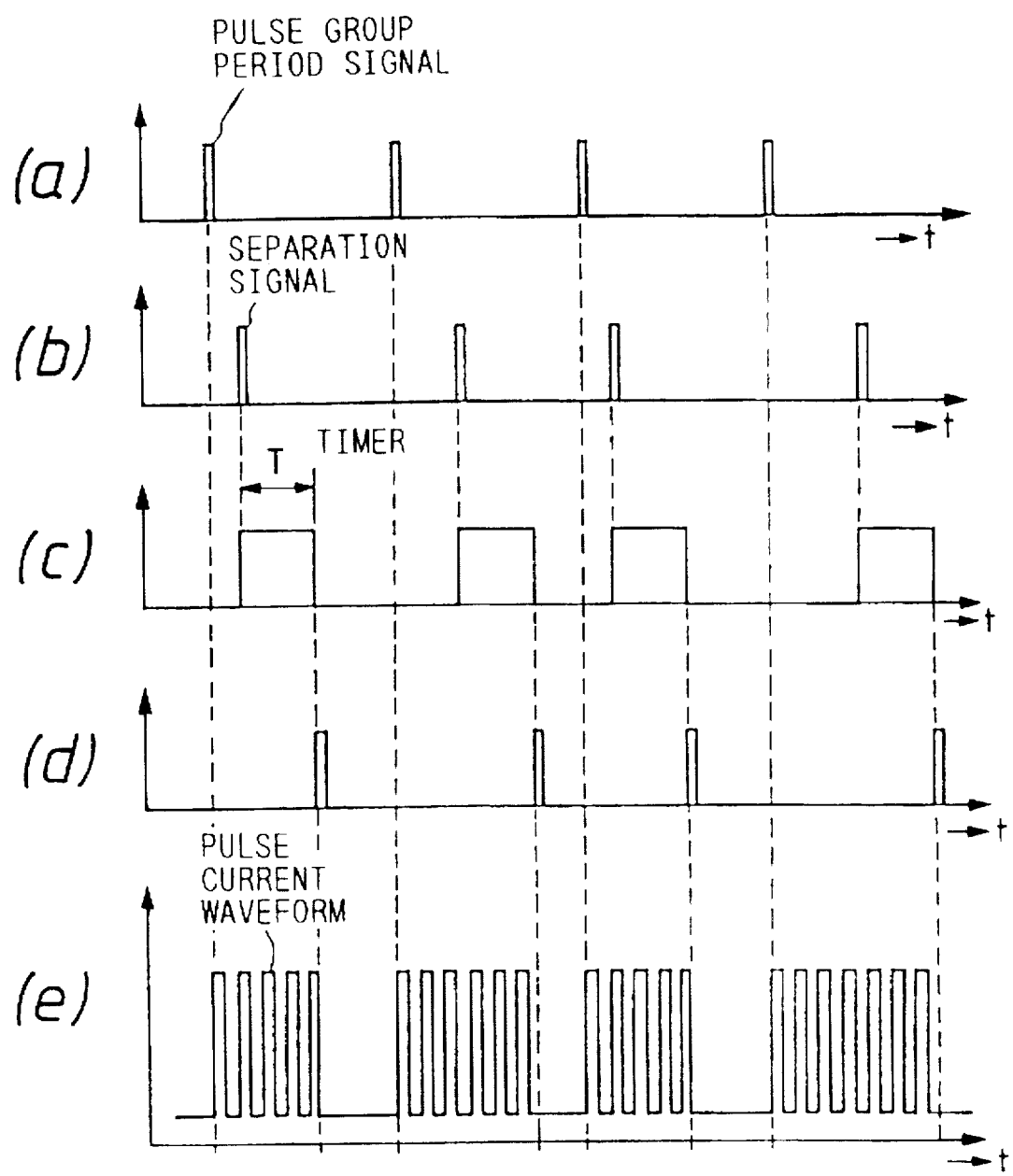

When the period signal ((a) in FIG. 51A) is outputted to the flip flop $14_{1g}$, the pulse group period setting device $14_{1f}$ outputs the pulse current group of a predetermined frequency superposed the base current thereto and having a predetermined pulse width and a pulse peak as shown by (e) in the figure on the basis of the respective set values of the base current setting device $14_{1b}$, pulse period setting device $14_{1c}$, the pulse width setting $14_{1d}$, and the pulse peak value setting device $14_{1e}$. Then, when the separation detecting circuit $14_{1b}$ detects the separation of molten droplet on the basis of the arc length signal outputted by the arc length detector $14_{1a}$, the separation detecting circuit $14_{1b}$ outputs the separation signal ((b) in FIG. 51A) to the pulse duration setting device 13 in the form of a timer, and the timer output which is ON for a predetermined length of time is supplied to the minus reset terminal (−) of the flip flop $14_{1g}$. Thereafter, the pulse current group is outputted from the pulse waveform shaper 14a for a time length from the inputting of the pulse group period signal till the timer output OFF signal ((d) in FIG. 51A) is outputted. Thus, the pulse waveform shaper $14_{1a}$ outputs the pulse current as an arc current, which has a predetermined amount of charge determined by the time duration of timer-output after separation detection. Thus, the amount of melted molten droplet is maintained constant after separation detection, resulting in the same effects as in the previously mentioned embodiment.

Figure 50B:
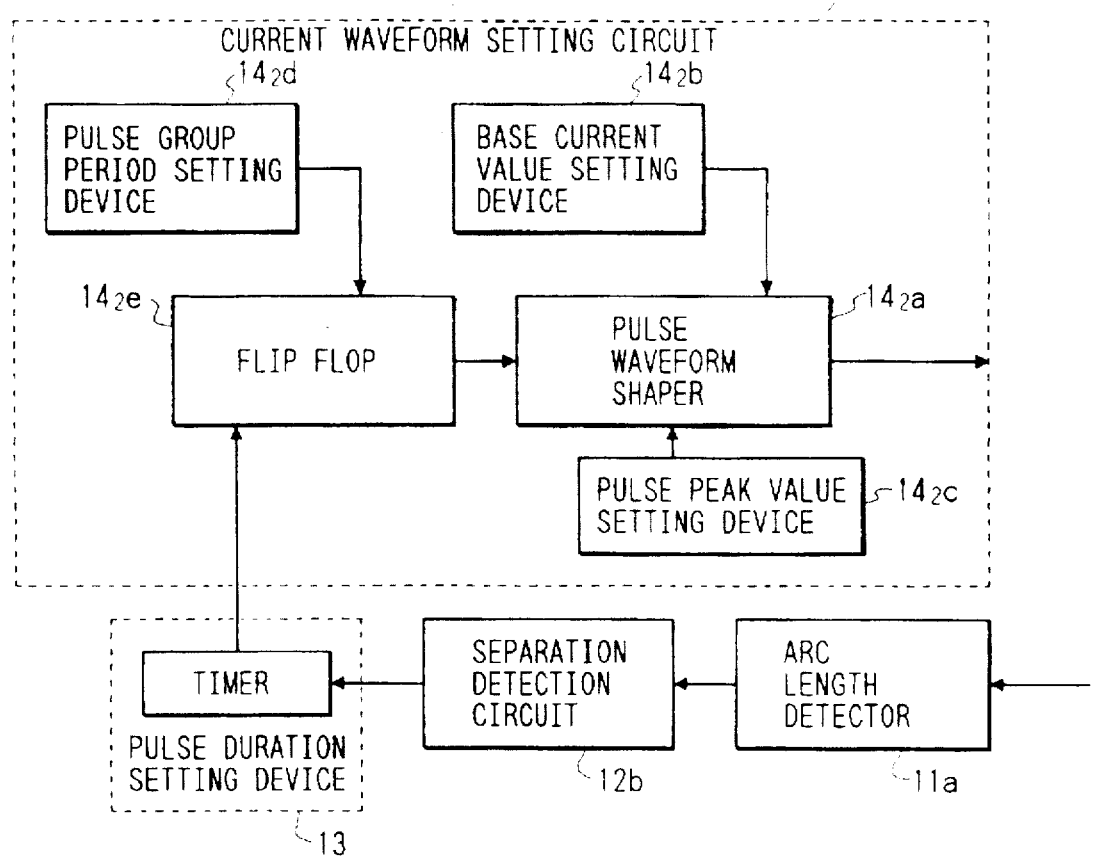

While the above-described another embodiment has been described with respect to the pulse current waveform consisting of a plurality of pulse currents, the single pulse current is also controlled the amount of charge of the pulse current. FIG. 50B is a current waveform setting circuit $14_2$ of a single pulse current. In the circuit $14_2$, the reference numeral $14_{2a}$ in which the pulse currents having peak values set by the pulse peak current setting device $14_{2c}$ is superposed to the base current set by the base current value setting device $14_{2b}$, to produce and output the pulse current depicted by (b) in FIG. 51B, and the reference numeral $14_{2a}$ is a pulse period setting device which determines the rising period of the respective pulse currents and outputs a set signal to the flip flop $14_{2e}$. The same reference numerals as in FIG. 50A are the same or corresponding parts.

The operation of the embodiment will now be described with reference to the signal waveforms (a) and (b) in FIG. 51A. Each time the pulse period signal (a) in FIG. 51A is supplied to the flip flop $14_{2e}$ from the pulse period setting device $14_{2d}$, the flip flop $14_{2e}$ supplies the pulse waveform shaper $14_{2a}$ with an operating signal which is then superposed the base current to become pulse currents having a predetermined pulse peak value to be outputted. When this pulse current is outputted, if the separation detecting circuit 12b detects the separation of the molten droplet on the basis of the arc length signal inputted from the arc length detector 11a, the separation detecting circuit outputs the separation signal ((b) in FIG. 51b) to the timer which forms the pulse duration setting device 13. The timer, after separation signal is inputted, supplies the timer output to the flip flop so as to turn off the output of the flip flop $14_{2e}$ which is directed as the operating signal to the pulse waveform shaper $14_{2a}$. As a result, after separation detection, the pulse waveform shaper $14_{2a}$ outputs the pulse current having a predetermined amount of charge Q ((b) in FIG. 51A) determined by the pulse duration that serves as an arc current. Since the pulse current having a predetermined amount of charge Q is run, even if the separation timing is delayed due to magnetic blow, the melting capacity of molten droplet becomes as much as previous separation before the molten droplet separates from the electrode. Thus, the molten droplet separates from the electrode at the right separation time with a predetermined volume.

The operations of the arc length detector 11a, separation detector 12b, and short circuit arc decision circuit 9a will be described with reference to (a) and (b) in FIG. 52 and FIG. 48B.

In the arc length detector 12a, the arc current detection value I inputted through the buffer amplifier $12_{a2}$ is inputted to the multiplier $12_{a3}$ which produces the product K1(I) of K1 and the arc current detection value I and feeds it to the adder $12_{a6}$. Since the d-c voltage constant K2 used for setting the base voltage is supplied to the adder $12_{a6}$ from the d-c constant setting device $12_{a5}$, the adder outputs the reference arc voltage $V_X$ as shown in FIG. 43 to the comparator $12_{a7}$. With the reference arc voltage $V_X$ inputted into the arc length detector 12a, when the detected arc voltage $V_1$ corresponding to the arc lengths at each moment from the buffer amplifier $12_{a1}$, the comparator $12_{a7}$ outputs on the basis of the difference between the arc voltages $V_X$ and $V_1$ the arc length signal L(l) corresponding to the true arc lengths varying at each moment.

The arc length signal, as depicted by (a) in FIG. 52b, increases abruptly in the positive direction since the arc length becomes longer when molten droplet separates from the electrode, and decreases abruptly in the negative direction because the arc length becomes shorter when the molten droplet is short-circuited. Thus, when the arc length signal is inputted into the differentiating circuit 12b1 in the separation detector 12b, the differentiating circuit 12b1 outputs a differentiated signal as depicted by (b) in FIG. 52b and a signal as depicted by (b) when molten droplet is short-circuited. The short-circuit separation decision circuit 12b3 makes a decision based on whether the differentiated signal is positive or negative so as to determine whether the molten droplet is separated or short-circuited to output the separation signal or short-circuit signal ((c) and (d) in FIG. 52b).

Figure 48B:
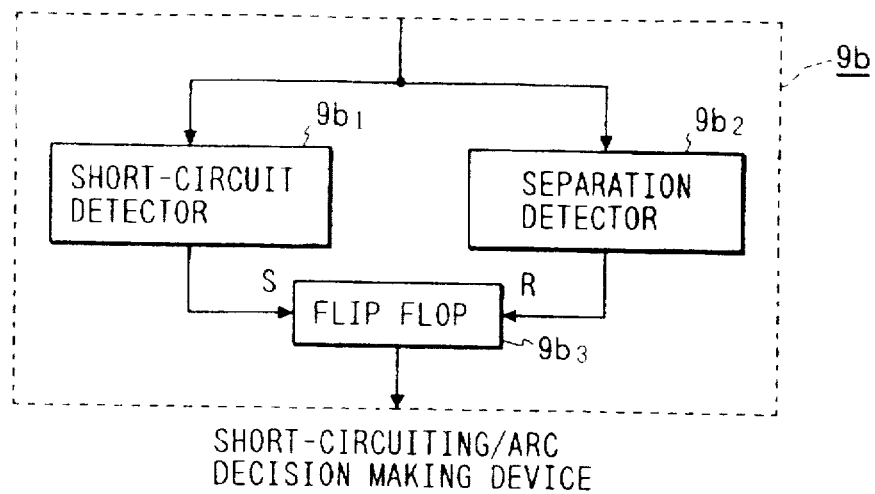
FIG. 48B is a diagram showing the construction of a short-circuiting/arc deciding device.
Figure 52:
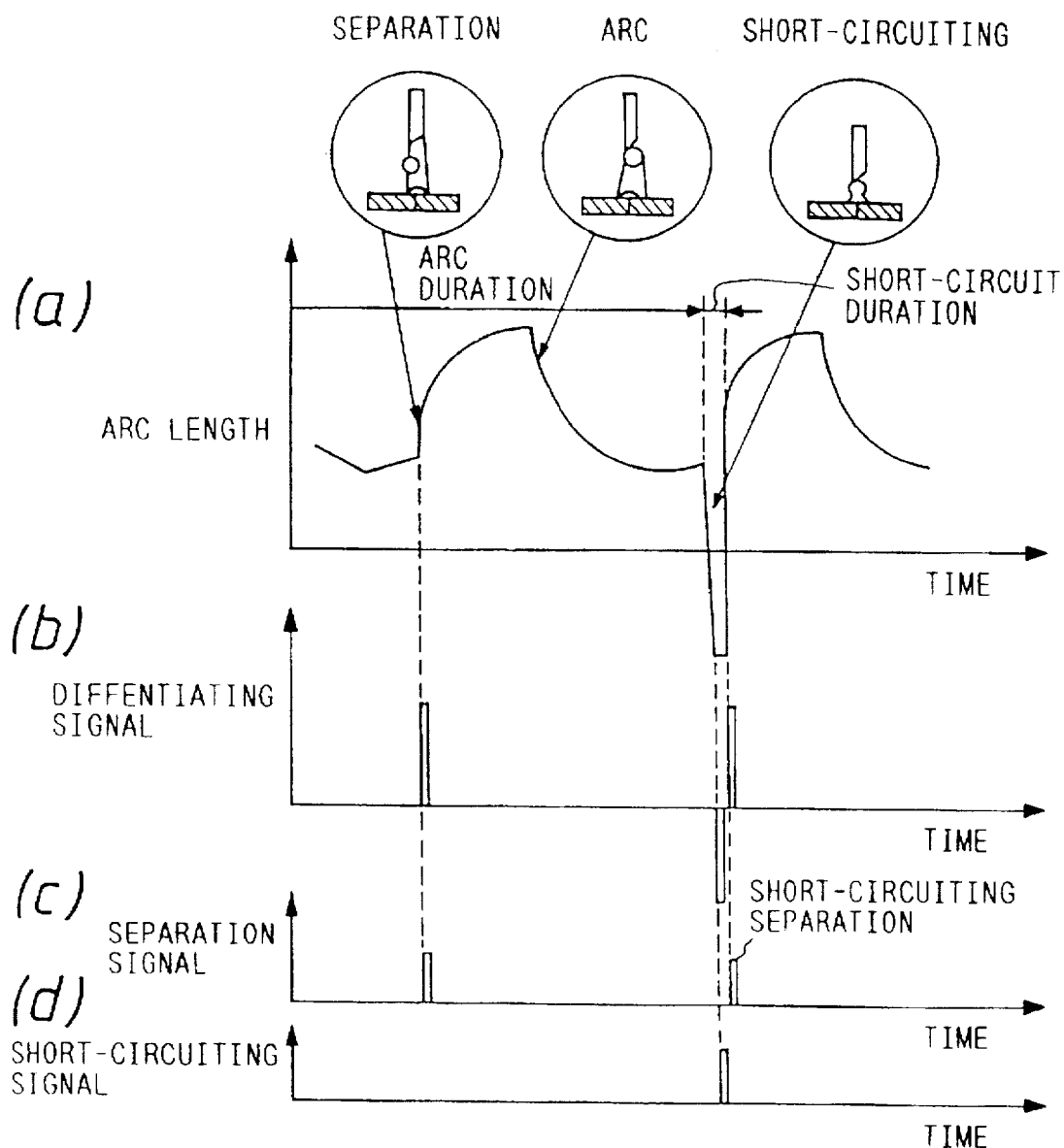
FIG. 52a is a diagram showing the constructions of the arc length detecting circuit and a separation/short-circuiting detector.
FIG. 52b is a waveform diagram illustrating the operation of the separation/short-circuiting detector.
Figure 53A:
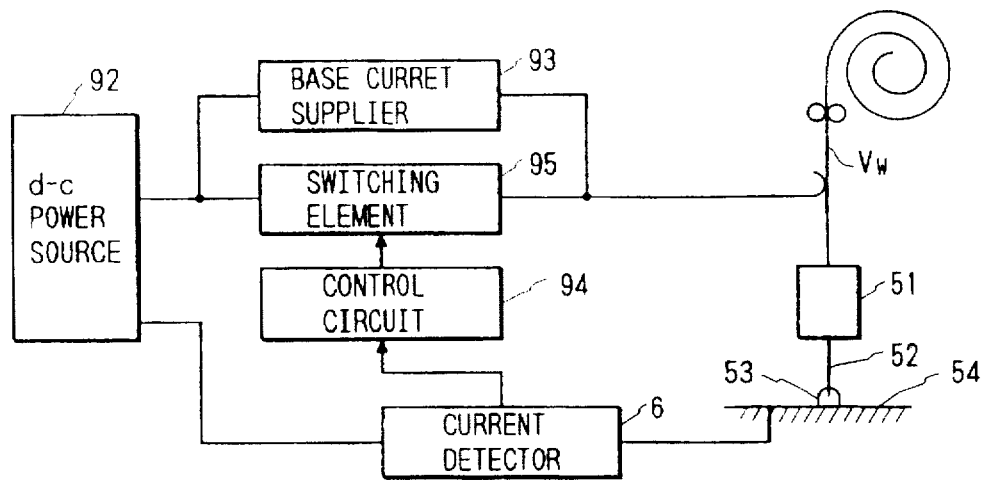
FIG. 53a shows an arc current waveform when a conventional short-circuiting welding is being performed.
Figure 53B:
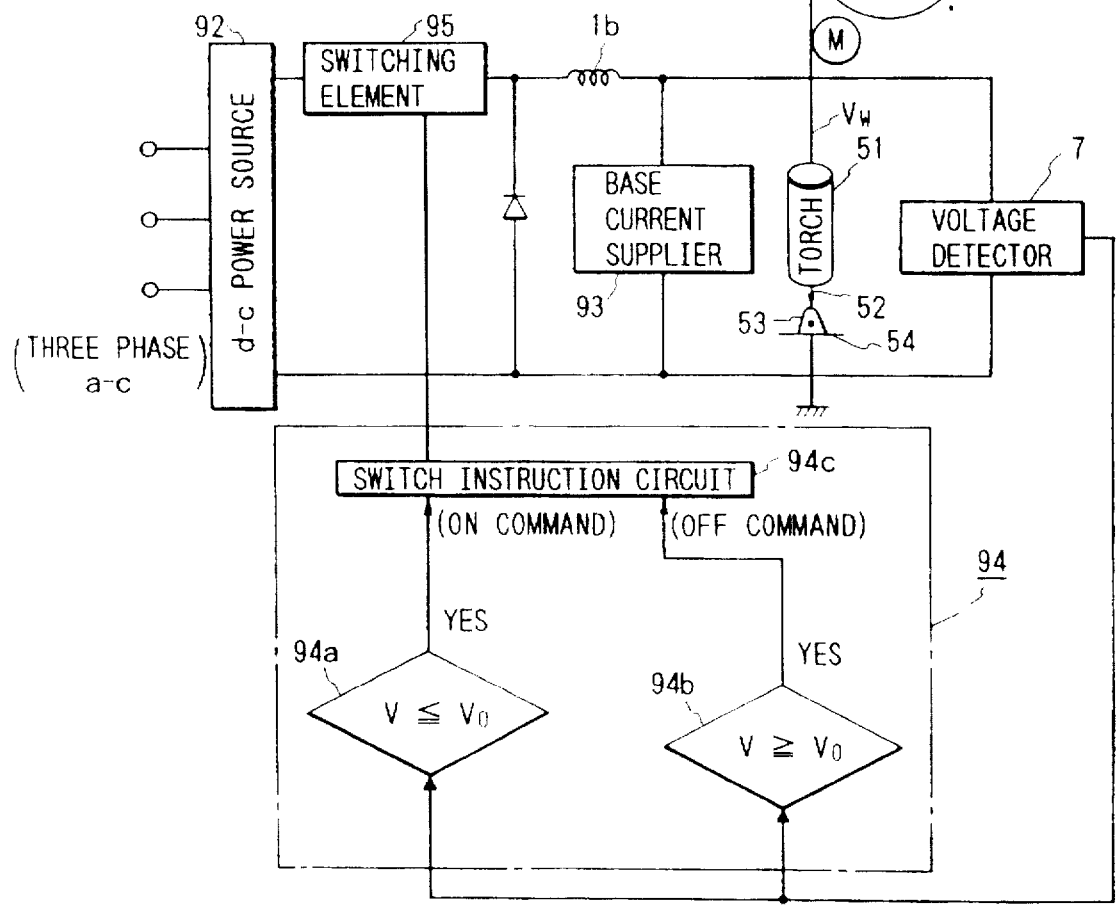
Figure 54:
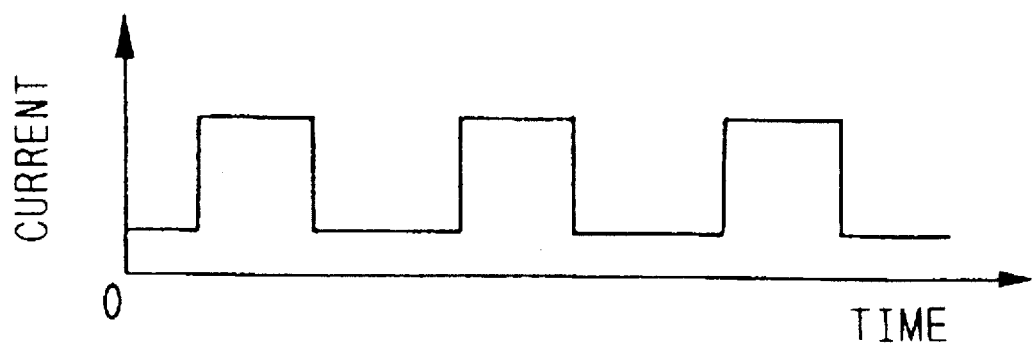
FIG. 54a shows an arc current waveform in conventional arc welding.
FIG. 54b is an arc current waveform diagram when welding by the use of a short-circuiting welding is performed.
Figure 54:
Figure 55:
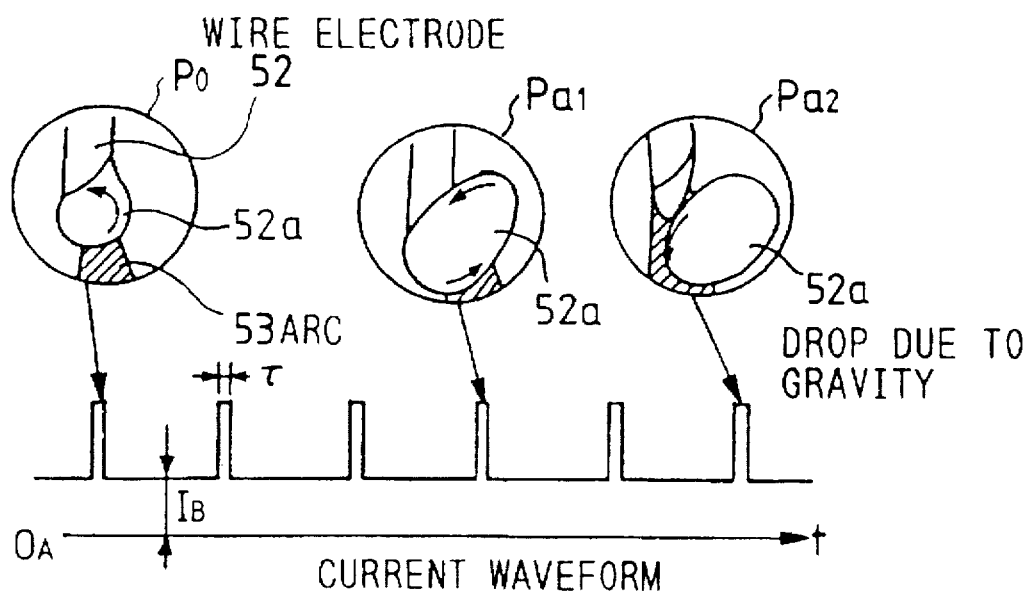
FIGS. 55a and 55b are illustrative diagrams showing pulse arc discharge current waveforms and the transfer of melted molten droplet in the prior art.
Figure 55:
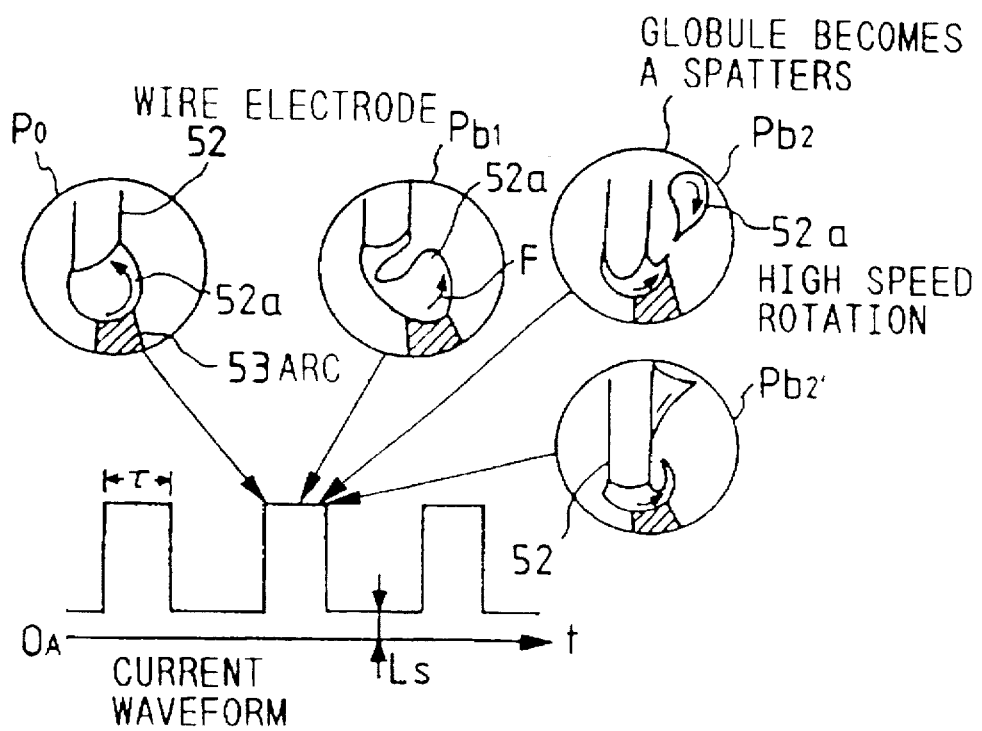
Figure 56:
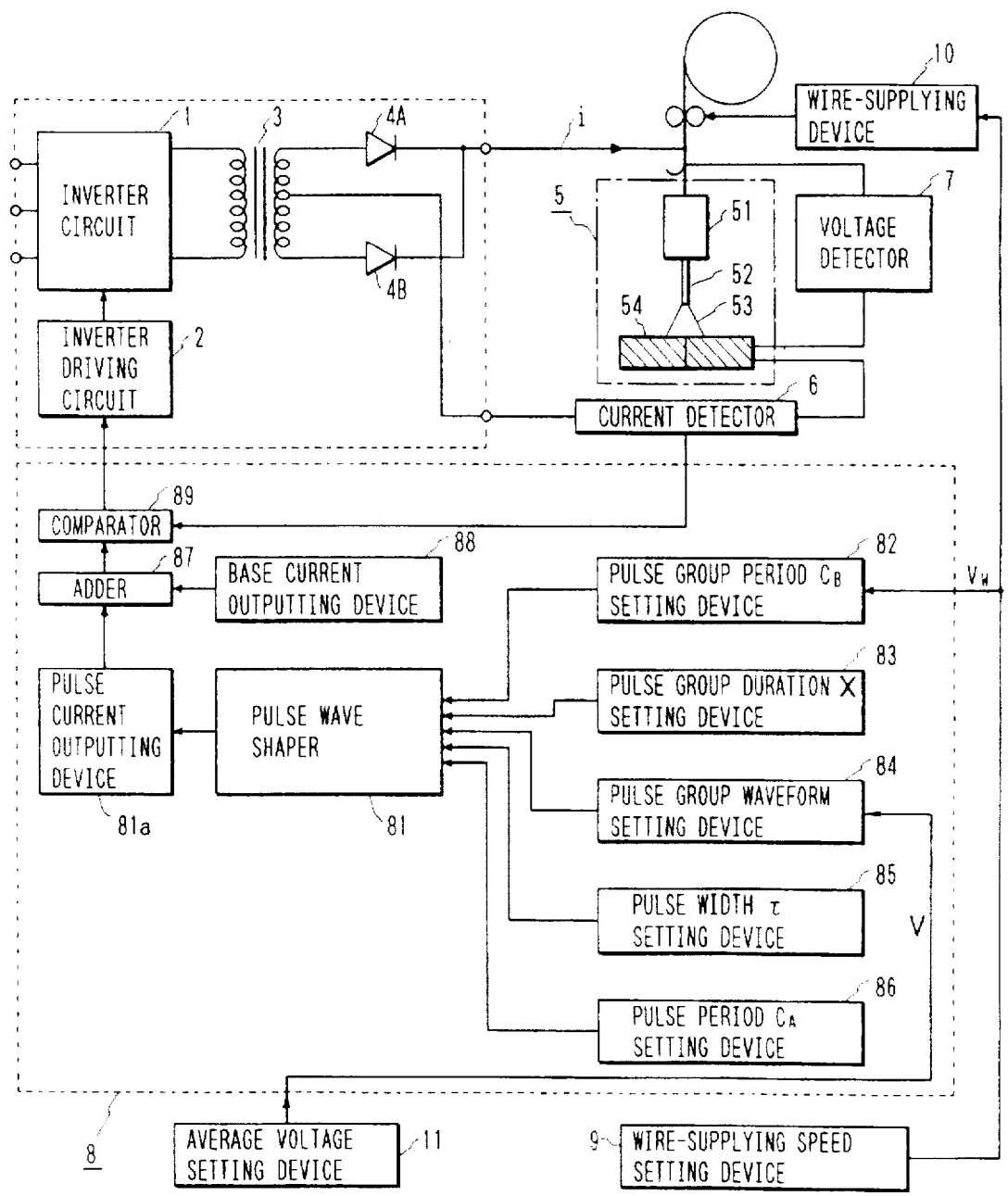
FIG. 56 is a block diagram of a prior art pulse arc welding apparatus.
Figure 57:
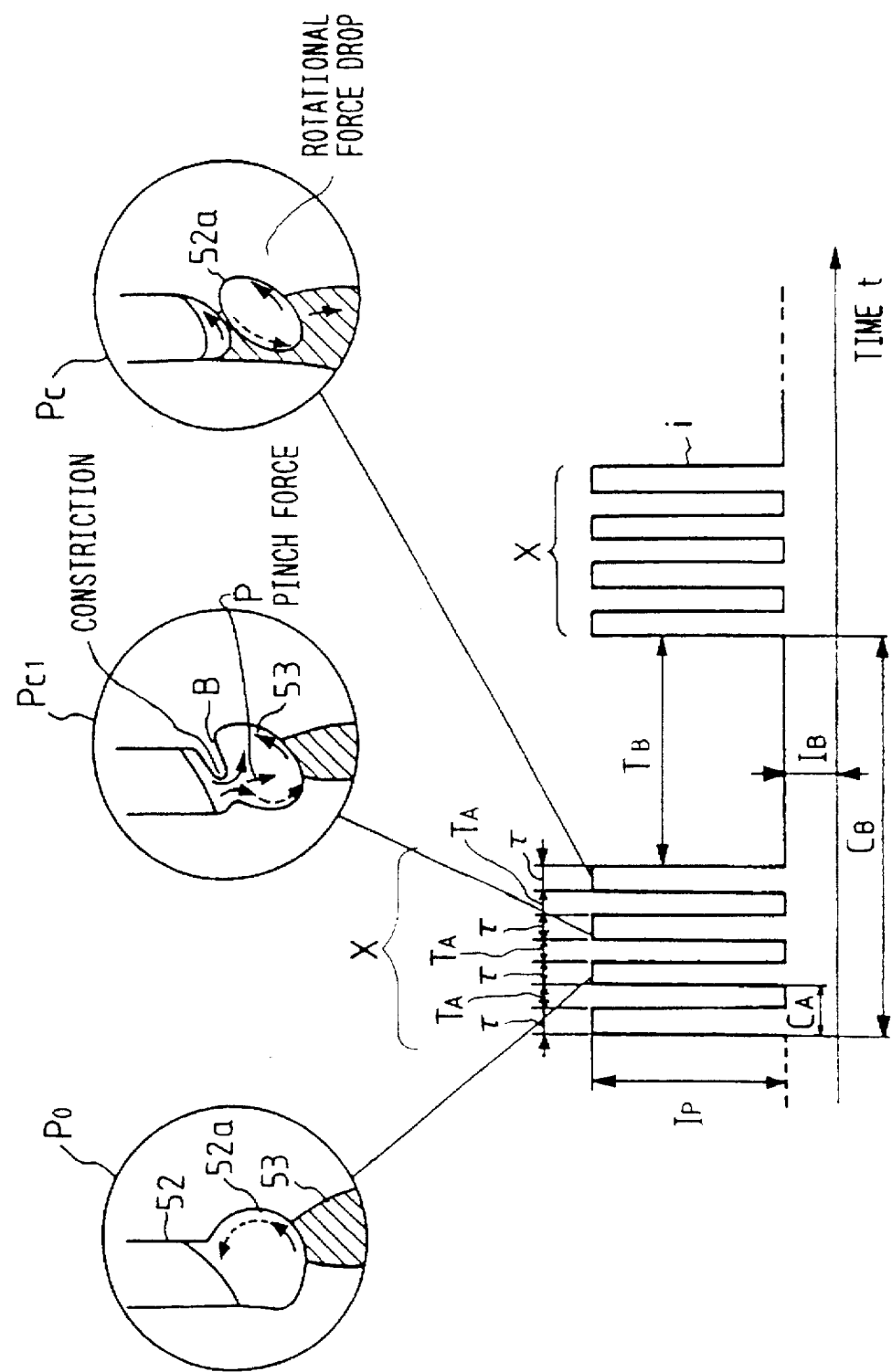
FIG. 57 is a pulse arc current waveform diagram in the prior art pulse welding apparatus.
Figure 58:
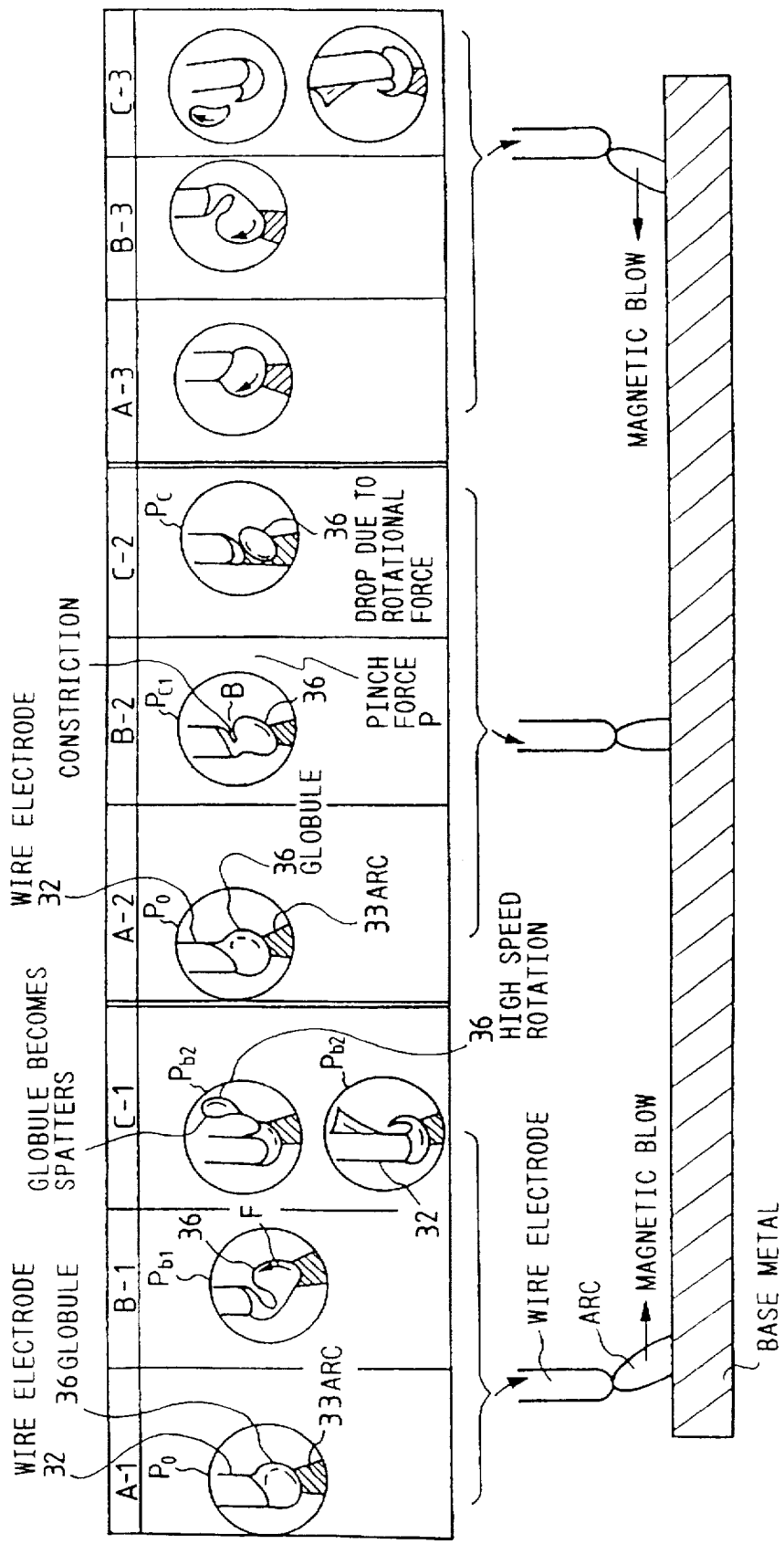
FIG. 58 is a diagram illustrating the lift phenomenon of molten droplet due to magnetic blow phenomenon.
Figure 59:
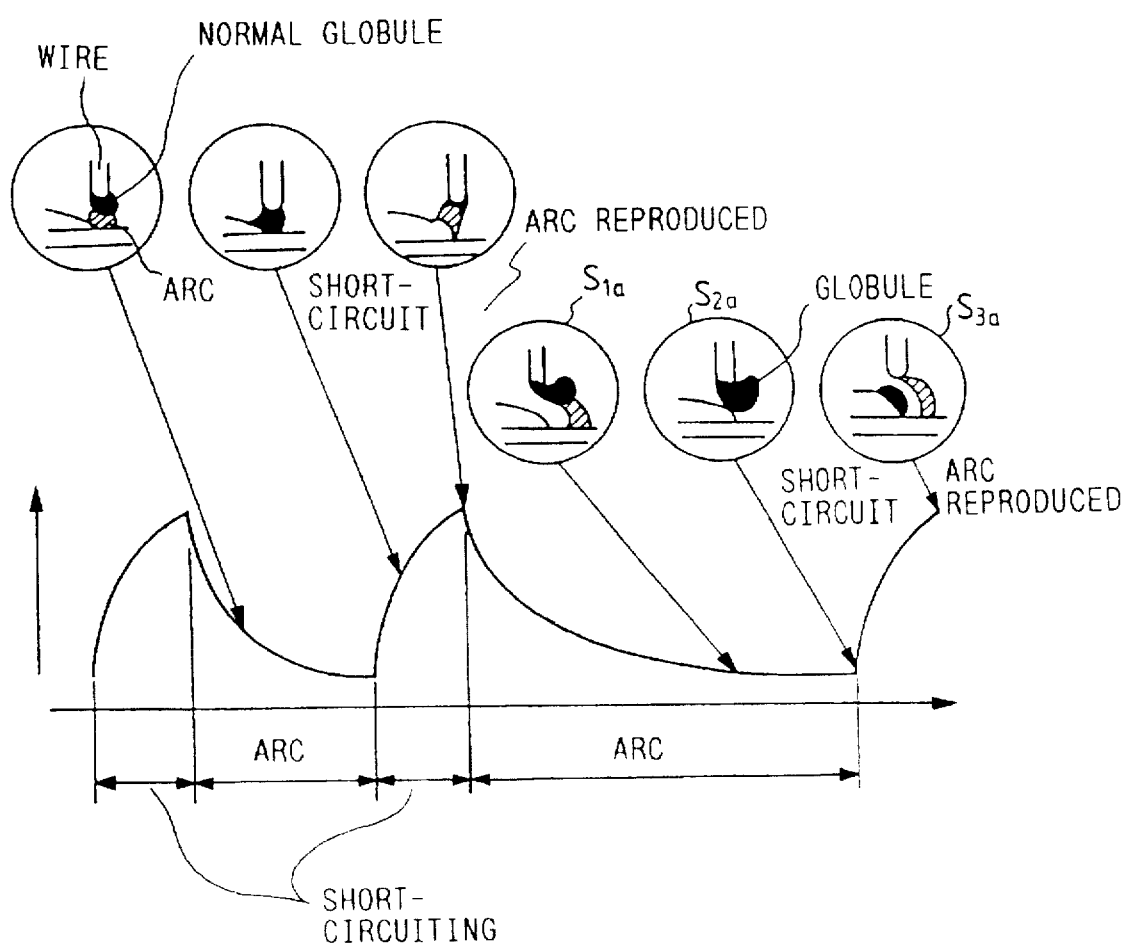
FIG. 59 is a current waveform diagram of a prior art short-circuiting arc welding.

Alternatively, the arc length signal L(l) may be supplied to the short-circuit detector 12q1 and separation detector 12q2 in the short-circuit/arc decision making device 12q as shown in FIG. 48B, and the flip flop 12q3 provides an output as a short-circuit decision signal while the short-circuit signal as depicted by (d) in FIG. 52 is presented to the set terminal of flip flop 12q3 and shuts off the short-circuit decision signal to indicate as an arc duration signal when the separation signal is supplied from the separation detector 12q2 to the reset terminal of the flip flop.

What is claimed is:

1. A pulse welding apparatus having a consumable wire electrode, comprising:

a pulse current waveform control circuit for generating a pulse current, wherein, for each current pulse, said pulse current reaches a peak current value a predetermined time after a beginning of said pulse current, said peak value of said pulse current being greater than a value of the pulse current at the beginning of said current pulse; and a discharge current circuit for generating a discharge current waveform which is formed by superimposing on a continuous base current a train of pulse currents obtained by repeating said pulse current, wherein said pulse current waveform control circuit variably controls a slope of an average current forming said peak value in accordance with a wire-supplying speed and an average voltage.

2. A welding apparatus according to claim 1, wherein said pulse current waveform control circuit comprises:

a pulse period setting device for setting the period of a single pulse and outputting a pulse period signal; and a pulse duration setting device for setting the pulse width of said pulse current.

3. A welding apparatus having a pulse current waveform control circuit for producing and outputting a group of pulse currents comprised of one or more pulse currents, said circuit comprising:

an arc length detector for detecting an arc length at each moment based on an arc current detected value and outputting an arc length signal;

a separation detector for detecting separation of a molten droplet on the basis of said arc length signal and outputting a separation detection signal;

a target arc length setting device for setting a target arc length varying at each moment;

a comparator for comparing at each moment said arc length signal and said target arc length;

a pulse group current generator for setting a reference pulse current waveform;

a current waveform period setting device for setting a pulse current group output period of the group of pulse currents in accordance with a wire-supplying speed;

a current waveform duration setting device which is set for each pulse group period for outputting an ON signal to one or more analog switches;

a flip flop which is set by said separation detection signal for outputting an ON signal to said one or more analog switches;

a base current outputting device for outputting a base current;

an adder for superimposing said base current on the group of pulse currents;

a comparator for comparing the signal output from said adder with the arc current detected value so as to control an invertor drive circuit; and a charge amount setting device for setting the amount of charge of said group of pulse currents.

4. A welding apparatus according to claim 3, wherein said charge amount setting device comprises:

an integrator which integrates said group of pulse currents after separation of said molten droplet to determine the amount of charge;

a predetermined-charge-amount setting device for presetting an amount of charge of said group of pulse currents flowing after separation detection; and another comparator which outputs a reset signal to the current waveform duration setting device when the amount of charge of the outputted group of pulse currents reaches the preset amount of charge of said predetermined-charge-amount setting device.

5. A pulse welding apparatus having a wire electrode with a tip, comprising:

a pulse current waveform control circuit for outputting a group of pulse currents including a plurality of pulse currents having one of (i) more than one pulse width, (ii) more than one pulse peak value and (iii) more than one pulse interval, a smoothed current waveform of the group of pulse currents becoming a maximum peak value during a pulse group duration at a predetermined time after a beginning of outputting the group of pulse currents, said group of pulse currents being periodically repeated to form a train of said group of pulse currents;

a timing unit for setting, based on welding conditions, the predetermined time occurring at any time after the beginning of outputting the group of pulse currents during the pulse group duration;

a smooth current waveform generator for generating a signal representing the smoothed current waveform of the group of pulse currents, wherein said pulse current waveform control circuit generates said plurality of pulse currents based on said signal; and a pulse arc current waveform generator for generating a pulse arc current waveform by superimposing a continuous base current onto the train of said pulse group currents, wherein one of the pulse interval, pulse width, and pulse period of said group of pulse currents is varied in synchronism with the separation of a molten droplet on the tip of the wire electrode.

6. A pulse welding apparatus according to claim 5, wherein said pulse current waveform control circuit comprises:

a pulse group period setting device for setting the pulse group period in accordance with a wire-supplying speed and outputting a pulse group period signal;

a pulse group duration setting device for setting the pulse group duration and outputting a pulse group duration signal;

a pulse group waveform setting device for setting a pulse group waveform;

a pulse width setting device for setting a pulse width of each pulse included in said pulse group waveform;

a pulse period setting device for setting a pulse period of said each pulse and outputting a pulse period signal;

a pulse shaper for outputting said group of pulse currents shaped by set signals from each of the setting devices;

a base current outputting device for outputting a base current to which said train of said group of pulse currents is superposed; and an adder for superimposing said train of said pulse group currents on said base current.

7. A welding apparatus according to claim 6, wherein said pulse current waveform control circuit further comprises:

an arc length detector for detecting an arc length L between the tip of the wire electrode and a base metal in accordance with an arc current i and an arc detection voltage V; and a separation detector for producing a separation signal indicating separation of a molten droplet from the wire electrode on the basis of said arc length L detected by said arc length detector, and outputting said separation signal to the pulse period setting device so as to variably control the pulse period of the pulse group duration.

8. A welding apparatus according to claim 7, wherein said arc length detector comprises:

a first buffer amplifier which receives the arc detection current i and a second buffer amplifier which receives the arc detection voltage;

a multiplier which receives said arc detection current i via said first buffer amplifier and multiplies said arc detection current i by K1(i) to generate and output a signal K1(i)i;

a d-c voltage constant setting device for setting and outputting an offset voltage constant K2;

an adder which adds the respective output signals from said multiplier and d-c voltage constant setting device and outputs a sum $V_x$; and a comparator which compares the output $V_x$=K1(i)i+K2 of said adder with said arc detection voltage V and outputs a signal L(l)=V−$V_x$.

9. A welding apparatus according to claim 7, wherein said pulse period setting device comprises:

a first flip flop which is set by said pulse group period signal and is reset by separation signal output from said separation detector;

a second flip flop which is reset by said separation signal output from said separation detector;

a first and a second pulse period setting device which provides a first and a second set value for setting a first and a second pulse period, respectively;

a first and a second analog switch which are controlled to open and close by outputs of said first and second flip flops; and a comparator which compares said first and second set values of said first and second pulse period setting devices with an integrated output of an integrator which integrates said pulse period signal, wherein said comparator provides an output as a pulse period signal when said integrated output reaches one of said first set value and said second set value.

10. A welding apparatus according to claim 7, wherein said pulse current waveform control circuit causes an envelope of said plurality of said pulse currents to have an increasing slope from the beginning of outputting said plurality of said pulse currents and to have a decreasing slope at a time in synchronism with separation of said molten droplet based on said separation signal.

11. A welding apparatus according to claim 10, wherein said pulse current waveform control circuit comprises:

a first flip flop for controlling the output of a pulse group period signal and pulse group duration signal;

an integrating circuit including a first resistor, a capacitor C, and an operational (OP) amplifier for integrating the output of said first flip flop;

a discharge circuit including a first transistor and a second resistor for discharging a charge stored in the capacitor C of said integrating circuit;

a second transistor for connecting input and output terminals of said OP amplifier;

a second flip flop for controlling said first transistor to turn ON;

an invertor for controlling said second transistor to turn ON;

a third transistor for connecting the output of said first flip flop to ground potential except when said pulse group duration signal is input;

a first and a second buffer for directing reset signals to said first and second flip flops; and an inverting circuit for inverting an output signal of said OP amplifier and outputting the inverted signal to said pulse shaper.

12. A welding apparatus according to claim 10 comprising:

means for determining an integrated amount of charge of arc current which is fed after separation of said molten droplet; and an arc current feeding control unit for causing said group of pulse currents to stop being output by comparing the amount of integrated charge with a predetermined amount of charge so as to control said means for determining to be reset.

13. A welding apparatus according to claim 12, wherein said apparatus further comprises:

an arc length detector for detecting an arc length between a tip of a wire electrode and a base metal and outputting an arc length signal based on the detected arc length;

a short-circuit/arc decision making device for determining a short-circuit duration and the arc duration of said molten droplet on the basis of at least said arc length signal; and a short-circuit current waveform setting device for setting and outputting a short-circuit current waveform based on said short-circuit duration determined by said short-circuit/arc detection making device.

14. A pulse welding apparatus having a wire electrode with a tip, comprising:

a pulse current waveform control circuit for outputting a group of pulse currents including a plurality of pulse currents having one of (i) more than one pulse width, (ii) more than one pulse peak value and (iii) more than one pulse interval, a smoothed current waveform of the group of pulse currents becoming a maximum peak value during a pulse group duration at a predetermined time after a beginning of outputting the group of pulse currents, said group of pulse currents being periodically repeated to form a train of said group of pulse currents;

a timing unit for setting, based on welding conditions, the predetermined time occurring at any time after the beginning of outputting the group of pulse currents during the pulse group duration;

a smooth current waveform generator for generating a signal representing the smoothed current waveform of the group of pulse currents, wherein said pulse current waveform control circuit generates said plurality of pulse currents based on said signal; and a pulse arc current waveform generator for generating a pulse arc current waveform by superimposing a continuous base current onto the train of said pulse group currents, wherein one of the pulse interval, pulse width, and pulse period of said group of pulse currents is changed a predetermined time after beginning of outputting said group of pulse currents.

15. A pulse welding apparatus according to claim 14, wherein said pulse current waveform control circuit comprises:

a pulse group period setting device for setting the pulse group period in accordance with a wire-supplying speed and outputting a pulse group period signal;

a pulse group duration setting device for setting the pulse group duration and outputting a pulse group duration signal;

a pulse group waveform setting device for setting a pulse group waveform;

a pulse width setting device for setting a pulse width of each pulse included in said pulse group waveform;

a pulse period setting device for setting a pulse period of said each pulse and outputting a pulse period signal;

a pulse shaper for outputting said group of pulse currents shaped by set signals from each of the setting devices;

a base current outputting device for outputting a base current to which said train of said group of pulse currents is superposed; and an adder for superimposing said train of said pulse group currents on said base current.

16. A welding apparatus according to claim 15, wherein said pulse period setting device comprises:

a timer which provides a first output after elapse of a predetermined time and provides a second output upon being reset;

a first flip flop which is set by said pulse group period signal and is reset by said first output of said timer;

a second flip flop which is set by said first output of said timer and is reset by said pulse group duration signal;

a first and a second pulse period setting device for providing a first and a second set value for setting a first and a second pulse period;

a first and a second analog switch which are controlled to open and close by outputs of said first and second flip flops, respectively; and a comparator which compares said first and second set values of said first and second pulse period setting device with an integrated output of an integrator which integrates said pulse period signal, wherein said comparator provides an output when said integrated output reaches one of said first and second set value, wherein said output is an integrated pulse period signal which resets said integrator.

17. A pulse welding apparatus having a consumable wire electrode, comprising:

a pulse current waveform control circuit for generating a pulse current, wherein, for each current pulse, said pulse current reaches a peak current value a predetermined time after a beginning of said pulse current, said peak value of said pulse current being greater than a value of the pulse current at the beginning of said current pulse, and said pulse current gradually decreases after reaching said peak current value; and a discharge current circuit for generating a discharge current waveform which is formed by superimposing on a continuous base current a train of pulse currents obtained by repeating said pulse current.

18. A welding apparatus according to claim 17, wherein said pulse current waveform control circuit variably controls a slope of an average current forming said peak value in accordance with a wire-supplying speed and an average voltage.

19. A welding apparatus according to claim 17, wherein said pulse current waveform control comprises:

a pulse period setting device for setting the period of a single pulse and outputting a pulse period signal; and a pulse duration setting device for setting the pulse width of said pulse current.

* * * * *